United States Patent [19]

Granger et al.

[11] Patent Number: 4,977,458

[45] Date of Patent: Dec. 11, 1990

[54] APPARATUS FOR ADDRESSING A FONT TO SUPPRESS MOIRE PATTERNS OCCURRING THEREBY AND A METHOD FOR USE THEREIN

[75] Inventors: Edward M. Granger; John F. Hamilton, Jr.; Larry G. Wash, all of Rochester, N.Y.

[73] Assignee: Eastman Kodak Company, Rochester, N.Y.

[21] Appl. No.: 272,591

[22] Filed: Nov. 16, 1988

[51] Int. Cl.[5] .............................................. H04N 1/40
[52] U.S. Cl. ....................................... 358/456; 358/78
[58] Field of Search ..................... 358/283, 280, 75, 78

[56] References Cited

U.S. PATENT DOCUMENTS

| | | | |
|---|---|---|---|
| 3,688,033 | 8/1972 | Hell et al. | 178/15 |
| 3,806,641 | 4/1974 | Crooks | 358/283 |
| 3,916,096 | 10/1975 | Everett et al. | 358/283 |
| 3,922,484 | 11/1975 | Keller | 358/283 |
| 3,997,911 | 12/1976 | Perriman et al. | 358/75 |
| 4,012,584 | 3/1977 | Gascoigne | 358/302 |
| 4,051,536 | 9/1977 | Roetling | 358/298 |
| 4,084,183 | 4/1978 | Keller et al. | 358/75 |
| 4,149,194 | 4/1979 | Holladay | 358/283 |
| 4,185,304 | 1/1980 | Holladay | 358/298 |
| 4,193,096 | 3/1980 | Stoffel | 358/260 |
| 4,203,154 | 5/1980 | Lampson et al. | 364/200 |
| 4,214,277 | 7/1980 | Urich | 358/283 |
| 4,245,258 | 1/1981 | Holladay | 358/282 |
| 4,246,614 | 1/1981 | Knox | 358/283 |
| 4,281,312 | 7/1981 | Knudson | 340/146.3 |
| 4,350,996 | 9/1982 | Rosenfeld | 358/75 |

(List continued on next page.)

OTHER PUBLICATIONS

P. G. Roetling et al, "Tone Reproduction and Screen Design for Pictorial Electrographic Printing", *Journal of Applied Photographic Engineering*, Fall 1979, vol. 5, No. 4, pp. 179-182.

P. G. Roetling, "Analysis of Detail and Spurious Signals in Halftone Images", *Journal of Applied Photographic Engineering*, Winter 1977, vol. 3, No. 1, pp. 12-17.

P. G. Roetling, "Binary Approximation of Continuous Tone Images", *Photographic Science and Engineering*, Apr. 1977, vol. 21, No. 2, pp. 60-65.

P. G. Roetling, "Halftone Method with Edge Enhancement and Moire Suppression", *Journal of the Optical Society of America*, Oct. 1976, vol. 66, No. 10, pp. 985-989.

T. M. Holladay, "An Optimum Algorithm for Halftone Generation for Displays and Hard Copies", *SID Digest*, 1979, pp. 102-103.

D. Kermisch et al, "Fourier Spectrum of Halftone Images", *Journal of the Optical Society of America*, Jun. 1975, vol. 65, No. 6, pp. 716-723.

*Primary Examiner*—Howard W. Britton

[57] ABSTRACT

Apparatus and an accompanying method for use therein are disclosed for suppressing a screener induced Moire pattern that would otherwise appear in a reproduced color image generated by a raster based marking engine (20). This Moire pattern results from successively sampling a stored bit-mapped font pattern in a grid like raster based writing pattern in order to produce a visual depiction of the stored font pattern in the image. Specifically, this Moire is suppressed by forming an address, for use in successively accessing each desired bit in the stored font pattern, in which the address is formed of at least two portions in which each portion is generated through a summation of an orthogonal positional value with a corresponding specific amount of noise. The amount is a substantially random value occurring within a noise function (1720) that is defined by a substantially uniform probability distribution occurring throughout a region, in the position domain, that has a width equal to the spacing between adjacent micro pixels that form the visual depiction and is substantially zero valued elsewhere. Use of such an amount of noise is sufficient to substantially suppress the amplitude of this screener induced Moire pattern that would otherwise occur in the reproduced image but is advantageously insufficient to inject any distinct artifacts into the image or affect image Moires.

16 Claims, 24 Drawing Sheets

U.S. PATENT DOCUMENTS

| | | | |
|---|---|---|---|
| 4,419,690 | 12/1983 | Hammes | 358/75 |
| 4,447,831 | 5/1984 | Adsett | 358/283 |
| 4,449,150 | 5/1984 | Kato | 358/283 |
| 4,456,924 | 6/1984 | Rosenfeld | 358/75 |
| 4,493,049 | 1/1985 | Donohue et al. | 364/900 |
| 4,499,489 | 2/1985 | Gail et al. | 358/75 |
| 4,532,503 | 7/1985 | Pennebaker | 340/728 |
| 4,547,812 | 10/1985 | Waller et al. | 358/283 |
| 4,566,042 | 1/1986 | Cahill | 358/300 |
| 4,606,069 | 8/1986 | Johnsen | 382/56 |
| 4,633,327 | 12/1986 | Roetling | 358/283 |
| 4,647,962 | 3/1987 | Rosen et al. | 358/78 |
| 4,661,859 | 4/1987 | Mailloux et al. | 358/283 |
| 4,667,247 | 5/1987 | Karow | 358/280 |
| 4,692,879 | 9/1987 | Ikuta | 364/518 |
| 4,700,235 | 10/1987 | Gall | 358/283 |
| 4,717,954 | 1/1988 | Fujita et al. | 358/80 |
| 4,727,430 | 2/1988 | Miwa | 358/283 |
| 4,752,822 | 6/1988 | Kawamura | 358/80 |
| 4,821,109 | 4/1989 | Roe | 358/283 |
| 4,823,189 | 4/1989 | Haines | 358/283 |
| 4,827,352 | 5/1989 | Yoneda | 358/283 |

CIRCULAR HALFTONE DOT PATTERNS -
0° SCREEN ANGLE

CIRCULAR HALFTONE DOT PATTERNS -
15° SCREEN ANGLE

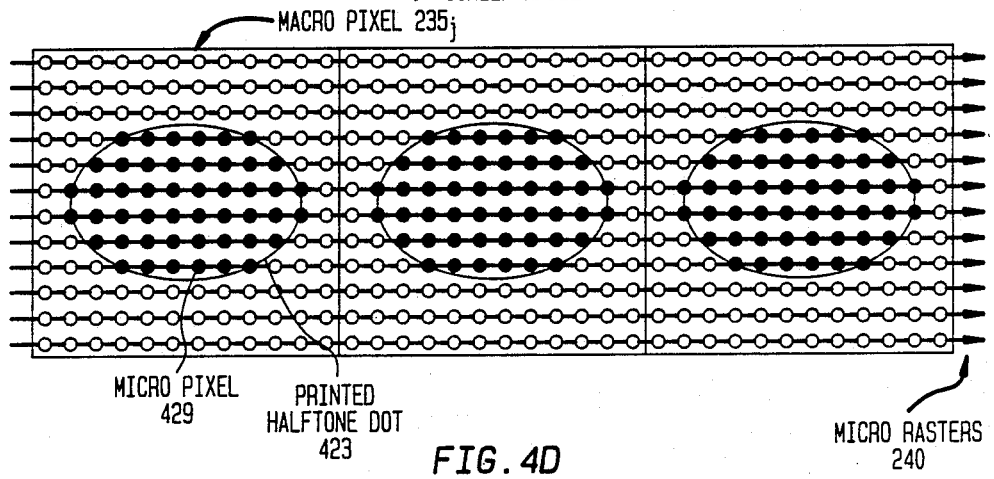
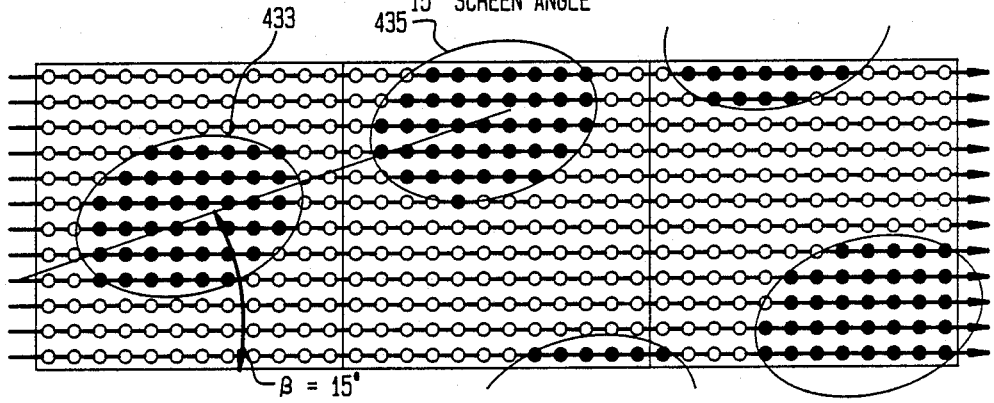
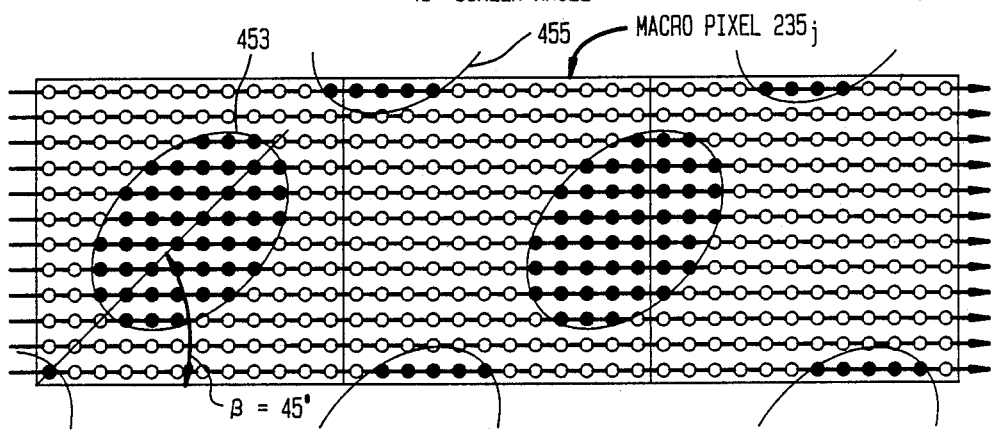

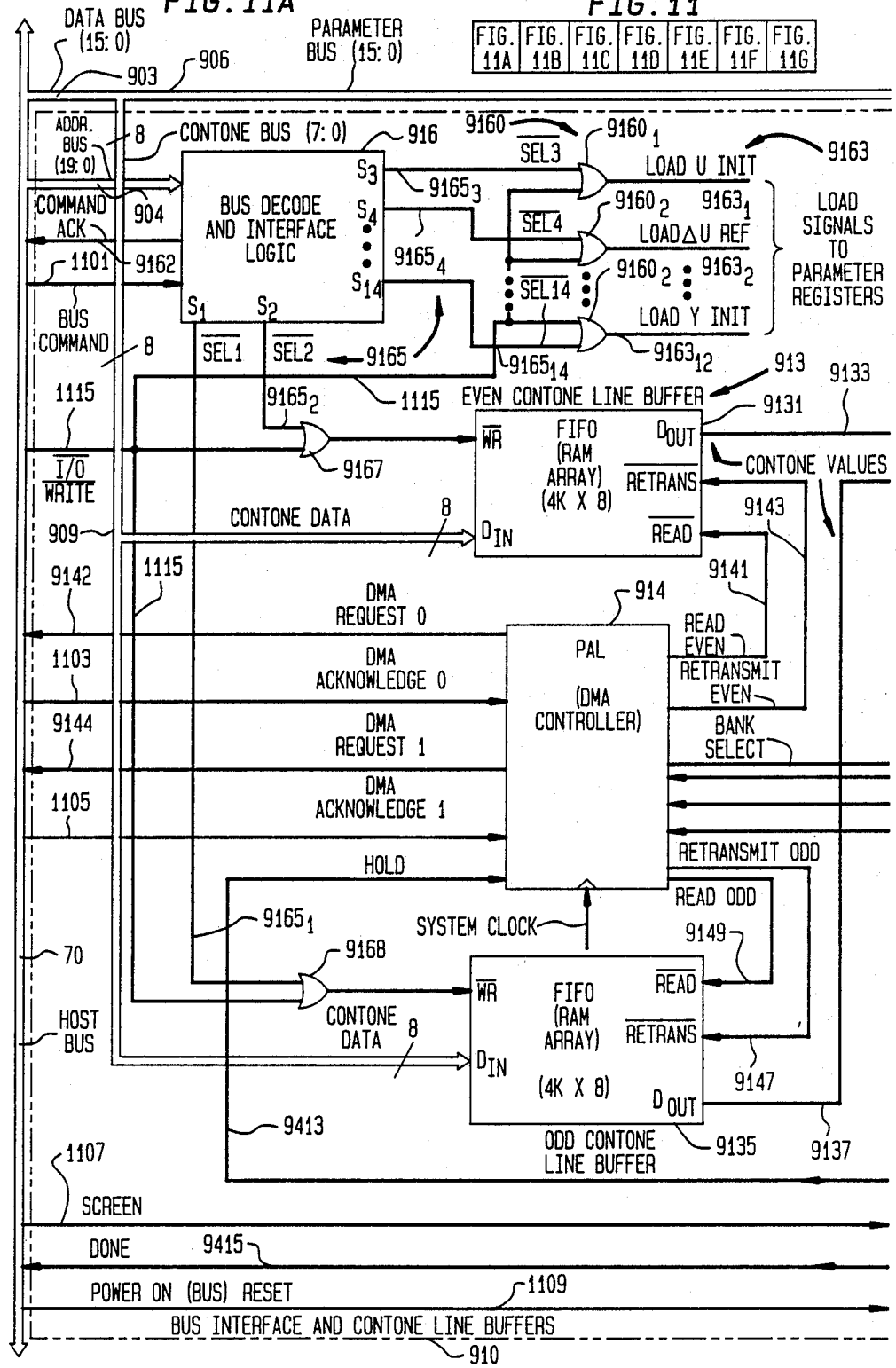

FIFO FILL OPERATION
DMA CONTROLLER PAL 914 STATE DIAGRAMS

FIFO SWAP OPERATION (A) APPLY PULSES TO LOAD INPUTS
TO X START ADDER 9535 AND
Y START ADDER 9615 TO
SELECT PRIOR OUTPUT OF THESE ADDERS AS
INPUT (B) THERETO:

$X\ START_t \leftarrow X\ START_{t-1} + \Delta X\ SLOW$ $Y\ START_t \leftarrow Y\ START_{t-1} + \Delta Y\ SLOW$ (B) APPLY PULSES TO MUX SELECT
AND LOAD INPUTS TO V POSITION ADDER 9347,
X POSITION ADDER 9537 AND Y POSITION
ADDER 9617 TO SET CORRESPONDING
OUTPUTS TO INITIAL VALUES
FOR SAMPLING LINE FOR NEXT
MICRO RASTER:

$V\ POSITION_{t+1} \leftarrow V_{INIT} + \Delta V_{REF}$ $X\ POSITION_{t+1} \leftarrow X\ START_t + \Delta X\ FAST$ $Y\ POSITION_{t+1} \leftarrow Y\ START_t + \Delta Y\ FAST$

134G

INITIALIZE
FOR NEXT
SUCCESSIVE
MICRO
RASTER

1336

$\overline{V\ OVERFLOW} *$
$\overline{CELL\ CTR\ TC} *$
$\overline{LINE\ CTR\ TC}$ (SCREENING OF CURRENT
MICRO RASTER LINE IS COMPLETE,
ADDITIONAL MACRO RASTER LINES
REMAIN TO BE SCREENED)

| FIG. | FIG. |
| 13A | 13B |

GENERATE APPROPRIATE CONTROL
SIGNALS FROM HOST PROCESSOR
TO RESET SCREENER $\overline{SCREEN}$

CONTROL SEQUENCE
PAL 940
STATE DIAGRAM

PSEUDO RANDOM NOISE GENERATOR

PIXEL PLACEMENT ERROR FUNCTION

PIXEL PLACEMENT ERROR FUNCTION
WITH ADDITION OF RANDOM NOISE

HALFTONE DOT GAIN VARIATIONS

FOURIER TRANSFORM OF PIXEL PLACEMENT ERROR FUNCTION

NOISE FUNCTION

FOURIER TRANSFORM OF NOISE FUNCTION

APPARATUS FOR ADDRESSING A FONT TO SUPPRESS MOIRE PATTERNS OCCURRING THEREBY AND A METHOD FOR USE THEREIN

CROSS REFERENCE TO RELATED APPLICATIONS

This application describes and claims subject matter that is also described in two co-pending U.S. patent applications, one such application being from applicants E. M. Granger et al and entitled "ELECTRONIC GRAPHIC ARTS SCREENER" that has been filed simultaneously herewith and assigned Ser. No. 07/272,568 and the other such application being from applicant E. M. Granger entitled "AN ELECTRONIC GRAPHIC ARTS SCREENER THAT SUPPRESSES MOIRE PATTERNS USING PSEUDO-RANDOM FONT SELECTION" that has also been filed simultaneously herewith and assigned Ser. No. 07/272,592.

TECHNICAL FIELD OF THE INVENTION

The invention relates to electronic processing of color images for use in graphics arts applications, and particularly to apparatus for use in a digital screener and an accompanying method for use therein for suppressing a substantial source of screener induced Moire patterns that would otherwise appear in a reproduced color image.

BACKGROUND ART

Graphic arts applications frequently require the accurate reproduction of a high resolution color image (i.e. an artwork), such as a photograph, a color drawing, a color layout and the like. A typical application might involve printing a high resolution color image on a page of a periodical, such as a magazine, or a corporate annual report.

Color images are oftentimes generated either photographically, on suitable film, or electronically, on video tape or other suitable electronic media. When generated, these images share a basic characteristic: they are recorded on a continuous tone (hereinafter referred to as "contone") basis. As such, the color existing at any point in the image is recorded by an amplitude value, either exposure in the case of film or a voltage level in the case of electronic media.

Color reproduction equipment takes advantage of the principle that any color can be separated into a specific linear combination of four primary subtractive colors (cyan, yellow, magenta and black—CYMB) in which the amount of each primary color is set to a predetermined amount. In the case of printed reproductions of an image, use of primary color printing obviates the need to use a differently colored ink for each different color in the image. As such, each image is converted into a succession of three or four color separations, in which each separation is essentially a negative (or positive) transparency with an altered tone reproducing characteristic that carries the color information for only one of the primary colors. A separation is frequently made by photographing or electronically scanning an artwork through an appropriately colored filter. If, illustratively, a digital scanner is used, then each resulting contone value is frequently an eight binary bit number that represents the relative intensity of a corresponding primary color between a range of "0" (no intensity) to "255" (full intensity). A set or file of corresponding contone values would then exist for each separation.

Unfortunately, modern printing presses do not possess the capability of applying differential amounts of ink to any location in an image. Rather, these presses are only designed to either apply or not apply a single amount of ink to any given location. Therefore, a printing press is unable to directly print a contone separation. To successfully circumvent this problem, halftone separations are used instead. An image formed from halftone separations encodes the color information inherent in a color image from amplitude modulated form into a spatial (area) modulated form, in terms of dot size, which is subsequently converted by the human eye into a desired color. Specifically, it has been known in the art for quite some time that, for black and white images, a number of small black dots of a corresponding size, when printed over an area and later viewed at a distance, will be spatially integrated by a human eye into an intermediate shade of grey. The size of the dot can be varied from 100%, i.e. a full dot, through 50%, a half dot, to 0% (at which no dot is printed) to yield the color black, gray or white. Hence, by smoothly changing dot sizes (areas), smooth corresponding tonal variations will be generated in the reproduced image. Given this, the art has taught for some time that a full color image can be formed by properly overlaying single color halftone reproductions for all of the primary subtractive colors, where each reproduction is formed from a halftone dot separation that contains dots of appropriate sizes and in one of these primary colors. Clearly, as size of the dots decreases, an increasing amount of detail can be encoded in a dot pattern and hence in the reproduced image. For that reason, in graphic arts applications, a halftone separation utilizes very small dots to yield a dot pitch (resolution) ranging from 85 to as much as 200 dots/inch (approximately 33 to 79 dots/centimeter).

With this in mind, one would at first blush think that printing a color image for graphic arts use should be a fairly simple process. Specifically, a color image could first be converted into corresponding continuous tone separations. Each of these contone separations could then be converted into a corresponding half tone separation. A printing plate could then be manufactured from each halftone separation and subsequently be mounted to a printing press. Thereafter, paper or other similar media could be run through the press in such a fashion so as to produce properly registered superimposed halftone images for all the subtractive primary colors thereby generating a full color reproduction of the original image.

Unfortunately, in practice, accurately printing a color image is oftentimes a very tedious, problematic and time consuming manual process that requires a substantial level of skill. First, the process of converting a contone separation into a halftone separation, this process commonly being referred to as "screening", is a time consuming manual process in and of itself. Second, various phenomena, each of which disadvantageously degrades an image, often occur in a reproduced halftoned color image. Moreover, the complete extent to which each of these phenomena is present in the reproduced image is often known only at a rather late point in the printing process thereby necessitating the use of tedious and time consuming iterative trial and error experimentation to adequately eliminate these phenomena.

Screening is traditionally accomplished photographically. Where each color separation in the form of negative type transparency has been made (i.e. "indirect color separation photography"), a separate screening step is performed to yield a halftone positive. Specifically, a contact screen, now typically a flexible transparency (such as illustratively a positive type KODAK Magenta Contact screen or a KODAK MARK MLR type contact screen) that contains a precise two dimensional grid-like pattern of vignetted dots (having a sinusoidal density pattern) at a resolution of 85 to 200 lines/inch (approximately 33 to 79 lines/centimeter), is placed in direct intimate contact over the emulsion side of a piece of high contrast orthochromatic film, such as KODALITH Ortho film 2556, type 3 (KODAK, KODALITH and MARK MLR are trademarks of Eastman Kodak Company), in a vacuum holder located in the back of a suitable vertical process camera. These films are commonly referred to as "lith" films. As such, incoming light will pass into the camera and then through the contact screen to selectively expose certain areas on the film. A color separation is positioned on the copyboard of the process camera such that the center of the separation is centered over the lense of the camera. Thereafter, light is projected onto the separation to uniformly illuminate the film plane in the process camera. The camera lense is then opened, and a suitable time exposure is made. Each area on the lith film where light was blocked by a dot in the screen will, with a positive type screen, remain white when developed to yield a positive halftone image. All other areas in the lith film that have been exposed to light passing through this screen will become black when developed. In lieu of using a process camera, a vacuum printing frame can be used where the separation transparency is mounted against one side of the screen with the lith film abuttingly mounted against the other side of the screen and light being shined directly through the separation, screen and onto the emulsion side of the lith film. In any event, the amount (density) of light passing through the screen and reflected from or passing through a contone separation at any given location will determine the size of the resulting dot (circular or square with a conventional screen, or elliptical with an elliptical screen) that will occur at a corresponding location on the developed lith film. The lightest areas on the separation will reflect or transmit therethrough the most light and will produce the largest dots. The darkest areas on the separation will reflect or transmit therethrough the least light and hence will produce the smallest dots. Once the lith film has been appropriately exposed, it is then chemically developed to yield a halftone separation. This entire photographic process is then repeated for each of the remaining color separations to generate the remaining halftone separations. Alternatively, in direct color separation photography, separate screened negative type color separations are directly generated from an original color image rather than from a color separation. Here, an appropriate color filter is typically placed onto the lense of the process camera to separate out a primary color from the original image. A negative type screen, such as a KODAK Gray Contact Screen (Negative type) or a KODAK MARK GSR screen for generating reflection copy with a process camera or a KODAK MARK GMR screen for use with a color transparency of the image mounted in a vacuum mounting frame, can be used to directly generate the negative halftone separation from the image (MARK GSR and MARK GMR are trademarks of the Eastman Kodak Company). The remainder of the screening process is substantially identical to that discussed above.

Unfortunately, photographic screening processes possess several major drawbacks. First, because of the large number of manual steps involved, photographic screening is time consuming. Second, a camera operator that performs this process must possess a very high level of skill in order to obtain accurate results. In particular, the operator must accurately regulate the exposure light to assure that lith film is evenly illuminated. Additional exposures, such as shadow and highlight exposures, of a lith film may also be necessary to achieve proper tonal rendition in a halftone separation. The operator also needs to recognize and compensate for the fact that subtle differences in the reproduced image may arise if he changes from an old screen to a new screen in which the latter has smaller tolerances and hence a more sharply defined dot pattern than the former screen or if he changes from one type of lith film to another. Furthermore, the operator must reduce all stray non-image forming light (commonly referred to as flare) that reaches the lith film to a minimal amount. Moreover, the operator must use proper techniques in developing the exposed lith film in order to assure that acceptable tonal rendition occurs in the reproduced color image.

In addition, the dot patterns existing in each of the superimposed halftone reproductions in a full color image frequently interact with each other to produce a low frequency spatial beat (interference) pattern that appears as a repeating rosette pattern in the image and is commonly referred to as a Moire pattern (hereinafter referred to as Moire). If the beat pattern is sufficiently low, Moire is very visible, quite unsightly and highly objectionable to a viewer. To reduce visible Moire, each halftone separation is produced at a different screen angle. The screen angle is defined as the angle between the rows of dots on the screen and the vertical (or horizontal) axis of the lith film or the scanned image. For four color (CYMB) printing, screen angles of 45, 75, 90 and 105 degrees for black, magenta, yellow and cyan screens, respectively, are commonly used. Either the individual screens can be suitably rotated or pre-angled screens, such as KODAK Pre-Angled Gray or Magenta contact screens, can be used. In either case, use of differently angled screens shifts the beat patterns to a relatively high frequency where the Moire is far less noticeable, if at all, to a viewer. While such preset screen angles are often used, the amount of Moire that actually exists in any printed full color image is not known until that image is actually printed.

In addition to screening induced Moire, a full color image can contain undesirable artifacts, such as spots, streaks or the like, that also need to be removed. Often this entails that the coloration of a region of one or more of the separations or of the underlying contone image itself needs to be changed, by one or more techniques, such as tinting, opaquing or "air brushing", to eliminate the artifact. Unfortunately, it is frequently not known a priori, until a point is reached much later in the color printing process, i.e. when a proof and oftentimes a press sheet, as described below, is analyzed, whether use of any of these techniques will effectively remove the artifact and, if such a technique is selected for use, the full extent to which it should be used in order to satisfactorily remove the artifact.

During printing, dot gain also presents a problem. Printing paper absorbs ink. As such, whenever a dot is printed on a page, the ink used to print that dot diffuses into a printed page and as a result creates a slightly larger dot than that intended on the surface of the page. This affect is exacerbated inasmuch as ink is forced against the page by impression pressure exerted onto the page by the printing press. In any event, the visual enlargement in area covered by a dot on a printed page over the area contained in a corresponding halftone separation is referred to as dot gain. Frequently, dot gain is not uniform over all dot sizes and is greatest for dot sizes lying between 30-70% (middletones). Dot gain variations frequently occur between different types of paper (least for a good coated stock, increasing for an uncoated stock and greatest for a soft stock such as newsprint), different presses, and due to normal press variations between different presses of the same type and/or the same press being operated on different days. Therefore, to generate an accurate press sheet, smaller dots, i.e. dots reduced in size by the applicable dot gain, than those that would otherwise be contained in the halftone separations must be generated during screening. Unfortunately, due to normal press variations, the exact amount of dot gain that is expected is generally not known until an actual press sheet is run.

To verify the accuracy of the color printing process and to enable appropriate adjustments to be made at various stages in the printing process in order to correct image defects and improve reproduction accuracy, a test image, frequently referred to as a "proof" is generated from the halftone separations once they are made. After a proof is generated, it is presented as being representative of the reproduced image which will be produced by a printing press in order to determine the accuracy of the printed image. Oftentimes, the proof contains unexpected and unsightly Moire patterns that arose from the interaction of Moire in the image itself with that introduced by use of the angled screens. Frequently, these Moire patterns can be rendered invisible by further rotation of one or more of the screens to a different screen angle. Unfortunately, the exact change in the screen angle is frequently very hard to discern from the resulting Moire pattern itself and instead must be determined through trial and error experimentation. Unexpected artifacts can also exist in the proof thereby necessitating that various changes must be made to one or more of the separations. As such, this requires that a one or more new halftone separations must be generated or at least changed, a new proof must be produced and then analyzed, with this "proofing" process being iteratively repeated until the objectionable Moire and all objectionable artifacts are eliminated from the proof. Now, once an acceptable proof is made thereby indicating that a printed image based on the separations will likely present a desired depiction of the original artwork, a separate printing plate, such as an aluminum sheet with an appropriate organic film coating, is then made for each halftone separation. At this point, a full color test print, commonly referred to as a "press sheet", is produced from these plates onto a sheet of actual paper stock that is to be used to carry the reproduced image, with this operation frequently being referred to as a "press run". The press sheet is then examined to discern all imperfections that exist in the image reproduced therein. Owing to unexpected dot gain, existence of any artifacts in the press sheet and tonal variations occurring in the press run between the press sheet and the original artwork, further adjustments in the coloration or screen angle of the separations may need to be made with the entire process, i.e. both the proofing and the press run processes, being repeated until an acceptable press sheet is produced. Specifically, if a portion of the artifact remains in the press sheet after one or more of the separations has been changed as set forth above or if an artifact is introduced through interaction of the superimposed halftoned reproductions that form the press sheet, then one or more of the separations may again need to be changed and the entire process iteratively repeated until an acceptable press sheet is produced. Frequently, this change in one or more of the separations is made along with a change in screen angle to eliminate any unsightly Moire. With experience gained over several years, a skilled color technician can reduce the number of times that this entire process needs to be repeated in order to produce a set of color halftone separations that yields an acceptable press sheet.

As one can now readily appreciate, the iterative manual process of producing an acceptable set of halftone separations, due to the inherent variability of the process, can be very tedious and inordinately time consuming. Unfortunately, in the graphic arts industry, publication deadlines are often extremely tight and afford very little, if any, leeway. Consequently, the available time in a graphic arts production environment allotted to a color technician to generate a set of halftone separations to meet a particular publication deadline, for example, is often insufficient to allow the technician adequate time, due to the trial and error nature of iterative process, to generate that set of separations which produces a very high quality halftoned color image. As such, the technician is often constrained by time pressures to produce a set of separations that produces a visually acceptable, though not necessarily a very high quality, image.

In addition, the manual process can be disadvantageously quite expensive. Inasmuch as the manual process, even for a skilled color technician, involves a certain amount of trial and error experimentation, a number of separate proofs is often made with changed or new separations being generated as a result. Each new separation requires another piece of lith film. Film and associated developing chemicals are expensive. In addition, if an unacceptable press sheet is produced, then additional separations may need to be made along with new printing plates, which further increases the expense of the process.

In an effort to reduce the time required and expense associated with manual photographic based color reproduction processes, the art has turned away from use of these manual processes in high volume graphic art applications to the use of electronic image processing systems. These systems convert contone images or separations into electronic (often digital) form, electronically change screen angles and compensate for expected dot gain, electronically produce appropriate halftone separations and in some instances halftoned color images directly onto a sheet of paper thereby eliminating the need to photographically generate both separation transparencies and a proof. Through use of electronic image processing, these systems aim to produce high quality halftoned color images at a substantially increased throughput than that possible with traditional manual processes. However, for various reasons as discussed below, these electronic systems when used in graphic arts production environments often fall short of this goal.

An essential component of an electronic image processing system is an electronic screener that converts contone images or separations into corresponding halftone separations for subsequent use in directly driving an electronic dot printer. Specifically, these systems frequently utilize a high resolution marking engine, such as a laser printer, which prints writing spots of a single color at a resolution of illustratively at least 3000 spots/inch. Through such a marking engine, each halftone dot is formed as a group of writing spots. Inasmuch as the color of a toner used in the laser printer specifies the color of each spot, a separate toning pass is made through the printer for each of the colors cyan, yellow, magenta and black using a correspondingly colored toner to generate each separate halftoned image that is used in collectively forming a full color image.

Various techniques for electronic screeners exist in the art but each of these techniques suffers from one or more drawbacks. In particular, U.S. Pat. No. 4,727,430 (issued to M. Miwa on Feb. 23, 1988) discloses one such technique for generating halftone images from an original image. Here, the screen that is used for any area of the original image is selected based upon both the image content, specifically density and hue information, occurring at that area and the coordinate location of that area in the original image. Unfortunately, by first establishing separate comparison ranges of density and hue and coordinate location information for the entire scanned image and then comparing each area in the image to the values for each of these ranges in order to select the proper screen for that area, this technique is likely to be very slow which, in turn, will disadvantageously limit the throughput of an electronic image processing system that uses this technique.

Another electronic screening technique is disclosed in U.S. Pat. No. 4,447,831 (issued to D. E. Adsett et al on May 8, 1984 and hereinafter referred to as the '831 Adsett et al patent). This technique, executed in software, relies on first dividing an image into pre-defined areas of 128 adjacent pixels, then generating a weighting function for each 32 pixel sub-area in every area in the image, algebraically combining the weighting functions for each sub-area of each corresponding area to determine the angular modulation present in that area, encoding each area with a value indicative of angular modulation associated therewith, and finally, in response to the encoded value, selecting an appropriate halftone dot pattern to be printed for that area. First, this technique appears to be limited to printing relatively large halftone dots rather than relatively small dots as required in graphic arts applications. Second, the relatively large number of steps that must be performed to select a halftone dot pattern for every area in an image will likely cause this technique to disadvantageously require an excessively large amount of time to process an entire image. In particular, a screened halftone bit-mapped image destined for reproduction by a high resolution marking engine, such as a laser printer, may easily contain in excess of 100 Mbytes of data/separation with a resulting color image containing upwards of 16 Mbits of color information per square inch (or approximately 2.5 Mbits/square centimeter) of image area. Consequently, any software based screening technique, such as that disclosed in the '831 Adsett et al patent, will likely require an inordinately large and hence unacceptable amount of processing time to manipulate the sheer volume of data needed to generate a high resolution screened image. Thus, use of any software based screening technique will disadvantageously highly limit the throughput of an electronic image processing system that uses such a technique and possibly severely degrade its utility for an intended use in a graphic arts production environment.

A different screening technique is disclosed in U.S. Pat. No. 4,419,690 (issued to P. Hammes on Dec. 6, 1983). Here, a halftone separation is generated by helically scanning a color original using an opto-electronic multi-beam scanning head and helically moving a laser completely throughout an output surface, e.g. a separation film, in synchronism with the movement of the scanner. Digital position values are generated to define the current location of the scanning head as it moves along each scanning line in the color original. These values, having X and Y components, are incremented by appropriate horizontal ($\Delta X$) and vertical ($\Delta Y$) increments as defined by the screen angle, output dot pitch and output line spacing. The X and Y components for each successively occurring position are computed by repeated addition of the $\Delta X$ and $\Delta Y$ increments to the previous positions. Once computed, the position values are used as an address to a memory that stores a pattern of a corresponding overlaid halftone dot situated within an "imaginary" screen and inclined at a given screen angle, $\beta$, to the horizontal axis of the separation. If the output of the memory reveals that the current position of the scanning head, as it moves along a scanning line, lies within the overlaid halftone dot area, then the position signal is compared against the tonal value of the original image at the current location of the scanning head to determine whether the laser will be pulsed on at that location. If, alternately, the current position of the scanning head lies outside of an overlaid dot area, then the laser remains off at this position. The increments are less than the size of an overlaid halftone dot such that the laser can produce several dots within the area of an overlaid halftone dot. This patent teaches that to reduce visible Moire in the reproduced image: (a) the values of the $\Delta X$ and $\Delta Y$ increments should be periodically varied as dot borders are crossed, i.e. presumably as the scanning head traverses areas on the original that are associated with adjacent overlaid dots, in order to generate an intermediate screening angle, and (b) the width of the memory that stores an overlaid dot pattern should be chosen such that the width of the overlaid dot is a multiple of the number of scanning beams. Unfortunately, artifacts may be disadvantageously introduced into the separations by the screening process if the $\Delta X$ and $\Delta Y$ increments are periodically varied during a screening operation. In addition, this technique is disadvantageously somewhat inflexible due to the need to size the memory (overlaid dot shape) appropriately to eliminate Moire in different screening applications.

An additional technique, which relies on representing each repeating halftone cell within a screen by a rectangular matrix and then appropriately combining each pixel within the matrix with pictorial information for spatially corresponding pixels located within an image, is described in U.S. Pat. No. 4,185,304 (issued on Jan. 22, 1980 to T. M. Holladay). Unfortunately, this technique can only be used with certain screen angles thereby failing to suppress certain Moire patterns caused by the mere superposition of all the halftone separations.

Hence, electronic screeners known in the art are often disadvantageously characterized by one or more deficiencies: rather slow operation—particularly those that rely on use of a software based screening technique, operation over limited screen angles, introduction of unwanted artifacts or inflexible operation. Unfortunately, any of these deficiencies tends to limit the throughput of an electronic image processing system that might utilize such a screener.

Moreover, an inherent problem with electronic image processing systems known in the art and specifically those that employ digital screeners is their potential to generate undesirable Moire, hereinafter referred to as screener induced Moire, in addition to that caused by superposition of all the halftone separations to form the reproduced color image. The goal of an electronic image processing system, particularly the screener, is to generate a reproduced color image that appears as faithful to an original color artwork as possible, i.e. a reproduction that replicates all the flaws such as Moire and artifacts that appear in the artwork but without adding any additional flaws. This goal is not met where the screener introduces flaws into the reproduced image. Specifically, those skilled in the art have recognized that visually objectionable low frequency Moire patterns can result from the interaction of several separate spatially sampled entities that occur in the image processing system, e.g. Moire occurring in the sampled image itself (image Moires), Moire introduced by the interaction of the sampled image produced by the scanner with a sampled screen, and Moire introduced by the interaction of the sampled screened image with the individual grid like configuration of writing spots produced by the marking engine.

In an attempt to suppress such non-image Moire patterns and provide faithful color image reproduction, the art teaches that either of two basic approaches can be used. Unfortunately, neither of these approaches is fully satisfactory. First, rational screens can be used. Here, pre-defined pixel (writing spot) patterns for a fundamental portion of halftone image that are actually to be written by a marking engine are stored in a memory and repeatedly accessed and replicated on a two dimensional basis across the written image. Unfortunately, with such a screen, the spacing between the center of individual halftone dots in both of two orthogonal directions is constrained to be an integer number of pixels thereby limiting the screen angle accordingly. Since each of the pixel patterns themselves is chosen not to have any resident Moire, screener induced Moire does not exist. However, objectionable Moire patterns with relatively large rosettes (that produces a "puckery" appearance) frequently appear in certain colored areas of a color halftoned image whenever the individual halftoned separations generated through rational screens are superposed to yield the reproduced color image. These rosettes can often be eliminated if one of the constituent halftone color separations could be rotated to a slightly different, e.g. irrational, screen angle. Unfortunately, the fixed nature of the stored pixel patterns prevents any such rotation and hence elimination of these rosettes. Therefore, a user of this approach is constrained to accept this objectionable Moire. Hence, the inflexibility of a rational screen based electronic image processing system to provide any arbitrary screen angle often causes such a system to fail to meet the goal of faithful image reproduction. For that reason such systems are not favored for use in graphic arts applications.

Second, the art recognizes that noise can be added to an irrational screening process in order to break up the periodicity of and hence suppress screener induced Moire patterns. Generally, due to the inability to exactly pinpoint each cause and its contributing amount of Moire to a reproduced color halftoned image, electronic image processing systems that utilize noise rely on adding noise to the image on an ad hoc basis, i.e. at the point in the screener that is the most accessible and/or conducive to adding a noise signal to the screening process. For example, one noise based technique relies on adding noise to the contone value for each halftone dot in order to dither its value somewhat. Adding noise in this fashion has proven to be inadequate to substantially eliminate screener induced Moire. Another noise technique involves adding noise to randomly and slightly change the center position of each halftone dot. This technique unfortunately produces a halftone dot that frequently has two separate portions, such as a crescent shaped portion at the bottom of a cell (macro pixel) and a truncated remainder situated at the top of the cell or vice versa. Unfortunately, if too much noise is added, then image Moires, which must be exactly duplicated if the goal of faithful image reproduction is to be met, will be suppressed thereby disadvantageously degrading the quality of the reproduced image.

For example, U.S. Pat. Nos. 4,456,924 and 4,350,996 (respectively issued on Sept. 21, 1982 and June 26, 1984 to G. Rosenfeld) describe electronic screeners that utilize added noise to eliminate Moire. Specifically, these patents describe electronic screeners, generally similar to those discussed above, that use a screen pattern having a rectangular matrix of microcells which have been electronically rotated to a desired screen angle and are successively superimposed over corresponding groups of adjacent pixels of a color separation to generate a corresponding halftone separation. These two patents recognize that rounding error occurring in the calculation of the address of each microcell in the screen pattern, particularly at certain screen angles, will produce Moire. To break the Moire, these patents teach that a relatively small amount of noise in the form of a small random number should be added to either the address applied to a screen memory or to the output provided by the screen memory. Unfortunately, merely adding a small amount of noise in this fashion does not necessarily ensure that substantially all the screener induced Moire will be suppressed.

Therefore, a specific need exists in the art for apparatus and accompanying methods which can be used in a digital screener that can operate at any screen angle and which suppresses a substantial amount of screener induced Moire but does not visibly affect image Moires. By suppressing such induced Moire, the separations and resulting halftoned images will more faithfully replicate the artwork than that heretofore possible with electronic screeners known in the art. This, in turn, will advantageously reduce the amount of trial and error experimentation required by a color technician to generate a set of color separations that yields a high quality reproduction of the artwork. Consequently, incorporating the apparatus and accompanying methods into a digital screener that possesses a relatively high throughput, operates in a flexible manner and substantially prevents unwanted artifacts from being injected into the halftoned separations or reproduced image will, when the screener is used in an electronic image processing system, advantageously produce such an image processing system, particularly one destined for use in a graphic arts production environment, that has a substantially increased throughput of high quality faithfully reproduced halftoned color images over that attainable with traditional manual color reproduction processes.

SUMMARY OF THE INVENTION

I have recognized that a substantial cause of screener induced Moire patterns which appear in an image generated by successively sampling a stored bit-mapped font pattern and produced by a raster based marking engine, such as a laser printer, results from beat patterns caused by the interaction of a sampled pixel placement error function by a raster based writing function. This error arises from a periodically varying spatial misalignment occurring between the center of each writing spot (micro pixel) as printed by the raster based marking engine and the address boundaries of each sampling point located within the stored bit-mapped font pattern. The misalignment arises from the limited resolution in the sampling addresses generated for each sampling point. This misalignment, specifically occurring between the placement of a micro pixel by the marking engine and the desired center of a corresponding sample point within the stored font pattern, takes the form of a periodic sawtooth with a period equal to the spacing between successive micro pixels that form the visual depiction of the font.

With this recognition and in accordance with further teachings of my invention, this screener induced Moire can be substantially suppressed by: generating a coordinate position of a desired bit residing within the font pattern; generating a substantially random noise value, wherein the noise value is contained within a noise function that has a substantially uniform probability distribution occurring throughout a region having a width equivalent to the spacing between successive micro pixels in the depiction and is substantially zero valued elsewhere; and summing the noise value with the coordinate position to yield an address to the stored font pattern. Specifically, this technique involves generating two separate multi-bit noise values and combining each value with a corresponding orthogonal coordinate to generate two portions of an address that are, in turn, used to access a desired bit within the stored bit-mapped font pattern. Since the presence of the noise in each orthogonal component of the address is sufficient to randomly vary the least significant bit of this component, the energy that would otherwise appear as a repetitive screener induced Moire pattern is randomly smeared across an address error band surrounding each micro pixel thereby randomly varying the location of the edge of halftone dots occurring in a constant tonal area in a probabilistic manner and hence substantially breaking the screener induced Moire patterns.

Advantageously, through this technique only enough noise is added at the proper point in the screener, i.e. to the font memory addresses, to substantially suppress the screener induced Moire but not enough to introduce appreciably any artifacts into the reproduced image or adversely affect any image Moires. Moreover, this technique is not confined to operate with any particular screen angles. As such, an irrational digital screener that utilizes this inventive technique will advantageously produce a highly faithful reproduction of an image defined by a set of incoming color separations. Consequently, use of the inventive technique in a high throughput flexible irrational screener that is incorporated into an electronic image processing system advantageously facilitates meeting an overall goal in the art of providing such a system, particularly one destined for use in a graphic arts production environment, that has a substantially increased throughput of high quality faithfully reproduced halftoned color images over that attainable with traditional manual color reproduction processes.

BRIEF DESCRIPTION OF THE DRAWINGS

The teachings of the present invention may be readily understood by considering the following detailed description in conjunction with the accompanying drawings, in which:

FIGS. 4A-4E show various halftone dot patterns produced by marking engine 20 on a printed image for a constant tint area in a color separation using either a circular halftone dot reference pattern oriented at a screen angle ($\beta$) of zero or 15 degrees, or an elliptical halftone dot reference pattern oriented at a screen angle ($\beta$) of zero, 15 or 45 degrees;

FIG. 11 shows the correct alignment of the drawing sheets for FIGS. 11A-11G;

FIGS. 11A-11G collectively depict a detailed block diagram of the circuitry used in screener 30 shown in FIG. 1;

FIG. 13 shows the correct alignment of the drawing sheets for FIGS. 13A and 13B;

FIGS. 13A and 13B collectively depict a simplified state diagram implemented by Control Sequencer PAL 940 shown in FIGS. 11A-11G;

To facilitate understanding, identical reference numerals have been used to denote identical elements that are common to various figures.

MODES OF CARRYING OUT THE INVENTION

After reading the following description, those skilled in the art will readily appreciate that an electronic screener that incorporates the teachings of the present invention can be used in a wide variety of applications for color image reproduction. Such applications might include use within a raster image processor to generate bit-mapped halftone color separations from incoming contone separations from which a halftoned color image will be subsequently made or to directly generate a halftoned color image itself. Now, inasmuch as such a screener is particularly suited for use in an electronic image processing system for generating bit-mapped halftone color images from color contone separations for use as color proofs and more specifically, in the KODAK Direct Digital Color Proofer (DDCP) system, the invention will be discussed in that context and specifically for use within a screener that forms part of this system.

A. Overall System Description

Figure 1:
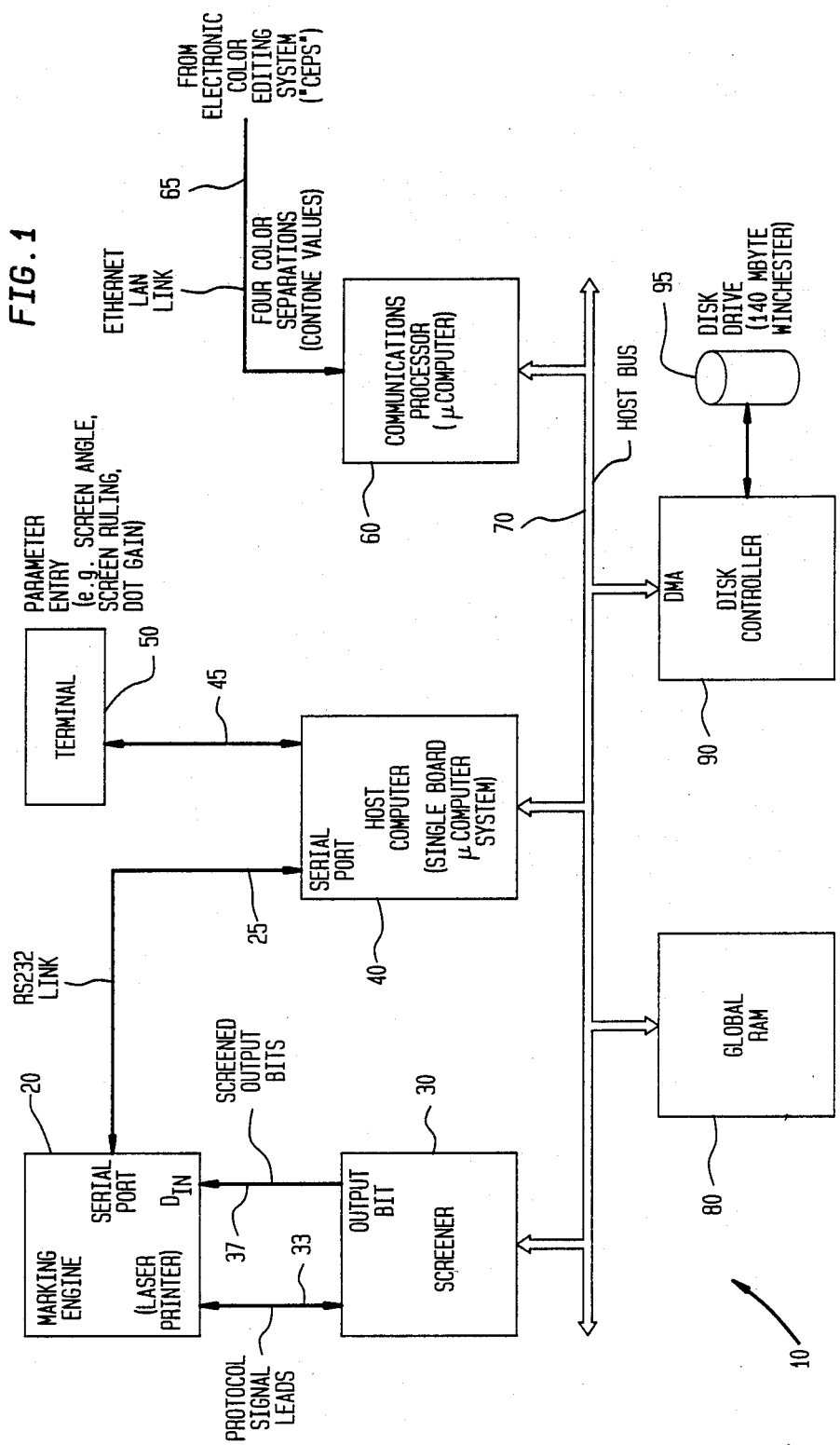
FIG. 1 shows an overall block diagram of an embodiment of electronic image processing system 10 which utilizes screener 30 that incorporates the teachings of the present invention.

FIG. 1 depicts a block diagram of an embodiment of electronic image processing system 10, specifically a typical raster image processor, which utilizes the a screener that incorporates the teachings of the present invention and which would find use in the direct digital color proofing system for producing a high quality color halftoned image (a "proof") that would be intended to accurately represent a subsequently printed full color reproduction of a full color artwork (original).

In overall function, system 10 prints a full color halftoned proof image from four continuous tone ("contone") color separations, i.e. for the four subtractive primary colors cyan, magenta, yellow and black. The need for such a system arises from the fact that currently available color reproducing equipment, such as a printing press, can not apply a differential amount of ink to any location on a printed page in order to achieve a particular tonal rendition of a color thereat. Instead, such equipment can only apply or not apply a single amount of ink to any given location. As such, to print a color image, the color information inherent in the image must first be separated into its constituent primary colors in order to generate appropriate contone separations. Each separation is then converted from contone form, where the color density information is encoded in eight bit amplitude modulated form, into halftone form in which the density information is encoded in spatial (area) modulated form in terms of the size (diameter) of relatively small halftone dots of a single color appropriately positioned against a white or transparent background. This conversion process is commonly referred to as "screening". A proof image is then printed by successively printing each of four single color halftone images, in a superimposed fashion with proper registration and formed from an associated contone separation, over each other. Whenever such a proof image is seen at normal viewing distances, the viewer's eyes will spatially integrate all the localized and overlaid dot patterns for each of the four primary colors existing throughout the reproduced image into the desired image colors with appropriate density and hue.

As will become clear shortly, system 10 utilizes hardware based screener 30 that advantageously provides a substantially increased throughput of high quality bit-mapped halftoned images over that available with screeners known in the art, has the capability of operating at variable screen rulings and substantially any screen angle, is flexible (i.e. does not require hardware reconfiguration, such as changing memory width, for each different screening application) and does not introduce appreciably any unwanted artifacts into the proof image.

Specifically, as shown in FIG. 1, system 10 is formed of screener 30, host computer 40, communications processor 60, global random access memory (RAM) 80 and disk controller 90 which are all connected via host bus 70; and marking engine 20, terminal 50, disk drive 95 and communications processor 60. Communications processor 60 accepts, over ETHERNET local area network (LAN) link 65, a file of eight bit digital values, ranging from zero to the value "255", that represents the continuous tone (contone) color density for every scanned location (pixel) in a color separation (ETHERNET is a trademark of the Xerox Corporation). This file of contone values is illustratively generated by a Color Electronic Pre-press System (CEPS) (well known and not shown) that is also connected to the LAN. In operation, a CEPS system scans an image to produce separate cyan, magenta, yellow and black contone separations. A color technician, stationed at a workstation (also not shown) connected to the CEPS system, can then suitably change the coloration of a region of one or more of the separations or of the halftone image, by one or more techniques, such as tinting, opaquing or "air brushing", to eliminate any artifacts in the separation(s). In addition, the technician can change the composition of any area within the image using scaling, rotation, cut and paste and/or other capabilities inherent in the CEPS. Once the file for each separation is generated by the CEPS, that file is transmitted over LAN link 65 to communications processor 60. This processor transfers the file through use of direct memory access (DMA), via host bus 70, to disk controller 90 for local storage within disk drive 95. This disk drive is illustratively a 140 Mbyte Winchester type hard disk drive. This DMA transfer process continues until four files collectively containing all four contone separations for an incoming color image have been stored onto disk drive 95. Communications processor 60 is typically an appropriate microcomputer based system which supervises the DMA transfer process. A mass storage device, such as a tape or disk drive, or a connection to another computer via LAN link 65 may be substituted for the CEPS in order to provide the contone data file for each separation.

Host computer 40, which is also connected to host bus 70, controls the screening process by generating appropriate control signals over the host bus and, for each separation, transferring a line of contone information from disk drive 95, via host bus 70, to screener 30. The screener, as discussed in detail below, is a dedicated hardware based screener that screens each separation using a highly efficient pipelined process. Screener 30 accepts each successive line of contone information that forms a separation and generates an appropriate bit stream that collectively forms a bit-mapped halftone separation at a desired screen angle, screen ruling and writing pitch. The resulting bit stream is applied, via lead 37, to the data input, $D_{in}$, of marking engine 20. The marking engine is typically a laser printer. The laser printer will print one separation at a time with a correspondingly colored toner, i.e. cyan, magenta, yellow or black, being used. To print a full color image, the printed image is kept in the marking engine, and the toner is changed from one color to another so that each successive halftone separation that collectively forms the image is overlaid in proper registration with the previously printed separations for that image. Well known communications protocol signals (not specifically shown), i.e. Data Request, Data Ready and Data Acknowledge, are transmitted over leads 33 between screener 30 and marking engine 20 to implement appropriate handshaking therebetween in order to control the transfer of data from the screener to the marking engine.

To increase screening throughout, global RAM 80 provides temporary storage of contone image data for use by screener 30. The separations for one image can be read from disk 95, via host processor 40 and disk controller 90, while essentially those for another image are being written, under control of communications processor 60, into global RAM 80. At the conclusion of these operations, the separations now stored in global RAM 80 will be read, under the control of host computer 40, and supplied, via host bus 70, to screener 30; while four separations for another image will essentially be successively written into disk 95, under control of communications processor 60 and disk controller 95 and so on. In this manner, system 10 can operate in a pipelined manner thereby relieving the system of the need to wait until screener 30 has screened all four separations of an image before the separations for the next image can be supplied over LAN 65.

As will become clearer below, the screener sequentially processes each successive contone value existing within every scanning line ("macro raster") in the separation. For each contone value, the screener generates bits that cause the marking engine to produce appropriate writing spots ("micro pixels") that collectively depict a proper spatially located halftone dot in the separation with a tonal value corresponding to the contone value and a desired screen angle. To produce appropriately fine halftone dots for graphic arts applications, the screen ruling is typically set to a value ranging from 85 to as much as 200 dots/inch (dpi) (approximately 33 to 79 dots/centimeter). In order to ensure that the halftone dots are properly shaped, each halftone dot is formed of micro pixels produced by the marking engine that are each at least ten times smaller than the screen ruling, i.e. for a screen ruling of 200 dpi, a writing pitch of at least 2000 micro pixels/inch (approximately 790 micro pixels/centimeter) is used. Here, for purposes of illustration, the screen ruling and writing pitch will be set to 150 dpi and 1800 micro pixels/inch, respectively.

Various parameters, such as image size, dot gain, screen ruling, screen angle and writing pitch, solid density level, and others, are established for each screening run and changed, as necessary, by a color technician from one screening run to the next. Terminal 50 is connected through leads 45 to host computer 40. Prior to the initiation of a screening run, a color technician will enter the value of each of these parameters, as requested by host computer 40, through this terminal into system 10. Using the values of image size, screen ruling, screen angle and writing pitch, the host computer, as discussed below, will determine, through appropriate table look up operations, twelve initial offset values and then successively load these offset values, via host bus 70, into corresponding parameter registers (see FIGS. 11A–11G) located within screener 30. In addition, as shown in FIG. 1, host computer 40 will also supply the value of image size (width and length), dot gain and solid density level as well other required parameters, e.g. toner color, to marking engine 20, via serial RS-232 link 25. Once these operations have occurred, the host computer will supply an initial line of contone data, via a DMA transfer from disk drive 95, to screener 30, via host bus 70, and thereafter, if the marking engine specifies that it is ready to print, i.e. accept data (by asserting a DATA REQUEST line, not specifically shown, located within leads 33 high), will command the screener to commence screening. Serial link 25 also carries status information provided by the marking engine to host computer in addition to various commands and parameter values from the host computer to the marking engine, e.g. start printing. During a screening operation, the host processor merely monitors the serial link for any changes in status information provided by marking engine 20.

B. Screening Fundamentals

To facilitate understanding of the subsequent discussion of both the circuitry and detailed operation of screener 30, the discussion will now digress to address various fundamental considerations of screening as they pertain to the screener.

As noted above, screening is the process of converting contone values for a color separation into appropriate halftone dots and, specifically, here into appropriate patterns of micro-pixels, at a desired screen ruling, screen angle and writing pitch, that collectively form each halftone dot. This result of this process for a zero screen angle is shown in FIGS. 2 and 3A-3C, all of which should be viewed simultaneously throughout the following discussion.

Figure 2:
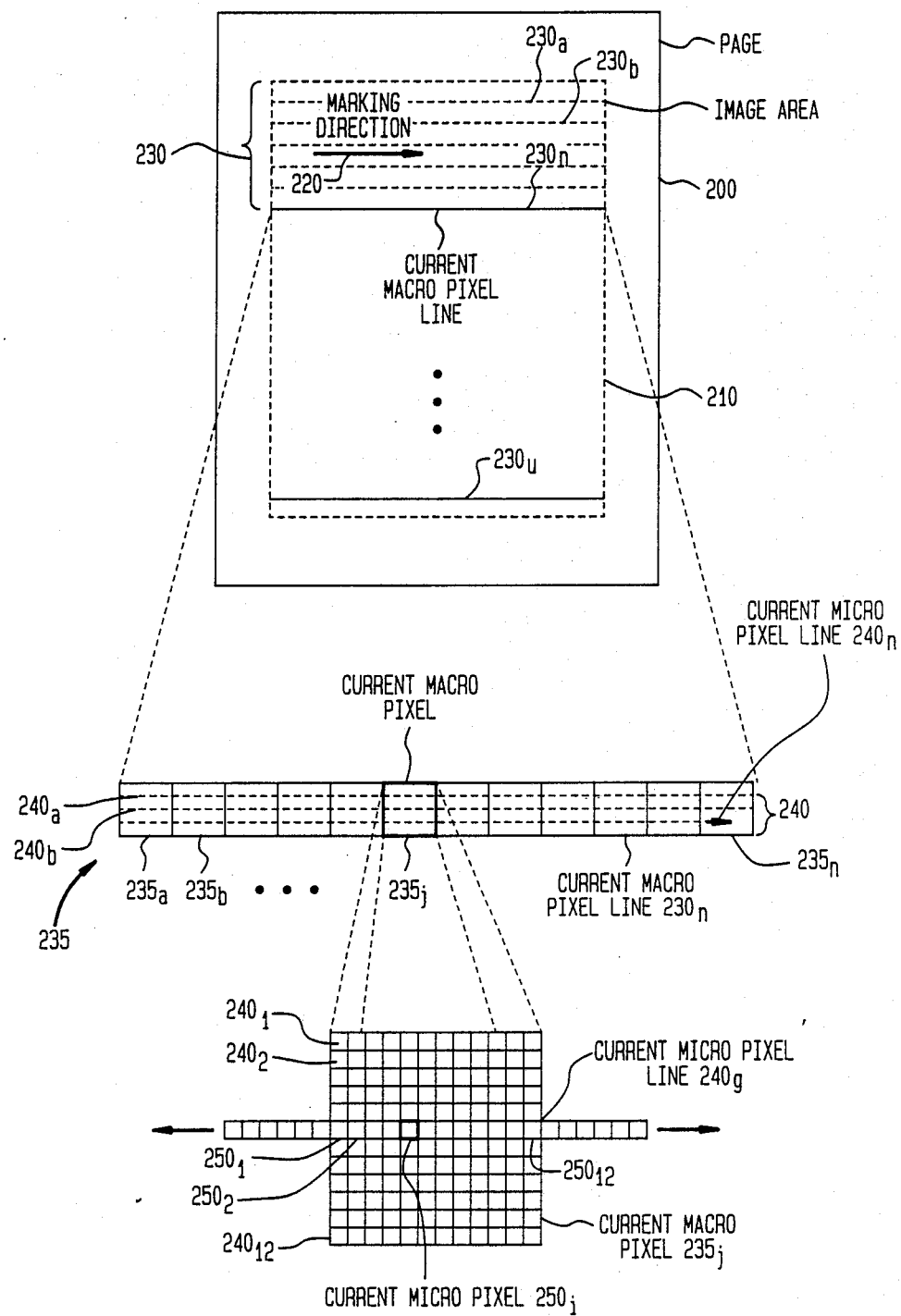
FIG. 2 diagrammatically shows the relationship existing among a image printed by marking engine 20 shown in FIG. 1, a macro pixel line (macro raster) and a micro pixel line (micro raster) occurring within the image.

As depicted in FIG. 2, a printed image produced by the marking engine is composed of horizontal macro pixel lines (macro rasters) 230 which are formed of individual macro pixel lines $230_a$, $230_b$, . . . , $230_u$ that completely fill image area 210 on page 200. The image line currently being printed by the marking engine is shown as line $230_n$. Each macro pixel line is formed of individual macro pixels $235_a$, $235_b$, . . . , $235_n$ that collectively form macro pixels 235. The current macro pixel being generated by the marking engine is shown as macro pixel $235_j$. As noted, each macro pixel is formed of a halftone dot or portions thereof that have a size corresponding to the tonal value of the spatially corresponding contone value in the separation. A marking engine, such as a laser printer, produces writing spots, i.e. micro-pixels, which are much smaller than a halftone dot and that have a uniform size and are situated across each horizontal micro pixel line. With a screen ruling of 150 dots/inch and a writing pitch of 1800 spots/inch, 12 micro rasters, specifically micro pixel lines (micro rasters) $240_1, 240_2, \ldots, 240_{12}$ that collectively form micro pixel line 240, fill each macro raster in the printed image. The current micro raster being generated by the marking engine is shown as micro raster $240_g$. For ease of illustration, each micro pixel in FIGS. 2 and 3 is shown as being square instead of circular, even though the latter is typically produced by the marking engine. Thus, each macro pixel, such as current macro pixel $235_j$, contains a square matrix of micro pixels each of which, when printed, is either dark or light based upon the value of the bit corresponding to that micro pixel and supplied by screener 30 (see FIG. 1). Micro pixel line $240_g$ situated within macro pixel $235_j$ contains micro pixels 250 which are formed by individual micro pixels $250_1, 250_2, \ldots, 250_{12}$ with the micro pixel currently being written on this raster represented by micro pixel $250_i$. The micro pixels situated on micro pixel line $250_i$ and located to either side of current macro pixel $235_j$ form corresponding parts of a micro pixel line that extends through macro pixels situated on either side of the current macro pixel.

Figure 3C:
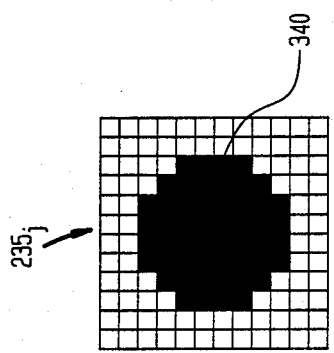
FIGS. 3A-3C collectively depict the formation of an illustrative bit-mapped halftone dot pattern from a circular contone halftone dot pattern.
Figure 3B:
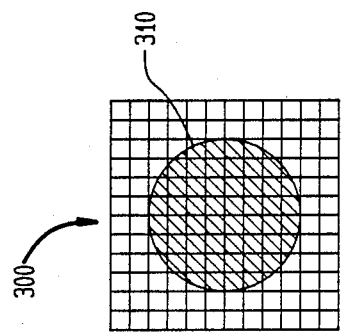
Figure 3A:
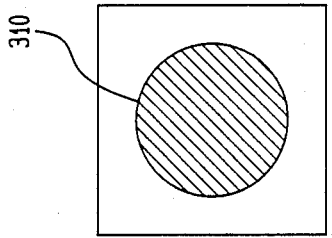

Now, to generate an appropriately sized halftone dot for any macro pixel, the screener provides an appropriate pattern of darkened micro pixels within that macro pixel that collectively forms the halftone dot. This is evident in FIGS. 3A-3C which collectively show the formation of an illustrative bit-mapped halftone dot pattern from a circular contone halftone dot pattern. In particular, assume for the moment that circular halftone dot 310, which corresponds to a particular contone value shown in FIG. 3A, is to be generated within current macro pixel $235_j$. To provide an appropriate bit-mapped pattern, 12 by 12 grid 300 of micro pixels, as shown in FIG. 3B, is superimposed over dot 310. By darkening the appropriate micro pixels that are completely situated within circular halftone dot 310, bit-mapped halftone dot (micro pixel pattern) 340, appearing in FIG. 3C, results. As discussed detail below, a separate corresponding micro pixel pattern (hereinafter referred to as a "reference cell") is stored within the screener for each different contone value, i.e. from binary value "0" for a 0% dot to binary value "255" for a 100% dot.

Figure 4A:
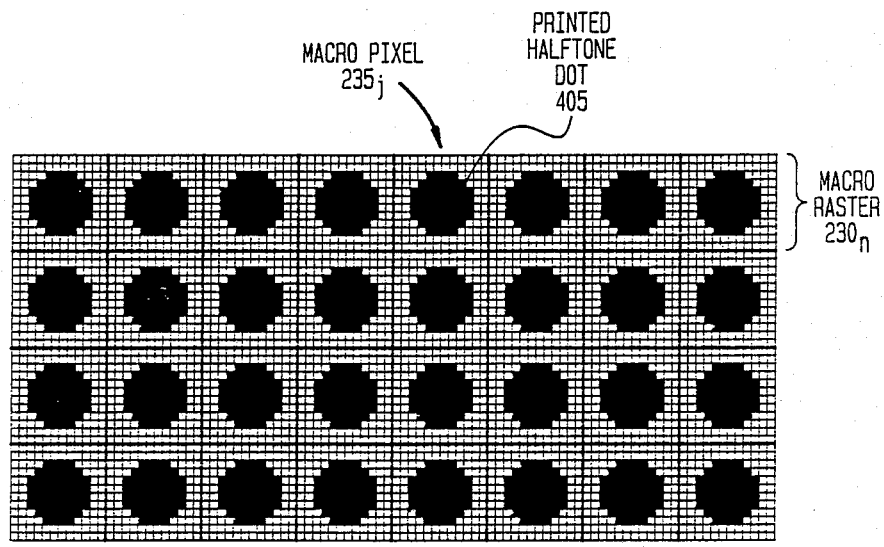
Figure 4B:
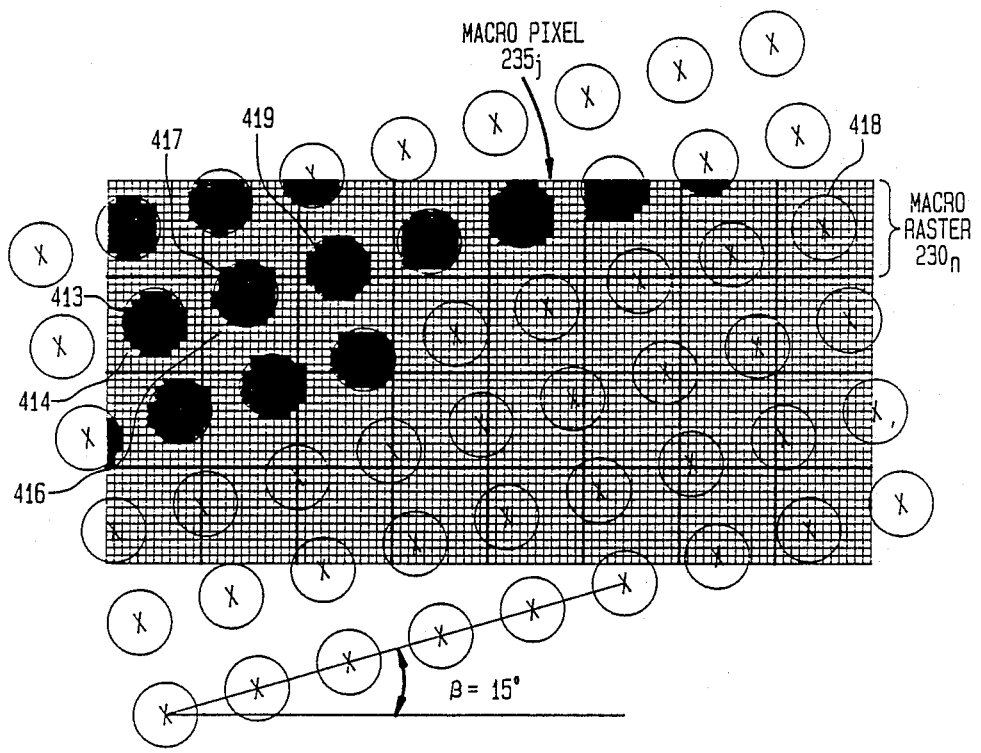

As the screen angle changes for an image area having a uniform tonal value, the screened halftone dots appearing in this area that are produced by the marking engine are not only rotated through the screen angle but also, the position of the center of a dot within any macro pixel changes between adjacent macro pixels. This is clearly shown in FIGS. 4A and 4B which show circular halftone dot patterns for a constant tonal area and the underlying micro pixel patterns that form these dots and are written by the marking engine for a screen angle of zero and 15 degrees. Specifically, for a zero screen angle as shown in FIG. 4A, all the halftone dots produced by the marking engine are substantially identical to printed halftone dot 405 and are each centered at the same location within its corresponding macro pixel, e.g. macro pixel $235_j$ for halftone dot 405. For a 15 degree screen angle with respect to the horizontal axis, as shown in FIG. 4B, each reference halftone dot is shown as a circle with an "X" marking its center location and the actual printed micro pixel patterns for several of these dots being shown as blackened. The remaining reference halftone dots, such as dot 418, and portions thereof that overlay the macro pixels would also be printed; however, their corresponding micro pixel patterns have not been darkened to clearly show the individual micro pixels that would be used to form these dots and dot portions. As is clearly evident from the figure, the center location of each printed angled halftone dot within its corresponding macro pixel varies between adjacent macro pixels. Specifically, the micro pixel location of the center of printed halftone dot 413 within macro pixel 414 is not the same as the micro pixel location of the center of printed halftone dot 417 within macro pixel 416. This variation results from the angled orientation of the reference halftone dots that form any angled screen line with respect to the horizontal micro rasters produced by the marking engine. In addition, since the center of each angled reference halftone dot is not always centered over the center location of a corresponding micro pixel, a slightly different configuration of micro pixels will be circumscribed by a reference halftone dot from one halftone dot to the next. Consequently, the shape of each printed halftone dot changes slightly from dot to dot, e.g., such as between printed halftone dots 413 and 417, and 417 and 419.

The movement of the center of each printed angled halftone dot produced by the marking engine is particularly evident when elliptical halftone dot reference patterns are used in lieu of circular halftone dot reference patterns. In that regard, FIGS. 4C-4E show various halftone dot patterns produced by marking engine 20 on a printed image for a constant tint area in a color separation using an elliptical halftone dot reference pattern oriented at a screen angle of zero, 15 or 45 degrees. Specifically, a elliptical halftone dot generated at a zero screen angle would, as shown in FIG. 4C when printed, generate dot 423, with its constituent micro pixels, such as micro pixel (writing spot) 429, produced by the marking engine being shown as darkened circles. This figure shows the elliptical reference and associated printed micro pixel patterns for a constant tonal area containing three such halftone dots. Due to the zero screen angle, all three halftone dot patterns would be positioned at the same location within corresponding macro pixels. For 15 and 45 degree screen angles, the screened elliptical reference halftone dots would respectively resemble dots 433 and 435 shown in FIG. 4D for a 15 degree screen angle and dots 453 and 455 shown in FIG. 4E for a 45 degree screen angle with the associated micro pixel patterns produced by the marking engine in both instances shown as darkened circles.

Figure 5:
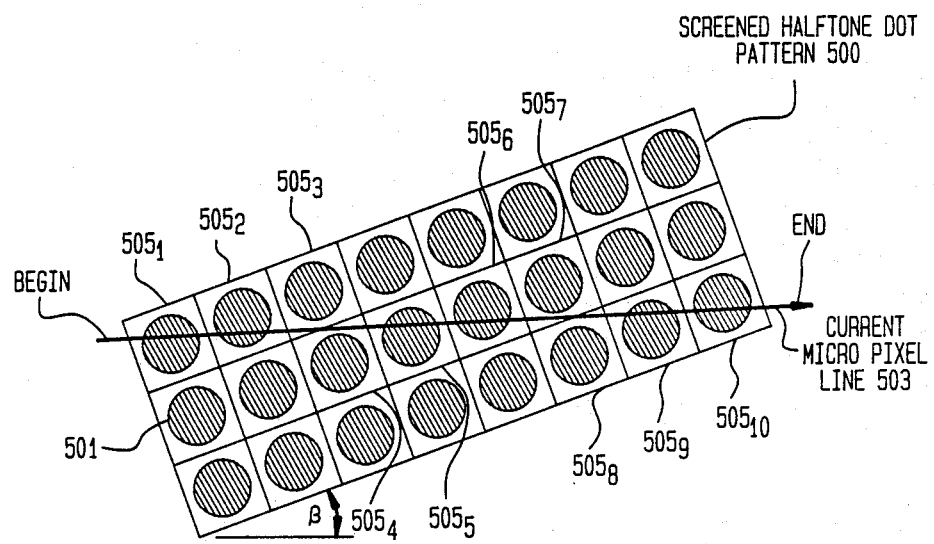
FIG. 5 shows the portions of individual circular halftone dots written by marking engine 20 for a segment of a single micro raster with a 15 degree screen angle for a constant tint area in a color separation.

At this point, the discussion will now describe the manner through which the bit-mapped micro pixel patterns are generated by screener 30 for each halftone dot. As noted, the marking engine only produces horizontal micro rasters of darkened micro pixels. FIG. 5 essentially shows which portions of individual halftone dots, appearing in a constant tint area of a color separation and produced at a set screen angle, would be written by the marking engine on a segment of a single micro raster. To simplify this figure, the printed dots are shown as being smoothly circular rather than quantized. As shown, written screened halftone dot pattern 500, only a small portion of which is depicted, is inclined at approximately a 15 degree screen angle to micro raster line segment 503. All of the halftone dots shown in screen, such as dot 501, are identical and hence possess the same contone value. For a 15 degree screen to be written, micro raster segment 503 would traverse through ten halftone cells located on screened halftone dot pattern 500, namely: halftone cells $505_1$, $505_2$, $505_3$, $505_4$, $505_5$, $505_6$, $505_7$, $505_8$, $505_9$ and $505_{10}$. Micro pixels situated on this micro raster segment would be darkened whenever this micro raster, beginning with halftone dot cell $505_1$ ending with halftone dot cell $505_{10}$, intersects with each corresponding halftone dot itself that lies within that cell. As a result, micro pixel segment 503 would contain alternating dark and light groups of micro pixels with the length of each dark group being governed by the corresponding distance that the segment traverses through a corresponding screened halftone dot.

Rather than traverse through separate stored halftone dot patterns for ten separate halftone dot cells to determine the constituent micro pixels in each cell, a single cell possessing a bit-mapped halftone dot pattern of a specific size, i.e. the reference cell, can be repeatedly traversed by an angled micro raster to yield the desired number of printed halftone dots across a printed image. With such arrangement, a sampling line, i.e. a single angled micro raster segment (a "vector"), intersects a cell wall at a starting point, traverses the cell at the screen angle and finally intersects the cell boundary at an exit point. The point situated on the wall of the reference cell directly opposite to the exit point becomes the entry point for the continuation of this sampling line (vector), and so on. An output bit is generated by the screener, particularly screener 30 in FIG. 1, for marking engine 20 whenever the current sampling line that traverses through the reference cell encounters, at its current sampling point, a micro pixel that lays within the reference halftone dot pattern. Once the last sampling point on the sampling line has been reached, sampling begins along a new sampling line for micro pixels situated along the next micro raster. As discussed below, a new sampling point is generated along the current sampling line for every successive micro pixel that is situated along a corresponding micro raster. As explained in detail below, the screen ruling, writing pitch and screen angle collectively determine the lineal distances that exist between successive sampling positions located along each sampling line and between adjacent sampling lines.

Figure 6:
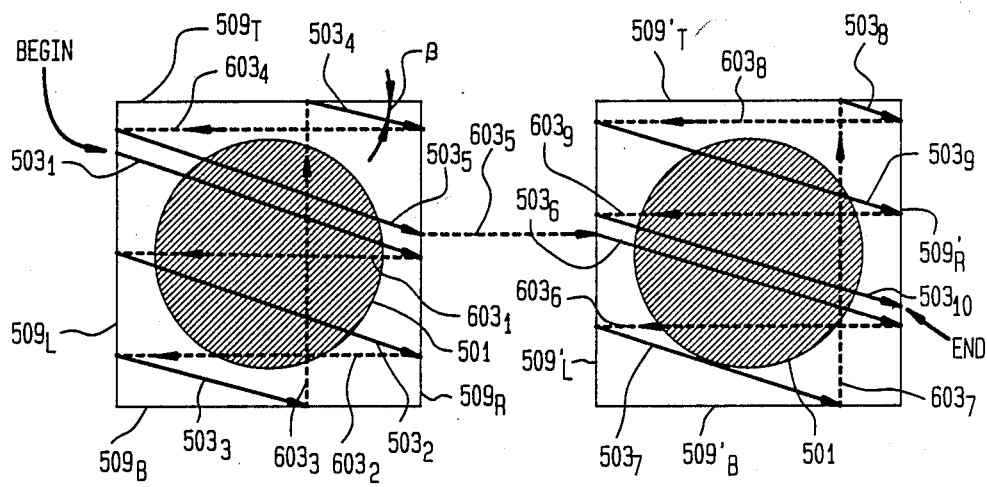
FIG. 6 shows the manner in which a halftone reference cell is sampled to generate the individual halftone dot portions for the micro raster segment shown in FIG. 5.

FIG. 6 shows a global view of this vector based sampling process and illustratively for micro raster segment 503 shown in FIG. 5. For purposes of clarity, the left side of FIG. 6 shows the resultant cell produced by successively
the first five halftone dot cells, i.e. cells $505_1$, $505_2$, $505_3$, $505_4$ and $505_5$ shown in FIG. 5, onto reference cell 509; while the right side of FIG. 6 shows the resultant cell produced by successively superposing the last five halftone dot cells, i.e. cells $505_6$, $505_7$, $505_8$, $505_9$ and $505_{10}$ shown in FIG. 5, onto reference cell 509'. Both cells 509 and 509' represent the same cell but with different superposed sampling line segments. These cells have top, bottom, right and left walls respectively designated $509_T$, $509_B$, $509_R$ and $509_L$ for cell 509; and $509'_T$, $509'_B$, $509'_R$, and $509'_L$, cell 509'. Now, as shown in the left side of FIG. 6, sampling line segment $503_1$ enters the reference cell at a point labelled "BEGIN" on left cell wall $509_L$ and traverses downward across the reference cell at the screen angle $\beta$ to opposite right cell wall $509_R$. The shaded area collectively represents those micro pixels that form reference halftone dot pattern 501. Once sampling line segment $503_1$ reaches right cell wall $509_R$, the starting position for the next sampling line segment, i.e. for halftone dot cell $505_2$ (see FIG. 5), is, as shown in FIG. 6, the point situated directly opposite on left cell wall $509_L$, as indicated by dashed line $603_1$. Once this starting point has been determined, sampling line segment $503_2$ traverses through the cell. In a similar fashion for cell 509, sampling line segments $503_3$, $503_4$ and $503_5$ are successively generated and traverse through the reference cell with their starting points determined by dashed lines $603_2$, $603_3$ and $603_4$. Once sampling line segment $503_5$ reaches right cell wall $509_R$, sampling begins again, as indicated by dashed line $603_5$, at an appropriate location on left wall $509'_L$ of cell 509' and continues along sampling line segment $503_6$. Thereafter, sampling occurs along sampling lines $503_7$, $503_8$, $503_9$ and $503_{10}$ with the location of the starting points for these sampling line segments given by the intersection of dashed lines $603_6$, $603_7$, $603_8$ and $603_9$ with corresponding cell walls. Once sampling line segment $503_{10}$ reaches right cell wall $509'_R$ at a point thereon labelled "END", sampling ceases at which time all the darkened micro pixels that lay on micro raster segment 503 (see FIG. 5) will have been provided to the marking engine.

Figure 7A:
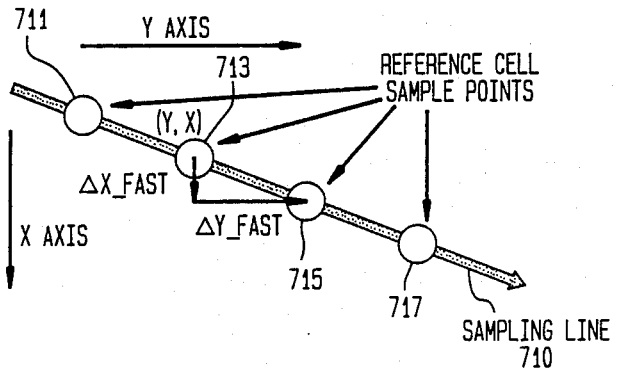
FIGS. 7A and 7B graphically show the manner in which sampling positions located within a reference cell are incremented between adjacent sampling points and between adjacent sampling lines, respectively, to yield an angled grid of sampling points.

In contrast to many digital screeners known in the art, screener 30 does not rely on the use of a stored screen pattern. Instead, the screener implements a desired screen pattern as a result of the particular manner in which each sampling point located in a grid, oriented at a desired screen angle, is selected from a reference cell. In this regard, FIGS. 7A and 7B graphically show the manner in which sampling positions located within a reference cell are incremented along a sampling line and from one sampling line to the next, respectively, to yield an angled grid of sampling points. As shown in FIG. 7A, current sampling line 710 (shown as a vector) traverses through a reference cell in the direction indicated and samples the contents of that cell at sampling points 711, 713, 715 and 717. Given the coordinate values (Y,X) at point 713, the location of the next point to be sampled, i.e. sampling point 715, is given by: (Y+$\Delta Y_{FAST}$, X+$\Delta X_{FAST}$) where $\Delta Y_{FAST}$ and $\Delta X_{FAST}$ (the fast scan increments) are incremental orthogonal components of the inter-sample distance occurring along the sampling line, i.e. the fast scan direction. The ratio of $\Delta X_{FAST}$ to $\Delta Y_{FAST}$ is the tangent of the screen angle ($\beta$) with their relative size determining the screen ruling. The locations of sampling points 715 and 717 are determined by similarly incrementing the coordinate values of sampling points 713 and 715, respectively, by the fast scan increments. Whenever a micro raster, i.e. a sampling line, hits or runs past a reference cell wall, then the digital values for the current position along the sampling line are merely allowed to rollover in order to generate the proper starting position on the opposite cell wall.

Figure 7B:
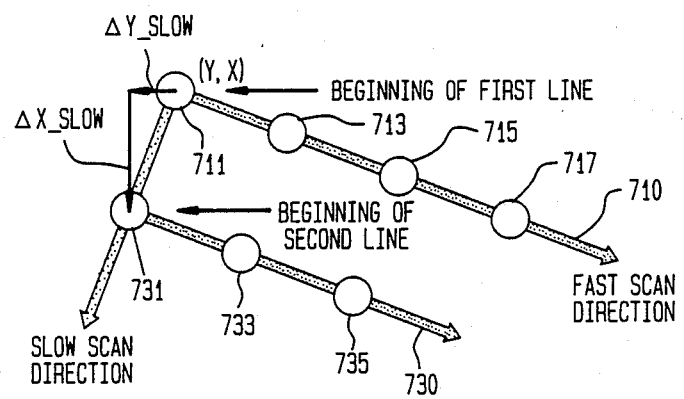

Now, whenever a micro raster has completely traversed from one side of the image to the other, the location of the starting point for the next sampling line must be determined. This is shown in FIG. 7B. Once the current sampling position has reached the end of sampling line 710, the starting position for the next sampling line, i.e sampling line 730 (also shown as a vector), is determined, as shown in FIG. 7B, by adding appropriate slow scan increments to the coordinate values (Y,X) of starting point 711 on line 710. Specifically, inasmuch as movement from one sampling line to the next occurs much slower than movement between adjacent sampling points along any sampling line, inter-sampling line movement is referred to as the slow scan direction. Hence, the starting position for sampling line 730, i.e. the coordinates of sampling point 731, is given by: $(Y+\Delta Y_{SLOW}, X+\Delta X_{SLOW})$ where $\Delta Y_{SLOW}$ and $\Delta X_{SLOW}$ (the slow scan increments) are incremental orthogonal components of the distance taken along the slow scan direction between corresponding starting points of adjacent sampling lines. Once the coordinates of point 731 are determined and the reference cell has been sampled thereat, the coordinates of subsequent sampling points 733 and 735 are determined by successively incrementing the coordinates of sampling point 731 by the fast scan increments. Sampling proceeds in this manner throughout the entire image being screened so as to yield a grid of sampling points oriented at the desired screen angle to the horizontal axis of the reference cell.

The values of the fast and slow scan increments $\Delta Y_{FAST}$, $\Delta X_{FAST}$, $\Delta Y_{SLOW}$ and $\Delta X_{SLOW}$ are determined through the following equations:

$$\Delta Y_{FAST} = 2^N \frac{S}{r} \sin(\beta) \quad (1)$$

$$\Delta X_{FAST} = 2^N \frac{S}{r} \cos(\beta) \quad (2)$$

$$\Delta Y_{SLOW} = 2^N \frac{S}{r} \sin(-\beta) \quad (3)$$

$$\Delta X_{SLOW} = 2^N \frac{S}{r} \cos(-\beta) \quad (4)$$

where:
N equals the resolution in bits, here 16, of an integer word;
S is the value of the screen ruling in lines/inch, here illustratively 150;
r is the number of micro rasters/inch in the printed image, here illustratively 1800; and
$\beta$ is the screen angle in degrees.

The following table lists typical values of fast and slow scan increments $\Delta Y_{FAST}$, $\Delta X_{FAST}$, $\Delta Y_{SLOW}$ and $\Delta X_{SLOW}$ for screen rulings of 65, 85, 100, 120, 133 and 150 and for screen angles of $-15$, 0, 15 and 45 degrees using the illustrative values given above for the coefficients N, S and r.

TABLE 1

| Screen Angle | Increment | Fast and slow scan increment values Screen Ruling | | | | | |
| --- | --- | --- | --- | --- | --- | --- | --- |
| | | 150 | 133 | 120 | 100 | 85 | 65 |
| −15° | $\Delta Y_{FAST}$ | 5275 | 4677 | 4220 | 3517 | 2989 | 2286 |
| | $\Delta X_{FAST}$ | 64123 | 64283 | 64405 | 64594 | 64735 | 64923 |
| | $\Delta Y_{SLOW}$ | 1413 | 1253 | 1131 | 942 | 801 | 613 |
| | $\Delta X_{SLOW}$ | 5275 | 4677 | 4220 | 3517 | 2989 | 2286 |
| 0° | $\Delta Y_{FAST}$ | 5461 | 4842 | 4369 | 3641 | 3095 | 2367 |
| | $\Delta X_{FAST}$ | 0 | 0 | 0 | 0 | 0 | 0 |
| | $\Delta Y_{SLOW}$ | 0 | 0 | 0 | 0 | 0 | 0 |
| | $\Delta X_{SLOW}$ | 5461 | 4842 | 4369 | 3641 | 3095 | 2367 |
| 15° | $\Delta Y_{FAST}$ | 5275 | 4677 | 4220 | 3517 | 2989 | 2286 |
| | $\Delta X_{FAST}$ | 1413 | 1253 | 1131 | 942 | 801 | 613 |
| | $\Delta Y_{SLOW}$ | 64123 | 64283 | 64405 | 64594 | 64735 | 64923 |
| | $\Delta X_{SLOW}$ | 5275 | 4677 | 4220 | 3517 | 2989 | 2286 |
| 45° | $\Delta Y_{FAST}$ | 3862 | 3424 | 3089 | 2574 | 2188 | 1673 |
| | $\Delta X_{FAST}$ | 3862 | 3424 | 3089 | 2574 | 2188 | 1673 |
| | $\Delta Y_{SLOW}$ | 3862 | 3424 | 3089 | 2574 | 2188 | 1673 |
| | $\Delta X_{SLOW}$ | 61674 | 62112 | 62447 | 62962 | 63348 | 63863 |

For a given screen ruling and number of micro rasters/inch, a table similar to Table 1 but with entries for all permissible screen angles is stored within host computer 40 (see FIG. 1). Prior to the initiation of a screening run, a table look up operation is performed to access the entries which are, in turn, loaded into screener 30, as described below. In the event the screen ruling or the number of micro rasters/inch change, then a new table will be calculated by and stored within the host computer for subsequent access.

Because of the above-described movement of the center locations of the printed halftone dots, with a variation in the screen angle, relative to the micro rasters, the vector based method shown in FIG. 7 of locating each successive sampling point within a reference cell is used in lieu of just rotating a halftone dot pattern stored within a reference cell and printing the rotated pattern centered within a corresponding macro pixel.

As will readily become apparent below, selecting the particular one out of 256 different reference cells that is to be sampled at any one time is simply governed by the particular contone value associated with the current macro pixel being printed by the marking engine. As such, throughout the screening process, the sampling positions are calculated essentially totally independently of the selection of the appropriate reference cell. This, in turn, permits highly efficient pipelined processing to occur which substantially increases the speed at which the screener can operate.

C. Screener 30

Now, having completed the discussion of the fundamentals of screening as they pertain to screener 30, the discussion will turn to specific aspects of the screener.

1. Overview of processing undertaken within Screener 30

Figure 8:
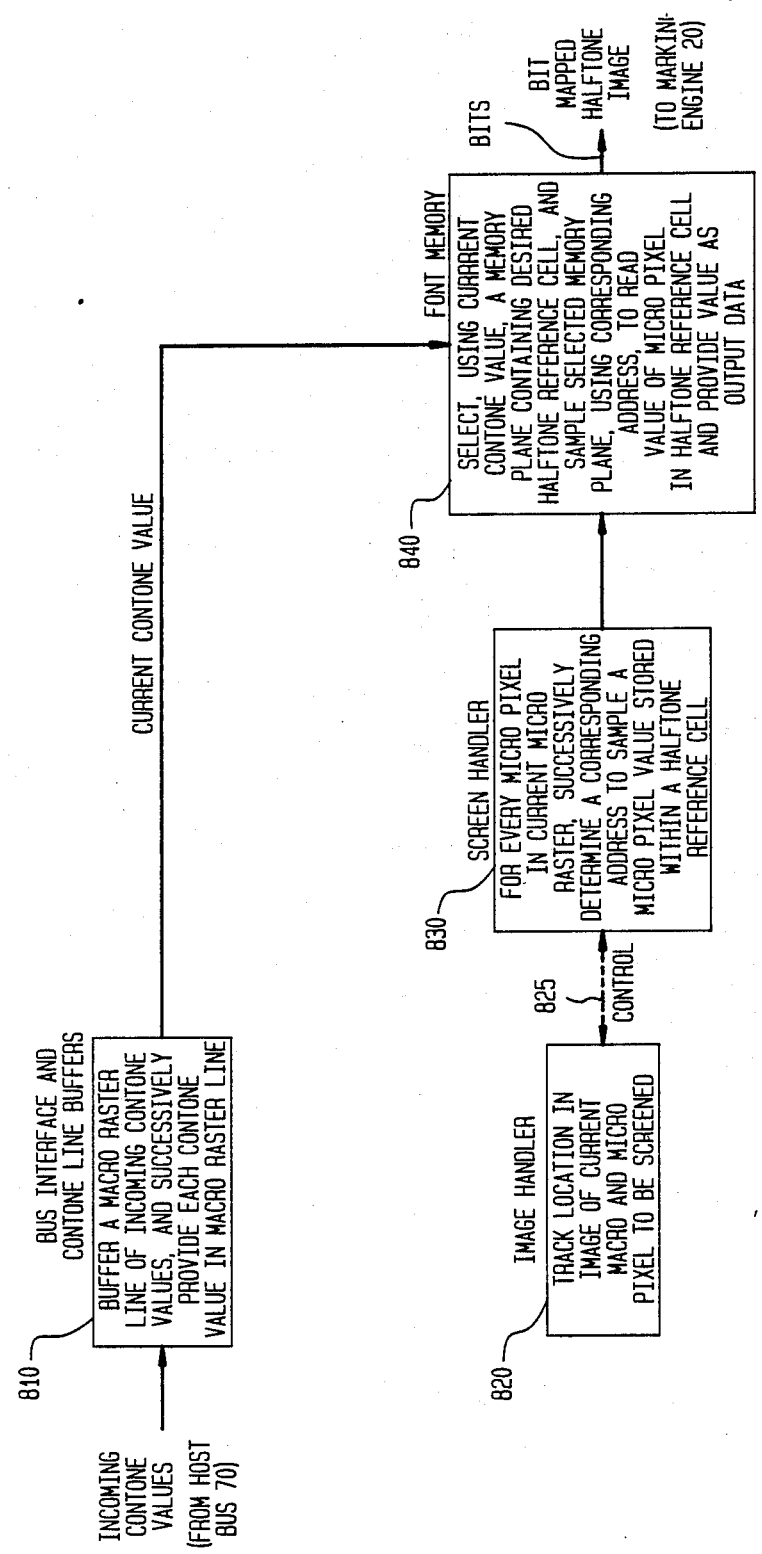
FIG. 8 shows a block diagram of the basic steps performed by screener 30 shown in FIG. 1.

As discussed, the essentially total separation within screener 30 of the process of selecting an appropriate reference cell from the process of determining the current sampling positions within that cell advantageously permits parallel pipelined operation. This operation is evident in FIG. 8 which shows the basic steps performed by the screener. Specifically, as shown by block 810, a Bus Interface and Contone Line Buffer circuit (circuit 910 in FIG. 9) buffers a line of incoming contone values and thereafter provides each value in that line as an output value to a font memory in order to print a corresponding screened halftoned dot. Coincident with the provision of each of these contone values, an Image Handler circuit (circuit 930 in FIG. 9) generates, as shown by block 820 in FIG. 8, the macro pixel address associated with that contone value and also tracks the address of the current micro pixel being generated within the printed image. The Image Handler provides appropriate status signals, shown by dashed lines 825, that signify that the last contone value in a macro raster and/or in the entire printed image has been generated and hence screening for the next macro raster should commence or, if the entire image has been screened, screening should halt. Simultaneously with the operations indicated by block 820, a Screen Handler circuit (circuit 950 in FIG. 9) generates, as shown by block 830 in FIG. 8, a succession of sampling positions (addresses), with one address for each micro pixel, at which a reference cell is to be sampled for each micro raster appearing in the printed image. The operations in blocks 820 and 830 continue independently of each other until the entire image has been screened. The resulting contone value resulting from the Bus Interface and Contone Line Buffer circuit and the sampling address generated by the Screen Handler circuit are collectively used to form a memory address to a Font Memory circuit (circuit 970 in FIG. 9) to respectively and simultaneously select, as indicated by block 840 in FIG. 8, a specific reference cell and access a particular bit within that cell. The contone value is used to select a desired one of 256 reference cells while the sampling address selects a micro pixel within that cell. The value of the resulting accessed bit forms a part of a bit-mapped image that is to be printed by the marking engine 30. Hence, the value of this bit is provided as an output bit to marking engine 30. Inasmuch as the steps performed by blocks 820 and 830 occur in parallel, screener 30 operates in a highly efficient pipelined manner with the capability of processing substantial amounts of image data at a very high speed. Consequently, screener 30 provides a significantly increased throughput of screened images over the use of screening techniques known in the art.

Figure 9:
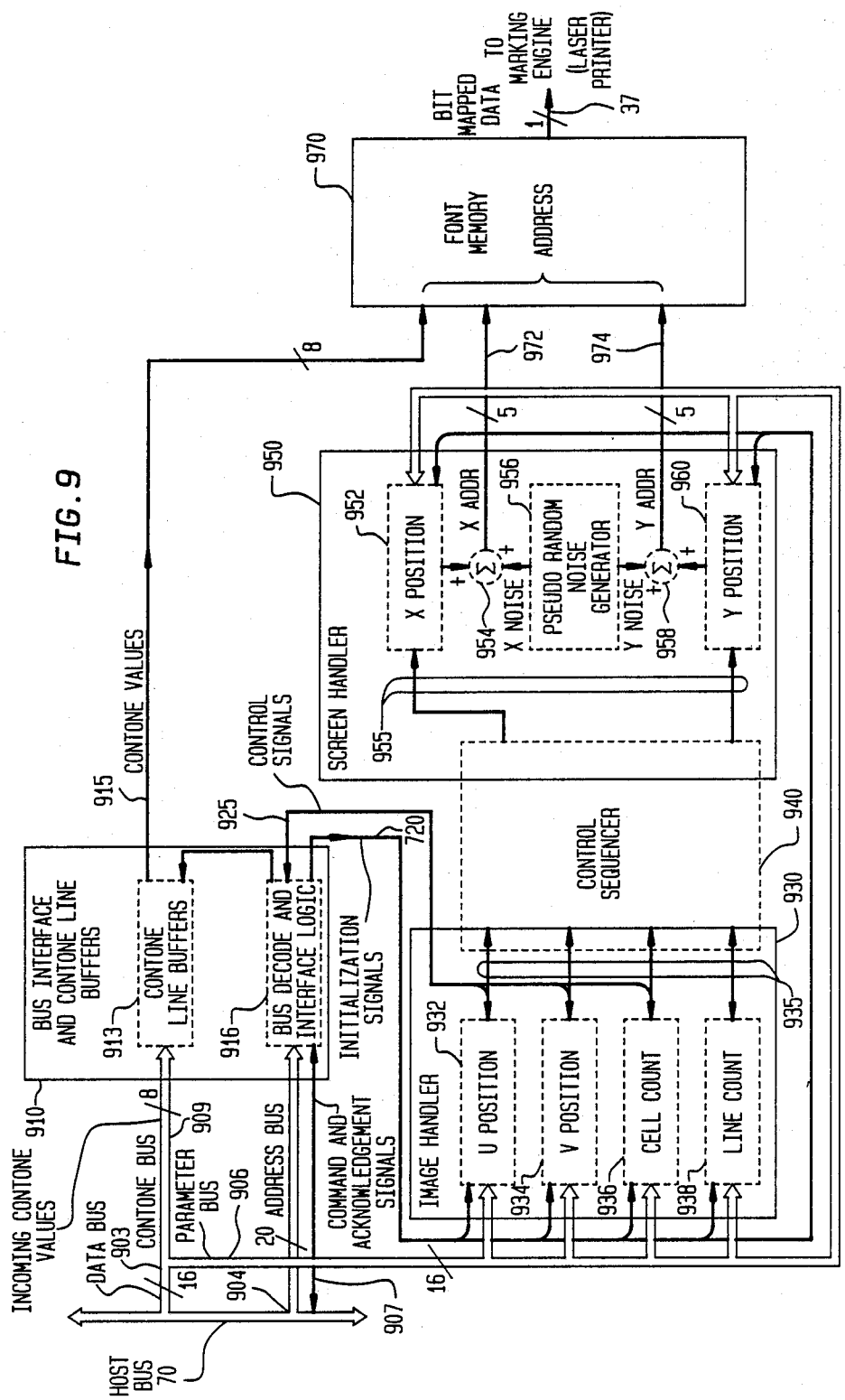
FIG. 9 depicts a basic block diagram of the circuitry used in screener 30 shown in FIG. 1.

FIG. 9 depicts a basic block diagram of the circuitry used in screener 30 shown in FIG. 1. Screener 30 is formed of Bus Interface and Contone Line Buffers 910, Image Handler 930, Screen Handler 950 and Font Memory 970. The screener is interfaced to host bus 40 through data bus 903, address bus 904 and leads 907 which carry various command and acknowledgement signals. Bus Interface 910 contains contone line buffers 913 and bus decode and interface logic 916. As noted above, these line buffers store an incoming line of eight bit contone values and successively provide each of these values over leads 915 to font memory 970 for use in selecting a reference cell. To increase throughput, contone line buffers 913 contain two identical line buffers, specifically FIFO (first in first out) arrays 9131 and 9135 shown in FIGS. 11A-11G, which operate in a "ping-pong" manner. In particular, one line (macro pixel line) of eight bit contone values is written, via contone bus 909, into one of the buffers, via a DMA operation supervised by host computer 40 (see FIG. 1), while a line of contone values that have been previously stored in the other buffer is being written from the latter buffer to the font memory. Once these operations are concluded, the individual buffers reverse their roles for the next incoming line of contone values, and so on for each successive line. As will be discussed and as noted above, screener 30 contains various parameter registers that need to be initialized with appropriate values prior to initiating a screening run. Each of these registers appears as a separate address on address bus 904. Data for these registers appears on sixteen bit parameter bus 906 which is connected to data bus 903. The lower eight bits of data bus 903 form contone bus 909. Bus decode and interface logic 916 generates appropriate initialization, specifically control, signals over leads 920 to each of the registers for selectively instructing that register to load a value then appearing on the contone bus. In addition, bus decode and interface logic 916 controls, in response to control (i.e. register overflow and terminal count) signals appearing on leads 925, the operation of contone line buffers 916 and also generates appropriate command signals over leads 907 to instruct the host computer to write contone values into an appropriate FIFO within contone line buffers 913.

Image Handler 930, as discussed above, generates the macro pixel address associated with a contone value presently appearing on leads 915, also tracks the address of the current micro pixel being generated within the printed image and provides the control signals appearing on leads 925. Specifically, the image handler contains four register circuits 932, 934, 936 and 938 that respectively track current values of parameters U POSITION, V POSITION, CELL COUNT and LINE COUNT. CELL COUNT register circuit 936 maintains a count (CELL COUNT) of the current macro pixel cell within a macro raster that is presently being screened. LINE COUNT register circuit 938 maintains a count (LINE COUNT) of the current macro raster within the entire image being screened. When the values of LINE COUNT and CELL COUNT reach their respective terminal counts, as specified by appropriate values loaded into these register circuits by host computer 40 (see FIG. 1) during initialization, then the entire image has been screened.

U POSITION and V POSITION register circuits 932 and 934 respectively maintain the current slow scan coordinate (U POSITION) of the current micro pixel raster being produced by the marking engine within a current macro pixel and the fast scan coordinate (V POSITION) of the specific micro pixel being produced on that micro raster. Inasmuch as these two register circuits produce 16 bit values and macro pixels are dimensionally square, both the width and height of a macro pixel are scaled to a maximum integer value of "65,536". Whenever the value of parameter V POSITION reaches its terminal count and register circuit 934 produces an overflow signal (V OVERFLOW) on leads 925 and 935, a macro pixel cell boundary is about to be crossed by a micro raster thereby necessitating that the value of the parameter CELL COUNT must be incremented and the next successive contone value must be supplied by contone line buffers 916 onto leads 915. Whenever the value of parameter CELL COUNT reaches its terminal count, CELL COUNT register circuit 936 produces a terminal count pulse (CELL CTR TC) on leads 925 and 935 to specify that the last macro pixel in the current macro raster is being processed and screening for the current micro raster is to halt after the next overflow produced by V POSITION register circuit 934. Whenever parameter U OVERFLOW reaches its terminal count thereby indicating that the current macro raster line has been just been screened, register circuit 932 produces an overflow signal (U OVERFLOW) on leads 925 and 935 to specify that the FIFOs within buffers 916 are to switch functions and generate the next line of contone values over leads 915. At this point, the value of parameter LINE COUNT would be incremented. Once the value of parameter LINE COUNT reaches its terminal value and register circuit 938 produces a terminal count pulse (LINE CTR TC) on leads 935, screening is to halt after the next overflow produced by U POSITION register circuit 932.

The incremental values added to the contents of the U POSITION and V POSITION register circuits are respectively defined as $\Delta U_{REF}$ and $\Delta V_{REF}$ which are determined in accordance with the following equation:

$$\Delta U_{REF} = \Delta V_{REF} = 2^N \frac{R}{r} \qquad (5)$$

where: R is the number of macro rasters/inch in the continuous tone image, here illustratively 300, and equal to twice the screen ruling.

Prior to the initiation of a screening run, host computer 40 (see FIG. 1) calculates the values of these increments and respectively loads these values into U POSITION and V POSITION register circuits 932 and 934. If desired, the values of these increments can be changed by host computer 40 during a screening run to dynamically vary the horizontal and/or vertical writing pitches and thereby produce, with properly shaped halftone dots, an anamorphic change in the screened image size. However, it will be assumed hereinafter that these increments remain fixed during a screening run in order to simplify the following discussion.

Control sequencer 940, which is illustratively a programmable logic array (PAL), is connected through leads 935 to the overflow and terminal count signals produced by register circuits 932, 934, 936 and 938. In response to these overflow signals, control sequencer 940 first determines when the end of each micro raster is reached. Once this occurs, the control sequencer will then generate appropriate control signals through leads 935 to: temporarily halt the screening process, whenever a macro raster is crossed instruct the FIFOs in contone line buffers 913 to switch functions, cause appropriate ones of register circuits 932, 934, 936 and 938 to properly increment their contents and finally restart and control the screening process to handle the next micro raster. Leads 925 are connected to corresponding leads within leads 935; as such, U OVERFLOW, V OVERFLOW and CELL COUNT signals appearing on leads 925 are those that appear on leads 935.

Screen Handler 950, as discussed above, keeps track of where to sample a reference cell by generating a succession of addresses at which a reference cell is to be sampled for each micro raster appearing in the printed image. The screen handler contains X POSITION and Y POSITION register circuits 952 and 960, pseudo random noise generator 956 and adders 954 and 958. X POSITION register circuit 952 and Y POSITION register circuit 960 respectively maintain the current values of parameters X POSITION and Y POSITION. These values are used, as set forth below, as the incremented orthogonal coordinates for the next sampling point in the reference cell. Control sequencer 940 generates appropriate control signals, as described below, over leads 955 to X POSITION and Y POSITION register circuits 952 and 960 to suitably cause each of these circuits to properly increment its contents at the appropriate times during the course of traversing a sampling line. In addition, as discussed below, a certain amount of noise is added to these values to produce the X and Y addresses (X ADDR and Y ADDR) which are supplied to font memory 970.

In particular, I have observed that screener induced Moire patterns occur due to the superposition of two spatially sampled matrices. Upon further investigation, I have discovered, as described in detail below, that these Moire patterns predominantly arise from sampling of a periodic pixel placement error function. Specifically, any reference cell within the font memory holds discrete data, specifically in a 32 by 32 grid. This grid is sampled in a discrete grid like manner. Therefore, a periodic spatial mis-alignment will occur between the center of each micro pixel within a reference cell, as would be printed by the marking engine, and the address boundaries of each sampling point used to sample the reference cell. These boundaries result from the limited resolution inherent in the sampling address. Now, if a writing beam in the marking engine could be dithered on a two dimensional basis at each sampling point by an amount equal to the width between the address boundaries for each micro pixel, then the pixel placement error would be smoothed out over the written micro pixels and pixel placement error induced Moire would be substantially eliminated. Unfortunately, this technique is complex, time consuming and hence quite impractical. Therefore, in accordance with the teachings of my invention, I have recognized that screener induced Moire patterns can also be substantially reduced by adding an amount of random noise having a properly scaled uniform probability distribution to each of the addresses held in the X POSITION and Y POSITION register circuits and using the resultant values as the X and Y addresses (X ADDR and Y ADDR) to the reference cell. Adding such an amount of noise is sufficient to break the symmetry of the sampling grid so as to substantially suppress the amplitude of any screener induced Moire patterns that would otherwise be generated but is not enough to inject any distinct artifacts into the screened image.

With this in mind, pseudo random noise generator 956 generates two separate three bit pseudo random noise values that are respectively combined in adder 954 with the current value of X POSITION and in adder 958 with the current value of Y POSITION to generate micro pixel addresses X ADDR and Y ADDR on address leads 974 and 972. As such, an 18 bit address is applied to font memory 970. This address consists of addresses X ADDR and Y ADDR which collectively form 10 bits of address and the current 8 bit contone value appearing on leads 915. As noted, the current contone value selects a particular one of 256 reference cells with the X ADDR and Y ADDR values selecting a particular sampling point located within that reference cell. Inasmuch as the accessed bit from font memory 970 forms part of the bit-mapped image to be printed, the value of this bit is provided, via lead 37, to marking engine 30.

2. Font Memory 970

Figure 10:
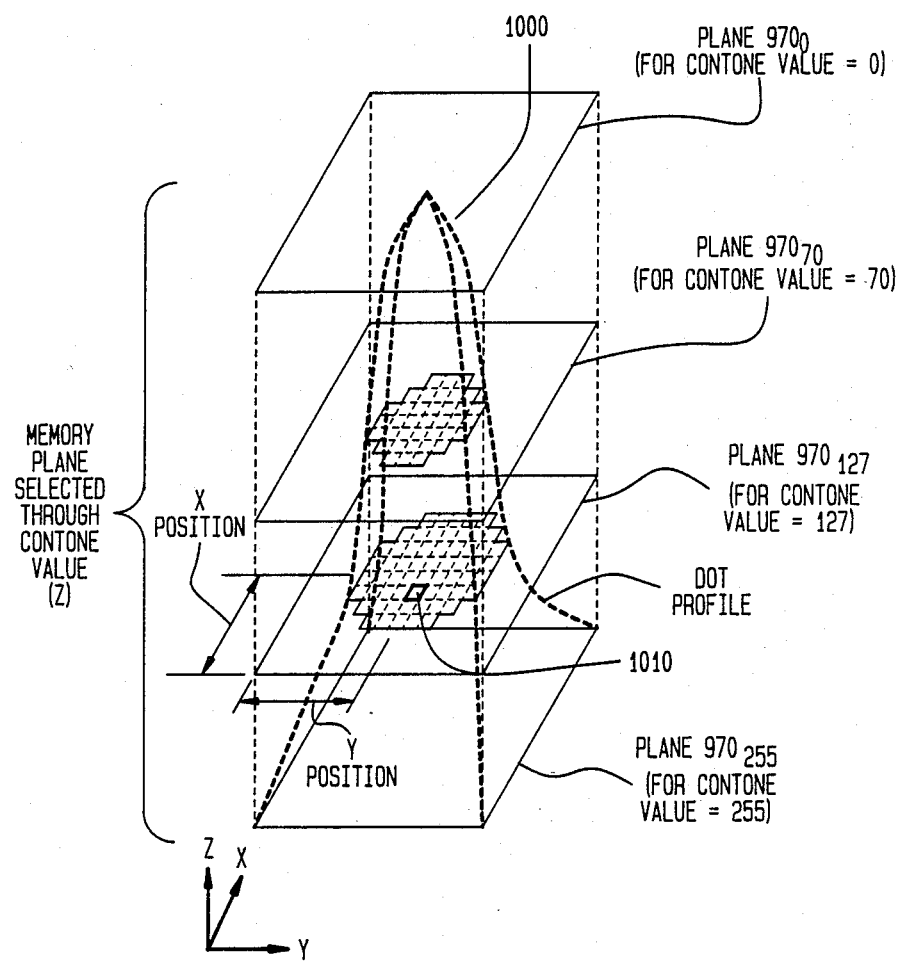
FIG. 10 diagrammatically depicts the organization and contents of one embodiment of Font Memory 970 shown in FIG. 9.
Figure 11B:
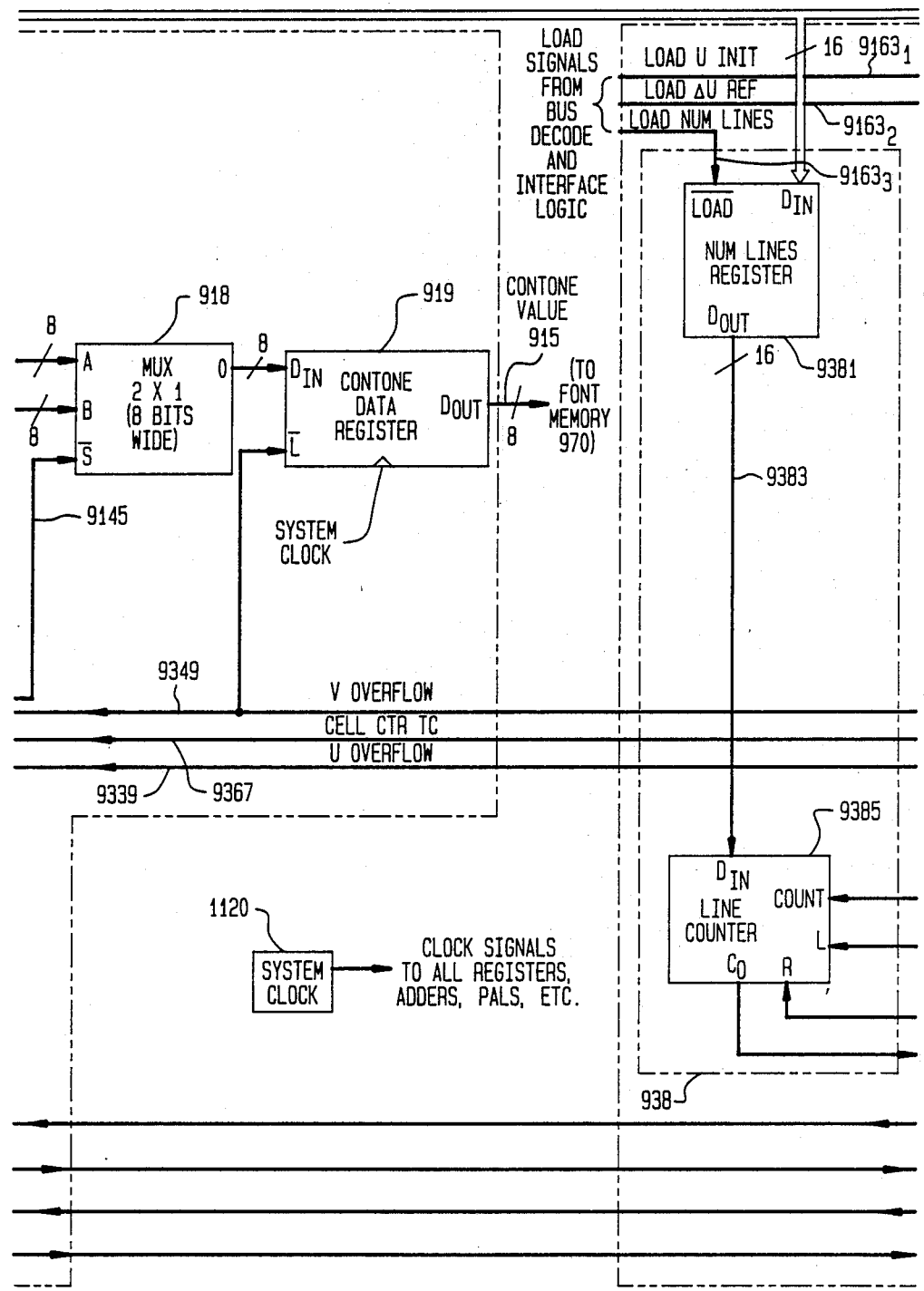
Figure 11C:
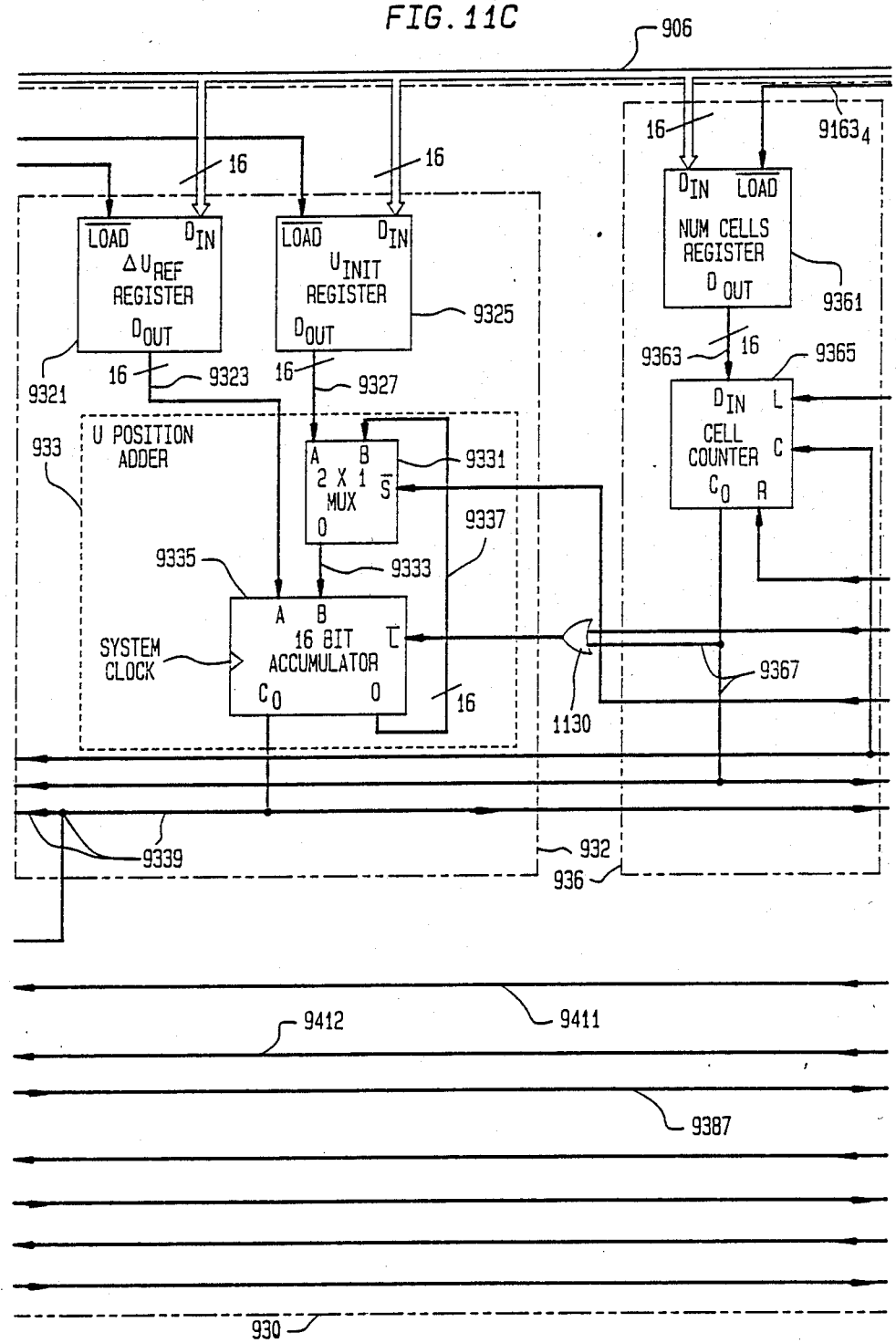
Figure 11D:
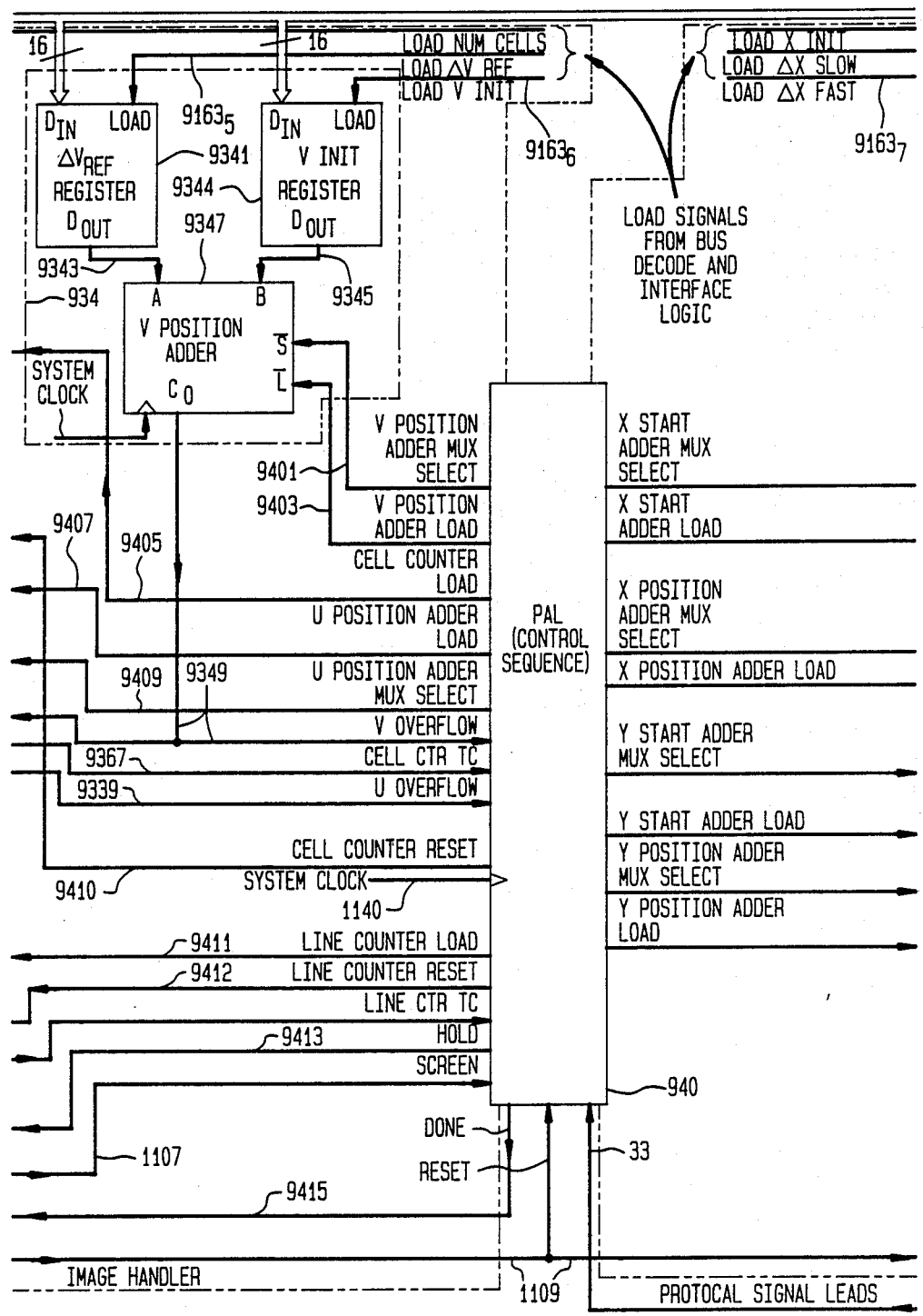
Figure 11E:
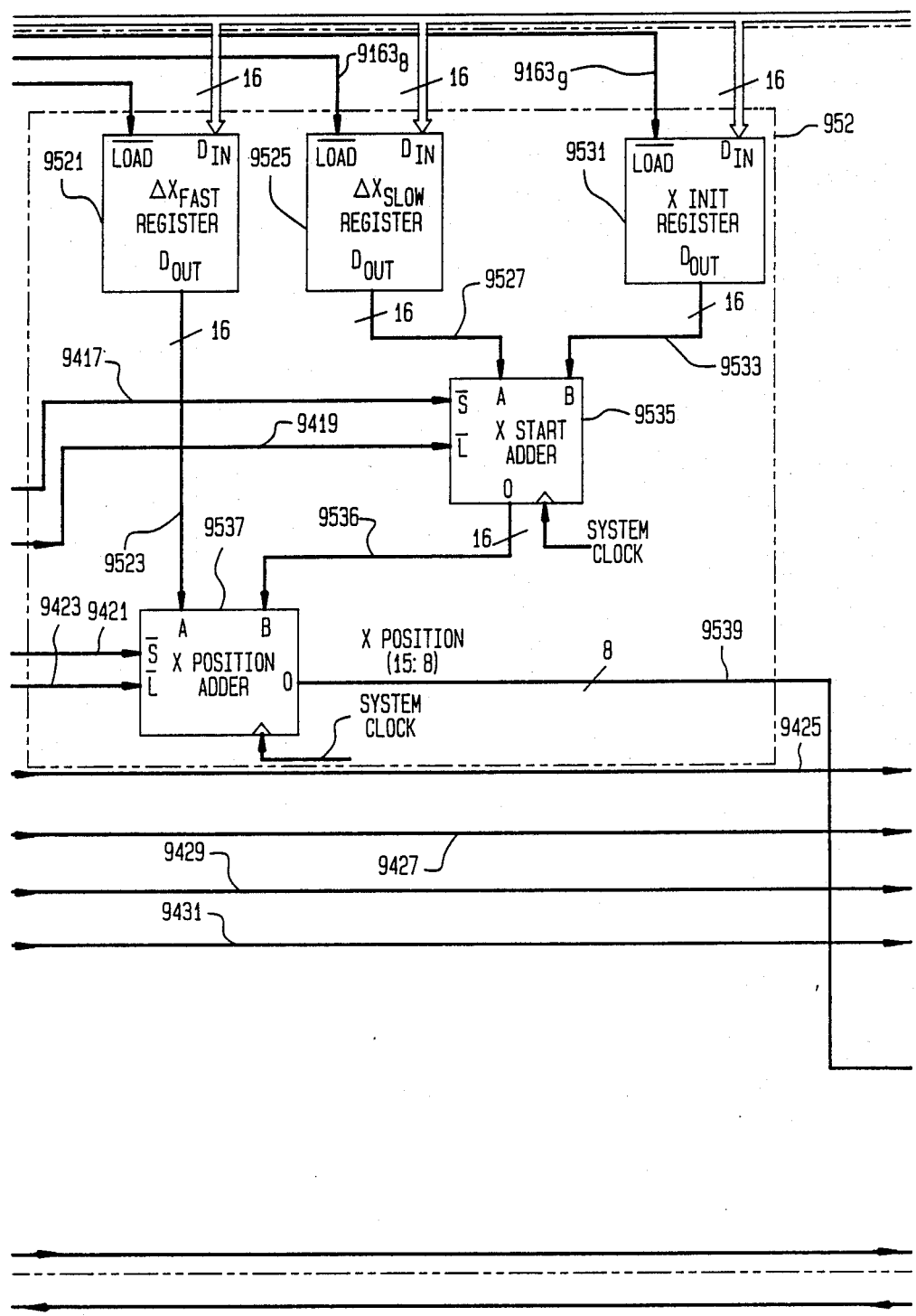
Figure 11F:
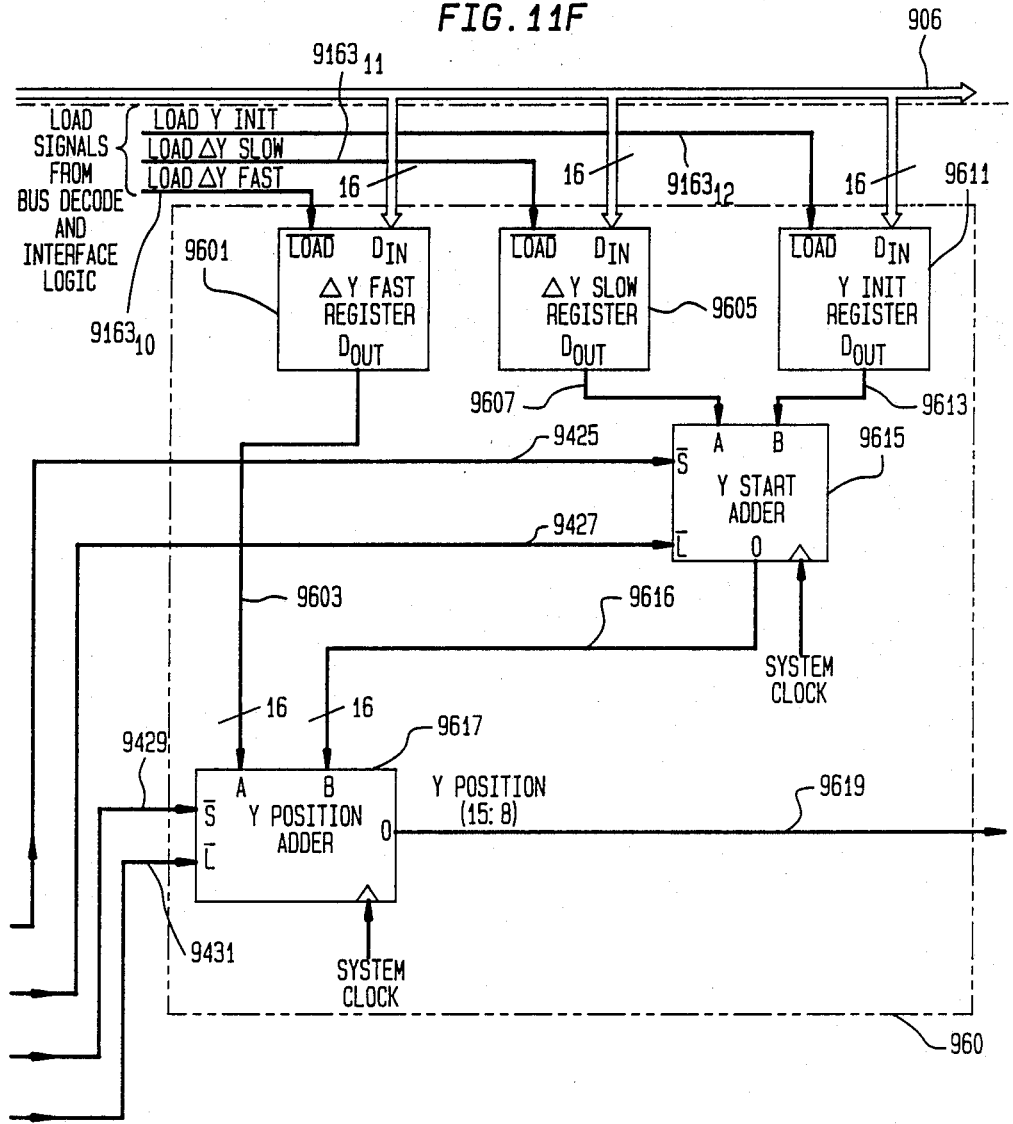
Figure 11F:
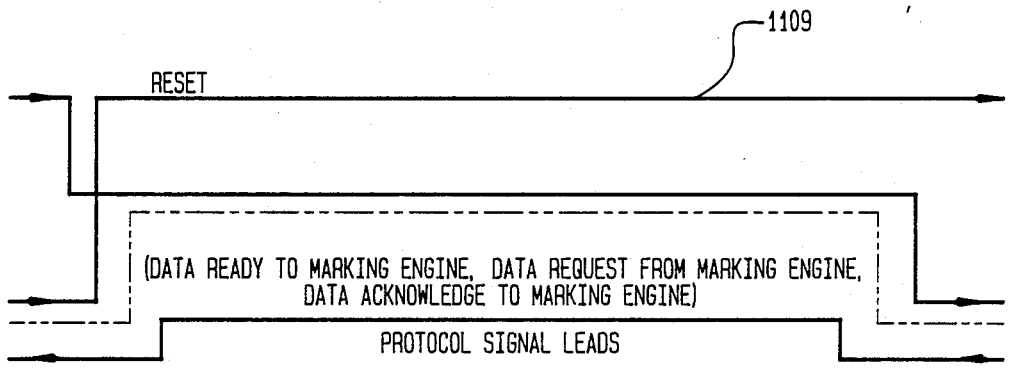
Figure 11G:
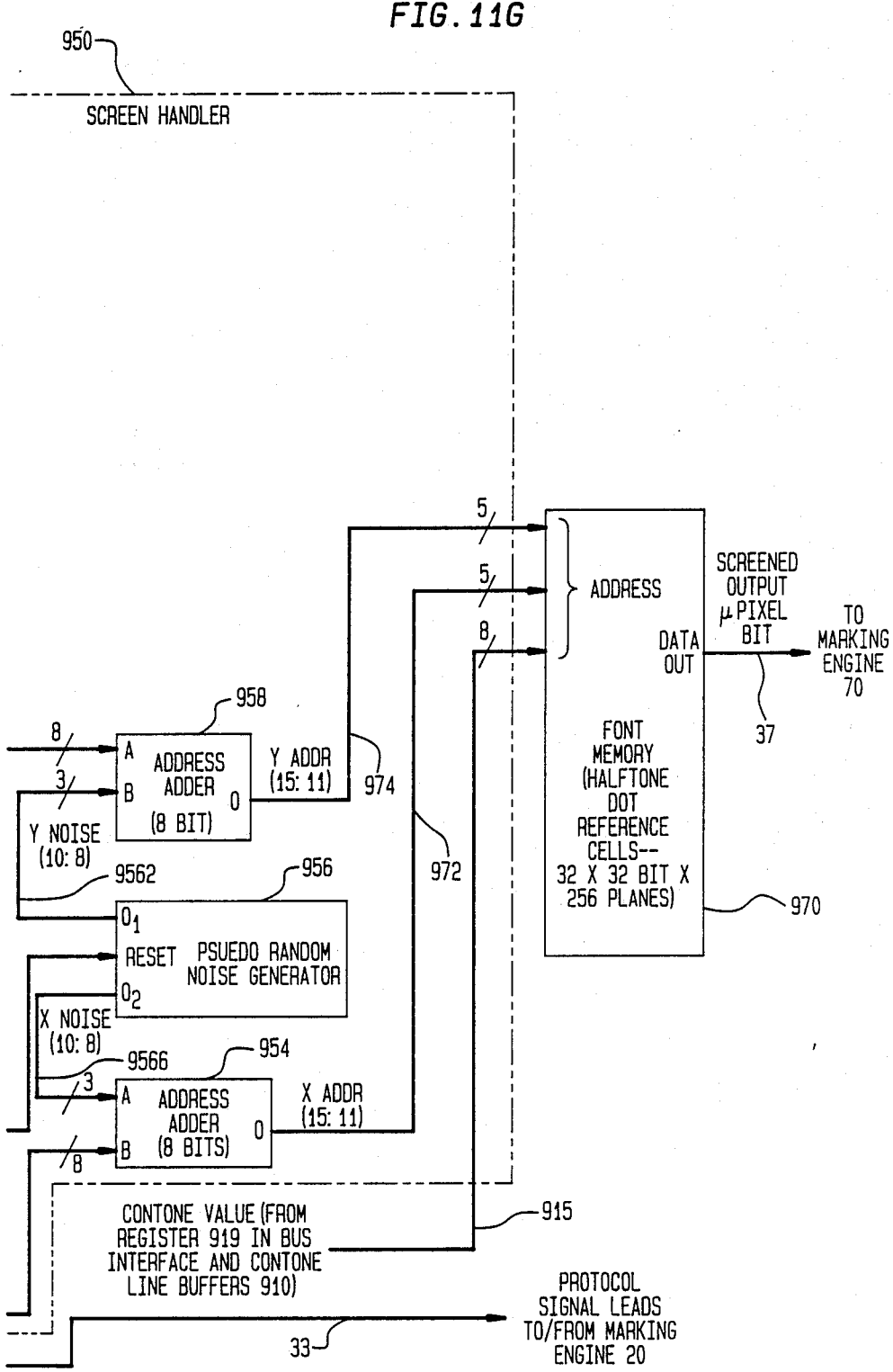

FIG. 10 diagrammatically depicts the organization and contents of one embodiment of Font Memory 970 shown in FIG. 9. As shown and previously discussed, font memory 970 contains 256 separate memory planes, specifically memory planes $970_0, \ldots 970_{127}, \ldots 970_{255}$ as shown in FIG. 10. Each plane contains a 32 by 32 array with a pre-defined bit-mapped image (font) for a different corresponding reference halftone dot size. As noted, the current contone value selects a particular one of 256 reference cells (in the Z direction), such as reference cell $970_{127}$, with the X ADDR and Y ADDR values selecting (in the X and Y directions) a particular micro pixel, such as micro pixel 1010, located within that reference cell. The size of the bit-mapped image in any memory plane is defined by the area of intersection of that plane with three dimensional pre-defined monotonically varying dot profile 1000. The dot profile begins in plane $970_0$ which corresponds to a 0% dot, i.e. no pixels are darkened in this plane, extends through plane $970_{127}$ that corresponds to a 50% dot where a centrally located cluster of 512 pixels in the shape of a dot shown by cross-hatching would be darkened, to finally memory plane $970_{255}$ that corresponds to a 100% dot where all 1024 pixels shown by cross-hatching would be darkened. The particular organization of font memory 970, when actually implemented, may vary somewhat from that shown in FIG. 10 based upon the cost, internal organization and access speed of the individual memory circuits that will be used to form the font memory.

Use of such memory resident fonts in an electronic screener is advantageously far more flexible than use of calculated fonts, which is taught in the art. For example, although each font is preferably in the shape of a centrally located dot, the font can be readily altered through the storage of a different bit-mapped pattern to be any different desired shape. In contrast, calculating certain shapes is disadvantageously often a time intensive operation not suited for real time applications. In fact, the shape of the individual stored patterns can be different, even radically so if desired, from each other. Moreover, the resulting profile associated with the patterns stored in all the reference cells is not limited to being monotonically varying, as is the case for thresholding systems known in the art. Instead, through use of memory resident fonts, the profile can fold back on itself at any desired location(s). As such, a 30% contone value can produce a dot that resembles a centrally located annulus (light central area) while an 80% value can produce a centrally located fully darkened dot. Other patterns dictated by a particular printing application can clearly be stored in the reference cells and subsequently produced. For example, pre-defined patterns of "round" dots can be stored within the reference cells for subsequent use in creating borders of constant tonal value. Alternatively, a suitable dither pattern, for use in direct printing such as on a photographic film, can be substituted for the halftone dot pattern stored in each of the reference cells. Through use of a dither pattern, a portion of a relatively large though coarse dot can be produced by the marking engine.

3. Screener Hardware a. Detailed Block Diagram of Screener 30

A detailed block diagram of the circuitry used in screener 30, shown in FIG. 1, is depicted in FIGS. 11A–11G, for which the correct alignment of the drawing sheets for these figures is shown in FIG. 11.

As shown and discussed above, screener 30 is formed of bus interface and contone line buffers 910, image handler 930, control sequencer 940, screen handler 950 and font memory 970. In addition, screener 30 includes system clock 1120 which provides clock signals to all the clocked components in the screener, e.g. registers, adders and counters and programmable logic arrays to synchronously control their operation. The system clock frequency is illustratively 18 MHz. The clock signal connections have been omitted from several of these components in order to simplify FIGS. 11A–11G; however, these connections would be readily apparent to those skilled in the art. To simplify the following discussion, the specific temporal operation of the PALs and their associated control states and signals will be not be discussed in detail at this point but will be deferred to the discussion of FIGS. 12A, 12B, 13A and 13B below. In addition to the use of highly efficient pipelined processing to provide very high speed operation, as discussed above, integer math is exclusively used throughout the screener to further increase processing speed.

As discussed previously, the overall purpose of bus interface and contone line buffers 910 is to provide a stream of contone values to font memory 970 in order to select the appropriate memory plane (reference cell) therein to screen each macro pixel. Bus interface and contone line buffers 910 essentially contain bus decode and interface logic 916, line buffers 913 formed of FIFO arrays 9131 and 9135, DMA Controller 914, eight bit multiplexor 918 and eight bit contone data register 919. As noted, FIFO arrays 9131 and 9135, each of which is illustratively a 4K by 8 bit RAM array, respectively store even and odd lines of incoming eight bit contone values and operate in a "ping-pong" configuration. In operation, as described in detail below in conjunction with FIGS. 12A and 12B, these FIFOs simultaneously write and store a line of incoming contone values from host bus 70. One FIFO writes while the other reads. The specific function provided by each FIFO changes at the conclusion of each macro raster. The operation of the FIFOs is controlled by DMA Controller 914 which is preferably implemented using a programmable array logic (PAL) circuit. Bus decode and interface logic 916 controls the initialization of each of the parameter registers located within the screener and also addresses the specific FIFO into which contone values are to be written by the host computer.

Specifically, screener 30 is interfaced to electronic image processing system 10 (see FIG. 1) through host bus 70. This bus, as shown in FIGS. 11A–11G, contains sixteen bit data bus 903, twenty bit address bus 904, bus command leads 1101, bus command acknowledge lead 9162, I/O WRITE lead 1115, DMA REQUEST 0 and DMA REQUEST 1 leads 9142 and 9144, DMA ACKNOWLEDGE 0 and DMA ACKNOWLEDGE 1 leads 1103 and 1105, SCREEN command lead 1107, DONE signal lead 9415, and POWER ON (BUS) RESET signal lead 1109. Data bus 903 splits into two busses: the full sixteen bit data bus becomes sixteen bit parameter bus 906 which is connected to a sixteen bit data input ($D_{in}$) of each of the twelve parameter registers, and the low order eight bits of the data bus becomes contone bus 909 which is connected to the eight bit data input of each of the FIFOs.

Prior to initiating a screening run, as discussed below, the host computer will initialize one or more of the parameter registers. In addition, during initialization, the host computer will write the first line of contone values into FIFO 9135. However, subsequently, during a screening run, the host computer will only write complete lines of contone values into alternate FIFOs and will generally not change the values stored in any of the parameter registers unless a dynamic change in horizontal and/or vertical writing pitch or screen angle is desired, as discussed above. Now, in general, to initialize any such parameter register or write contone data into either FIFO, the host computer will first apply an appropriate initialize command, that specifies a parameter register or FIFO load operation, onto bus command leads 1101. This command is then routed to bus decode and interface logic 916. Simultaneously therewith, the host computer will also supply an appropriate address onto address bus 904 to identify the desired FIFO or parameter register into which new data is to be written. Thereafter, the host computer will apply the desired data onto data bus 903 and a negative going write pulse to I/O WRITE lead 1115 thereby causing the data to be written into the desired FIFO or parameter register. Specifically, in response to both the initialize command and the address supplied by the host computer, logic 916 first acknowledges their receipt to the host computer by issuing a suitable command acknowledge signal onto lead 9162. Substantially coincident with this acknowledge signal, logic 916 places a low level on a corresponding one of active low select leads 9165. The specific lead that is asserted low is governed by the address then appearing on the address bus. Each of the select leads 9165, specifically leads (Sel1 not) $9165_1$, (Se12 not) $9165_2$, (Se13 not) $9165_3$, (Se14 not) $9165_4$, ..., (Sel14 not) $9165_{14}$, is correspondingly connected to an input of OR gate 9168 for FIFO 9135, OR gate 9167 for FIFO 9131, or OR gates $9165_3$, $9165_4$, ... $9165_{12}$ for OR gates $9160_1$, $9160_2$, $9160_3$, ..., $9160_{12}$, the latter twelve OR gates collectively forming OR gates 9160. The I/O WRITE signal appearing on lead 1101 is applied, via lead 1115, to the other input of each of these fourteen OR gates. The outputs of OR gates 9167 and 9168 are routed to active low write inputs of FIFOs 9131 and 9135, respectively, to control the writing of contone data into each of these FIFOs. The output of each of OR gates 9160 is routed over a corresponding one of leads 9163 to an active low load input of a corresponding parameter register: LOAD U INIT lead $9163_1$ for U INIT register 9325, LOAD $\Delta U_{REF}$ lead $9163_2$ for $\Delta U_{REF}$ register 9321, LOAD NUM LINES lead $9163_3$ for NUM LINES register 9381; LOAD NUM CELLS lead $9163_4$ for NUM CELLS register 9361; LOAD $\Delta V_{REF}$ lead $9163_5$ for $\Delta V_{REF}$ register 9341; LOAD V INIT lead $9163_6$ for V INIT register 9344; LOAD $\Delta X_{FAST}$ lead $9163_7$ for $\Delta X_{FAST}$ register 9521; LOAD $\Delta X_{SLOW}$ lead $9163_8$ for $\Delta X_{SLOW}$ register 9525; LOAD X INIT lead $9163_9$ for X INIT register 9531; LOAD $\Delta Y_{FAST}$ lead $9163_{10}$ for $\Delta Y_{FAST}$ register 9601; LOAD $\Delta Y_{SLOW}$ lead $9163_{11}$ for $\Delta Y_{FAST}$ register 9605, and LOAD Y INIT lead $9613_{12}$ for Y INIT register 9611. Now, once a particular select lead is asserted low, the host computer will apply both the desired data value onto data bus 903 and an negative going pulse to I/O WRITE lead 1115 thereby writing the contone value or initialization value into the selected FIFO or parameter register, respectively. This process is repeated for each separate data value, whether contone value or initial parameter value, that is being supplied to the screener.

To control the read operation performed by the FIFOs, DMA Controller 914 utilizes as input the status of the V OVERFLOW signal appearing on lead 9349, the CELL CTR TC pulse appearing on lead 9367, the U OVERFLOW signal appearing on lead 9339 and the HOLD signal appearing on lead 9413. In response to the status of these signals, DMA Controller 914 will control which specific FIFO is to read contone data at any given time during a screening run. To read data from FIFO 9131 or 9135, PAL 914 supplies appropriate READ and RETRANSMIT control signals to that FIFOs, specifically READ EVEN and RETRANSMIT EVEN signals, via leads 9141 and 9143, to even FIFO 9131 or READ ODD and RETRANSMIT ODD, via leads 9149 and 9147, to odd FIFO 9135. Now, to specify which specific FIFO is to receive contone information during a screening run, via a DMA process controlled by host computer 40, DMA Controller 914 provides a high level on DMA REQUEST 0 lead 9142 if contone data is to be written into FIFO 9131 or a high level on DMA REQUEST 1 lead if contone data is to be written within FIFO 9135. Corresponding DMA acknowledge signals are provided by the host computer over DMA ACKNOWLEDGE 0 lead 1103 or DMA ACKNOWLEDGE 1 lead 1105. The temporal operation of the READ, RETRANSMIT and DMA REQUEST and DMA ACKNOWLEDGE signals is discussed in detail below in conjunction with FIGS. 12A and 12B which shows the state diagrams implemented within DMA Controller 914.

The contone values provided by the FIFOs are routed over leads 9133 for FIFO 9131 and leads 9137 for FIFO 9135 to respective inputs of 2 by 1 eight bit multiplexor 918. In response to the level of a BANK SELECT signal (also discussed in detail below in conjunction with FIGS. 12A and 12B) appearing on lead 9145 and produced by PAL 914. The level of this signal specifies which FIFO is being read at any given time during a screening run. In response to this signal, the multiplexor routes a eight bit contone value produced by one of the FIFOs to the data inputs of eight bit register 919. The resulting contone value is then loaded into this register at the occurrence of the next V OVERFLOW signal and hence, in turn, supplied over leads 915 as a partial address to font memory 970 for use in screening the macro pixel associated with this contone value.

As discussed above, dot gain compensation is provided by the marking engine. Alternatively, this compensation can be implemented by inserting either a random access or read only memory (not shown but hereinafter referred to as the dot gain memory) in series between multiplexor 918 and register 919 or between this register and font memory 970. The dot gain memory would store one or more pre-defined tables of dot sizes. A desired table would be addressed by the contone value in the separation and would provide a corresponding contone value that has been compensated by a desired amount of dot gain. Each table could provide compensation for a different dot gain profile or a different fixed dot gain value. The particular table could be selected by appropriate signals provided by another parameter register (not shown) that is loaded by the host computer during initialization. As such, during a screening run, the dot gain memory would appropriately modify, typically reduce, through a separate table look-up operation each contone value that will be supplied to the font memory by an associated dot gain value.

As discussed, image handler 930 generates the macro pixel address associated with a contone value presently appearing on leads 915, tracks the address of the current micro pixel being generated within the printed image and generates the V OVERFLOW, U OVERFLOW, CELL CTR TC and LINE CTR TC signals. Specifically, the image handler contains U POSITION register circuit 932, V POSITION register circuit 934, CELL COUNT register circuit 936 and LINE COUNT register circuit 938 that respectively track current values of parameters U POSITION, V POSITION, CELL COUNT and LINE COUNT.

LINE COUNT register circuit 938 contains sixteen bit register 9381 and counter (LINE COUNTER) 9385. The purpose of LINE COUNT register circuit 938 is to track the number of macro rasters that have been screened in the current image and provide a pulse after the last macro raster has been screened. Specifically, register 9381 is loaded during initialization by host computer 40 (see FIG. 1) and via parameter bus 906 with the number of macro rasters, i.e. the value of parameter NUM LINES, that will exist in a screened image. This value will remain in this register and appear at data output ($D_{OUT}$) lines 9383 until subsequently changed by the host computer. Shortly after a screening run begins and before actual screening occurs, Control Sequencer 940, as described in detail below in conjunction with FIGS. 13A and 13B, applies a pulse on LINE COUNTER LOAD lead 9411 which causes the NUM LINES value to be loaded as a terminal count value into counter 9385. This counter contains an internal counter (not shown) which is incremented with every U OVERFLOW pulse applied, via lead 9339, to the COUNT input of counter 9385. Whenever the contents of the internal counter reach the terminal count (NUM LINES) value, i.e. which occurs after the last macro raster in the image has been screened, counter 9385 will produce a line counter terminal count (LINE CTR TC) pulse at its Carry Out ($C_O$) output which, is connected, via lead 9387, to an input of Control Sequencer PAL 940. The internal count is reset (cleared) to zero whenever the Control Sequencer applies a suitable LINE COUNTER RESET pulse to lead 9412.

U POSITION register circuit 932 contains $\Delta U_{REF}$ register 9321, U INIT register 9325 and U POSITION adder 933. The purpose of U POSITION register circuit is to track the current location of a micro raster within a macro raster and with respect to the slow scan, illustratively vertical, direction. Specifically, during initialization, register 9321 is loaded by host computer 40 (see FIG. 1) and via parameter bus 906 with the value of parameter $\Delta U_{REF}$ which represents the scaled incremental distance occurring between successive micro rasters, in the slow scan direction within any macro pixel in a screened image. In addition, during initialization, register 9325 is loaded with the scaled location, i.e. the value of parameter U INIT, of the top of the macro raster. Inasmuch as the relative position is maintained to a 16 bit resolution, the height of a macro pixel is scaled to the decimal value "65,536". The value of parameters U INIT and V INIT are equal and given by the following equation:

$$U\text{ INIT} = V\text{ INIT} = 2^{N-1}\frac{R}{r} \qquad (6)$$

with coefficients N, R and r having the values defined above.

U POSITION adder 933 is a registered adder which contains 2 by 1 sixteen bit multiplexor 9331 and sixteen bit accumulator 9335. Multiplexor 9331, in response to the level of a select signal, specifically the U POSITION ADDER MUX SELECT signal appearing on lead 9407 and produced by Control Sequencer 940, will route either the contents of U INIT register 9325 appearing on leads 9327 or the current output of the accumulator appearing on leads 9337 to one input, specifically input B, of the accumulator. The other input, i.e. input A, of the accumulator is connected, via leads 9323, to the accumulator. Upon receipt of a suitable pulse appearing on the active low LOAD input to the accumulator, the accumulator will add the inputs appearing at its inputs, store the resultant sum in an internal register and apply the sum to its data output pins and therethrough to leads 9337. In this manner, by suitable pulses applied by the Control Sequencer, as discussed below, to the select and load inputs to the adder, the resultant sum produced by the adder, i.e. U POSITION, is initialized during initialization and is then appropriately incremented with each successive micro raster appearing therein. Since V POSITION adder 9347, X START adder 9535, X POSITION adder 9537, Y START adder 9615 and Y POSITION adder 9617 all have substantially the same internal structure as U POSITION adder 933, these five former adders will not be discussed in detail.

Now, whenever accumulator 9335 overflows, i.e. when a micro raster crosses a macro raster boundary in the slow scan direction, the accumulator produces a resultant pulse at its carry out output. This pulse is the U OVERFLOW signal and is connected, via lead 9339 to Control Sequencer 940, to the count input of LINE COUNTER 9385 and to an input of DMA Controller PAL 914. U POSITION adder 933 is loaded by a pulse produced by OR gate 1130 and applied to the load input of accumulator 9335. This gate, with its inputs connected to leads 9367 and 9407, will produce the pulse as the result of either an overflow pulse (CELL CTR TC) produced by CELL COUNT register circuit 936 and appearing on lead 9367 or a U POSITION ADDER LOAD signal appearing on lead 9407 and produced by Control Sequencer PAL 940.

NUM CELLS register circuit 936 contains sixteen bit register 9361 and counter (CELL COUNTER) 9365. The purpose of CELL COUNT register circuit 936 is to track the number of contone values (or macro pixels) that have been screened in a current macro raster and provide a pulse after the last macro pixel in the macro raster has been screened. Specifically, register 9361 is loaded during initialization by host computer 40 (see FIG. 1) and via parameter bus 906 with the number of macro pixels, i.e. the value of parameter NUM CELLS, that will exist across any macro raster in a screened image. This value will remain in this register and appear at data output ($D_{OUT}$) lines 9363 until subsequently changed by the host computer. Shortly after a screening run begins and before actual screening occurs, Control Sequencer 940, as described in detail below in conjunction with FIGS. 13A and 13B, applies a pulse on CELL COUNTER LOAD lead 9405 which causes the NUM CELLS value to be loaded as a terminal count value into counter 9365. This counter contains an internal counter (not shown) which is incremented with every V OVERFLOW pulse applied, via lead 9349, to the COUNT input of counter 9365. Whenever the contents of the internal counter reach the terminal count (NUM CELLS) value, i.e. which occurs after the last macro pixel in a macro raster has been screened, counter 9365 will produce a cell counter terminal count (CELL CTR TC) pulse at its carry out ($C_O$) output which, is connected, via lead 9367, to an input of OR gate 1130, to an input of DMA Controller PAL 914 and to an input of Control Sequencer PAL 940. The internal count is reset (cleared) to zero whenever the Control Sequencer applies a suitable CELL COUNTER RESET pulse to lead 9410.

V POSITION register circuit 934 contains $\Delta V_{REF}$ register 9341, V INIT register 9344 and V POSITION adder 9347. The purpose of V POSITION register circuit is to track the current location of a micro pixel on a micro raster located within a macro raster and with respect to the fast scan, illustratively horizontal, direction. Specifically, during initialization, register 9341 is loaded by host computer 40 and via parameter bus 906 with the value of parameter $\Delta V_{REF}$ which represents the scaled incremental distance in the fast scan direction occurring between adjacent micro pixels located on a micro raster and within a macro pixel. In addition, during initialization, register 9344 is loaded with the scaled location, i.e. the value of parameter V INIT, of the beginning of a micro raster within any macro pixel. Inasmuch as the relative position is maintained to a 16 bit resolution, the width of a macro pixel is scaled to the decimal value "65,536". The value of parameter V INIT is given by equation (6) above. The values of parameters $\Delta V_{REF}$ and V INIT are applied from registers 9341 and 9344, via respective leads 9343 and 9345, to corresponding A and B inputs of V POSITION adder 9347. Through application of suitable pulses from the Control Sequencer, as discussed below, to the select and load inputs to the V POSITION adder, via V POSITION ADDER MUX SELECT lead 9401 and V POSITION ADDER LOAD lead 9403, respectively, the resultant sum produced by the adder, i.e. V POSITION, is initialized during initialization and thereafter at the beginning of every micro raster as it crosses a macro pixel boundary and is then appropriately incremented with each successive micro pixel located on the micro raster and existing within the macro pixel.

Now, whenever V POSITION adder 9347 overflows, i.e. a micro pixel crosses a macro raster boundary in the fast scan direction, adder 9347 produces a resultant pulse at its carry out output. This pulse is the V OVERFLOW signal and is connected, via lead 9349 to Control Sequencer PAL 940, to the count input of CELL COUNTER 9365 and to an input of DMA Controller PAL 914.

Control Sequencer 940, as noted above, first determines when the end of each micro raster is reached. Once this occurs, the control sequencer will generates appropriate control signals through leads 935: to temporarily halt the screening process, whenever a macro raster is crossed in the slow scan direction, and thereafter instruct the FIFOs in contone line buffers 913 to switch functions, to cause appropriate ones of register circuits 932, 934, 936 and 938 to properly increment their contents and finally restart and to control the screening process to handle the next micro raster. While screening occurs, control sequencer 940 generates appropriate control signals to X POSITION and Y POSITION register circuits 952 and 960 located within screen handler 950 to suitably cause each of these circuits to properly increment its contents at the appropriate times. In particular, Control Sequencer 940 is, as noted, implemented with a programmable array logic circuit that has been suitably programmed to implement pre-defined logical state transitions that relate the status of the signals applied to its various inputs to the desired signals to be produced at its outputs. These state transitions and accompanying required input signals and associated resulting output signals will be discussed below in conjunction with FIGS. 13A and 13B. The inputs provided to the control sequencer include: the V OVERFLOW signal appearing on lead 9349, the CELL CTR TC signal appearing on lead 9367, the U OVERFLOW signal appearing on lead 9339, the system clock signals appearing on lead 1140, the LINE CTR TC signal appearing on lead 9387, the SCREEN command appearing on lead 1107, the POWER ON (BUS) RESET signal appearing on lead 1109 and a DATA REQUEST lead (not shown) that forms part of protocol leads 33. The output signals generated by the control sequencer include: the V POSITION ADDER MUX SELECT signal appearing on lead 9401, the V POSITION ADDER LOAD signal appearing on lead 9403, the CELL COUNTER LOAD signal appearing on lead 9405, the U POSITION ADDER LOAD signal appearing on lead 9407, the U POSITION ADDER MUX SELECT signal appearing on lead 9409, CELL CTR RESET signal appearing on lead 9410, the LINE COUNTER LOAD signal appearing on lead 9411, the LINE COUNTER RESET signal appearing in lead 9412, the HOLD signal appearing on lead 9413, the DONE signal appearing on lead 9415, the X START ADDER MUX SELECT signal appearing on lead 9417, the X START ADDER LOAD signal appearing on lead 9419, the X POSITION ADDER MUX SELECT signal appearing on lead 9421, the X POSITION ADDER LOAD signal appearing on lead 9423, the Y START ADDER MUX SELECT signal appearing on lead 9425, the Y START ADDER LOAD signal appearing on lead 9427, the Y POSITION ADDER MUX SELECT signal appearing on lead 9429, the Y POSITION ADDER LOAD signal appearing on lead 9431 and DATA READY and DATA ACKNOWLEDGE signals (not shown) that form part of protocol leads 33. The connection of lead 9434 to each of the registers has been omitted from FIGS. 11A-11G in order to simplify these figures.

As noted above, screen handler 950 keeps track of where to sample a reference cell by generating a succession of addresses at which a reference cell is to be sampled along a sampling line for each micro raster appearing in the printed image. The screen handler contains X POSITION and Y POSITION register circuits 952 and 960, six bit pseudo random noise generator 956 and eight bit address adders 954 and 958. X POSITION register circuit 952 and Y POSITION register circuit 960 respectively maintain the current values of parameters X POSITION and Y POSITION. These values are used as the incremented orthogonal coordinates for the next sampling point in the reference cell. Appropriate initial values are loaded into the parameter registers within screen handler 950 during initialization and can be dynamically changed, if desired, during a screening run by host computer 40 to alter the screen angle. Dynamically changing the screen angle is not recommended inasmuch as doing so may disadvantageously introduce artifacts into a resulting screened halftone image. Hence, for that reason and for simplification, the following discussion will assume that the screen angle remains fixed during any screening run.

X POSITION register circuit 952 contains $\Delta X_{FAST}$ register 9521, $\Delta X_{SLOW}$ register 9525 and X INIT register 9531. During initialization, registers 9521 and 9525 are loaded by host computer 40 and via parameter bus 906 with the value of parameters $\Delta X_{FAST}$ and $\Delta X_{SLOW}$ which represent the incremental X coordinate distance in the fast and slow scan directions, respectively, that is to occur between successive sampling points. In addition, during initialization, register 9531 is loaded with the location, i.e. the value of parameter X INIT, along a reference cell boundary of the beginning of the current sampling line. The value of parameters X INIT and Y INIT are equal and given by the following equation:

$$X \text{ INIT} = Y \text{ INIT} = 2^{N-n-1} \quad (7)$$

where:
n equals the number of bits, here five, in one direction of the reference cell address and
N has the value defined above.

The values of parameters $\Delta X_{SLOW}$ and X INIT are applied from registers 9525 and 9531, via respective leads 9527 and 9533, to corresponding A and B inputs of X START adder 9535. Through application of suitable pulses from the Control Sequencer, as discussed below, to the select and load inputs to the X START adder, via X START ADDER MUX SELECT lead 9417 and X START ADDER LOAD lead 9419, respectively, the resultant sum produced by the adder, i.e. X START, is initialized during initialization and is thereafter incremented to reflect the beginning, in terms of the X direction, of each successive sampling line for the current micro raster. The value of X START is applied over leads 9536 to input B of X POSITION adder 9537. The value of parameter $\Delta X_{FAST}$ is applied, via leads 9523 emanating from register 9521, to the other input, i.e. the A input, to adder 9537. Through application of suitable pulses from the Control Sequencer, as discussed below, to the select and load inputs to X POSITION adder 9537, via X POSITION ADDER MUX SELECT lead 9421 and X POSITION ADDER LOAD lead 9423, respectively, the resultant sum produced by the adder, i.e. X POSITION, is initialized during initialization, set to reflect the beginning of each new sampling line and then successively incremented to reflect the X coordinate of each successive sampling point on the current sampling line. The upper eight bits of the X POSITION value generated by X POSITION adder 9537 are applied over leads 9539 as one eight bit input to address adder 954.

Y POSITION register circuit 960 contains $\Delta Y_{FAST}$ register 9601, $\Delta Y_{SLOW}$ register 9605 and Y INIT register 9611. During initialization, registers 9601 and 9605 are loaded by host computer 40 and via parameter bus 906 with the value of parameters $\Delta Y_{FAST}$ and $\Delta Y_{SLOW}$ which represent the incremental Y coordinate distance in the fast and slow scan directions, respectively, that is to occur between successive sampling points. In addition, during initialization, register 9611 is loaded with the location, i.e. the value of parameter Y INIT, along a reference cell boundary of the beginning of the current sampling line. The value of parameter Y INIT is given by equation (7) above.

The values of parameters $\Delta Y_{SLOW}$ and Y INIT are applied from registers 9605 and 9611, via respective leads 9607 and 9613, to corresponding A and B inputs of Y START adder 9615. Through application of suitable pulses from the Control Sequencer, as discussed below, to the select and load inputs to the Y START adder, via Y START ADDER MUX SELECT lead 9425 and Y START ADDER LOAD lead 9427, respectively, the resultant sum produced by the adder, i.e. Y START, is initialized during initialization and is thereafter incremented to reflect the beginning, in terms of the Y direction, of each successive sampling line for the current micro raster. The value of Y START is applied over leads 9616 to input B of Y POSITION adder 9617. The value of parameter $\Delta Y_{FAST}$ is applied, via leads 9603 emanating from register 9601, to the other input, i.e. the A input, to adder 9617. Through application of suitable pulses from the Control Sequencer, as discussed below, to the select and load inputs to Y POSITION adder 9617, via Y POSITION ADDER MUX SELECT lead 9429 and Y POSITION ADDER LOAD lead 9431, respectively, the resultant sum produced by the adder, i.e. Y POSITION, is initialized during initialization, set to reflect the beginning of each new sampling line and then successively incremented to reflect the Y coordinate of each successive sampling point on the current sampling line. The upper eight bits of the Y POSITION value generated by Y POSITION adder 9617 are applied over leads 9619 as one eight bit input to address adder 958.

As noted above, to advantageously suppress screener induced Moire patterns from appearing in the screened image, an amount of random noise having a properly scaled uniform probability distribution is separately added to the X POSITION and Y POSITION values with the resultant sums being applied to font memory 970 as the X and Y addresses (X ADDR and Y ADDR). Now, to provide this function, pseudo random noise generator 956 generates two separate three bit pseudo random noise values: Y NOISE and X NOISE on leads 9562 and 9566, respectively. The three bit noise values Y NOISE and X NOISE are applied as the least significant three bits in an eight bit word, specifically Y NOISE (10:8) and X NOISE (10:8), to the remaining eight bit input of address adders 958 and 954, respectively. The upper five bits of the resulting sum produced by adders 954 and 958 are applied to font memory 970 as addresses X ADDR (15:11), via leads 972, and Y ADDR (15:11), via leads 974. The lower order three bits produced by each adder are ignored. As such, the random noise randomly varies only the least significant bit in both the X ADDR and Y ADDR addresses to the font memory. Since the noise is not added into the X POSITION and Y POSITION values themselves, the noise content inherent in addresses X ADDR and Y ADDR will not accumulate and hence will not reach an unacceptable level. Thus when a sampling point exists at the edge of a halftone dot, the selection of the corresponding sampling point, i.e. the placement of a writing spot by the marking engine at the edge of the dot, is determined probabilistically. As such, on the average, all the halftone dots obtained by sampling the same reference cell will be the correct size, however they will exhibit small variations in size and shape among each other. These small variations from dot to dot substantially break screener induced Moire patterns that would otherwise appear in the screened image printed by marking engine 30.

As noted previously, an 18 bit address is applied to font memory 970. This address consists of addresses X ADDR and Y ADDR appearing on leads 972 and 974, respectively, which collectively form 10 bits of address and the current eight bit contone value appearing on leads 915. As discussed above, the current contone value selects a particular one of 256 reference cells with the X ADDR and Y ADDR values selecting a particular sampling point located within that reference cell. Thus, as can be readily appreciated, a reference cell is advantageously selected essentially independent of the selection of the particular sampling point located within that cell. Inasmuch as the accessed bit from font memory 970 forms part of the bit-mapped image to be printed, the value of this bit is provided, from the data output ($D_{OUT}$) connection of this memory and via lead 37, to marking engine 30.

The access time provided by font memory 970 predominantly dictates the overall speed of screener 30. As shown, font memory 970 contains one complete set of 256 separate reference cells. To advantageously decrease the access time of the font memory over that available from a particular type of memory circuit and/or technology used in implementing this memory, the font memory can alternatively be implemented with two or more complete sets of reference cells which are accessed on an interleaved basis with respect to each other. Specifically, if font memory 970 contained two complete sets of reference cells, then each set of cells could receive every other successive set of a contone value appearing on leads 915 and a simultaneously occurring pair of X ADDR and Y ADDR address values appearing on leads 972 and 974. In this manner, a memory technology that provides a 40 nsec (nanosecond) access time would with two fold interleaved operation permit the font memory to be successively addressed every 20 nsec and produce an output bit over leads 37 every 20 nsec wherein each of the two sets of reference cells would provide a single bit output value every 40 nsec with a 20 nsec stagger occurring between the output bits produced by both sets. For even faster operation, three or more sets of reference cells can be operated on such an interleaved basis.

b. State Diagram of DMA Control PAL 914

Figure 12A:
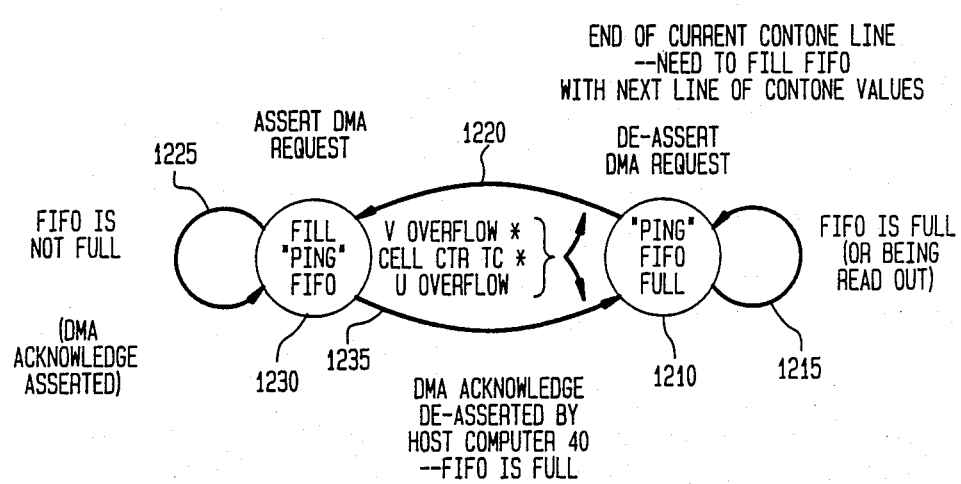
FIGS. 12A and 12B depict simplified state diagrams that are implemented by DMA Controller PAL 914 shown in FIGS. 11A-11G.
Figure 12B:
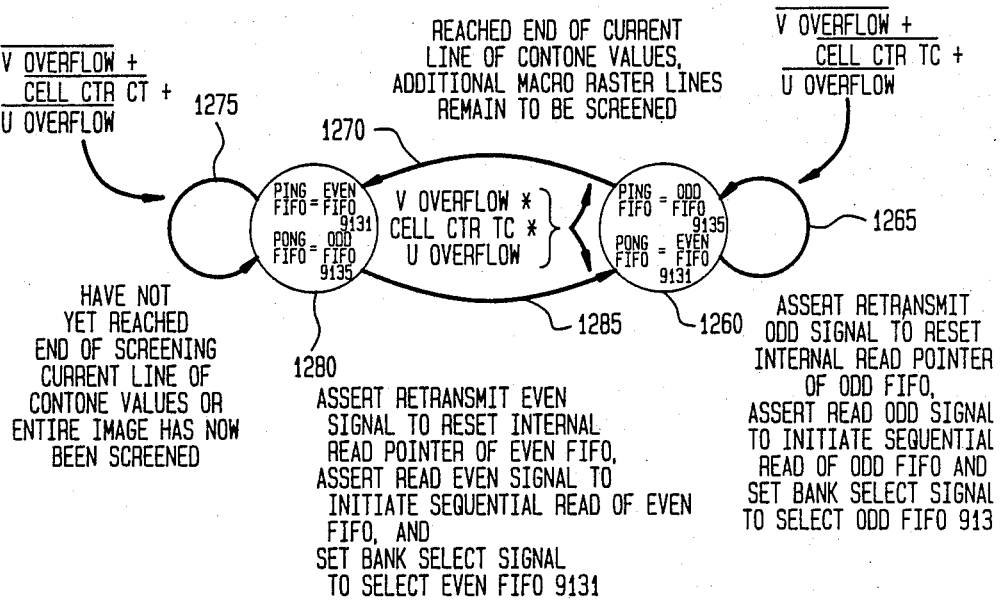

FIGS. 12A and 12B depict simplified state diagrams that are implemented by DMA Controller PAL 914 shown in FIGS. 11A-11G and specifically to control contone line buffers 913. As discussed above, each one of FIFOs (RAM arrays) 9131 and 9135 (see FIGS. 11A-11G) which collectively form buffers 913 successively accepts each contone value in a macro raster, through a FIFO write operation, and then provides each value in that stored line through a FIFO read operation. While one FIFO undertakes a FIFO read operation, the other FIFO is performing a FIFO write operation. At the conclusion of screening each macro raster, the function of the individual FIFOs switches to implement "ping-pong" operation. DMA Controller PAL 914 controls the operation of the individual FIFOs.

FIG. 12A shows the state diagram associated with controlling the filling of a FIFO with incoming contone values; while FIG. 12B shows the state diagram associated with controlling a FIFO swap operation, i.e. reversing the functions performed by the individual FIFOs. Inasmuch as both FIFOs accept data in the same fashion, FIG. 12A shows the state diagram associated with only one (the "ping" FIFO) of the FIFOs. Since an identical state diagram is implemented within this PAL for the other FIFO (the "pong" FIFO), its operation will not be discussed.

To understand FIG. 12A, assume for the moment that the ping FIFO has just been completely filled with an incoming line of contone data by the host computer. Once this occurs, this FIFO will be in state 1210. As such, the controller de-asserts the associated DMA Request signal associated with this FIFO to prevent the host computer from writing any further data into this FIFO. As long as this FIFO remains full or its contents are being successively read out during processing of the associated line, the FIFO remains in state 1210 as indicated by line 1215. Once this line has been completely screened, as indicated by the occurrence of the V OVERFLOW and CELL CTR TC and U OVERFLOW signals all being high, the ping buffer needs to be filled with the next line of incoming contone values. As such, DMA Controller PAL 914 changes state, via line 1220, to state 1230. When this occurs, PAL 914 asserts the DMA Request signal associated with the ping FIFO in order to obtain new data. Upon receipt of this signal, the host computer will successively write each contone value in the next contone line into this FIFO. As long as this write operation is occurring, PAL 914 remains in state 1230 as indicated by line 1225. The host computer maintains a count of the number of contone values in a line and writes this number of values into the FIFO. As long as additional data remains to be written into the FIFO, the host computer asserts the DMA Acknowledge signal associated with this FIFO. However, once the host computer has completed writing a line of contone values into the FIFO, the host computer de-asserts the DMA Acknowledge signal which, in turn, indicates that the FIFO is ready to be read. In this case, the state of PAL 914 returns, as indicated by line 1235, to state 1210 to await the beginning of a read operation, and so on.

After a line of contone values have been fully screened, the FIFOs reverse (swap) their functions. FIG. 12B shows the state diagram associated with controlling this operation. To understand this figure, assume for the moment that an odd line of contone data has just been screened. In this case, PAL 914 resides in state 1260 to instruct odd line FIFO 9135 (see FIGS. 11A-11G) to be the ping FIFO and even line FIFO 9131 to be the pong FIFO. To do this, PAL 914 asserts the RETRANSMIT ODD signal to reset an internal read pointer within odd line FIFO 9135 to the first location in preparation for successive FIFO read operations of the line of contone values stored therein. In addition, PAL 914 also asserts the READ ODD signal to instruct odd FIFO 9135 to perform FIFO read operations. Furthermore, PAL 914 sets the BANK SELECT signal to an appropriate level to instruct multiplexor 918 (see FIGS. 11A-11G) to route contone values produced by odd line FIFO 9135 through the remainder of the screener. Coincident with the occurrence of read operations undertaken by odd line FIFO 9135, appropriate control signals are produced by PAL 914 to instruct the host computer to successively write each contone value for the next line into the current pong FIFO, e.g. even line FIFO 9131. Now, as long as the screener has not completed screening all the contone values produced by odd line FIFO 9135, then any or more of the signals V OVERFLOW not, CELL CTR TC not or U OVERFLOW not will be high. In this case, PAL 914, as shown in FIG. 12, remains in state 1260, as indicated by line 1265. However, once a full line of contone values read from the current ping FIFO has been screened, as indicated by the occurrence of the V OVERFLOW and CELL CTR TC and U OVERFLOW signals all being high, then the FIFOs must switch their functions, i.e. the odd line FIFO must become the pong FIFO and the even line FIFO must become the ping FIFO. Consequently, at this point, the state of PAL 914 changes, as indicated by line 1270, from state 1260 to state 1280. As soon as this new state is entered, PAL 914 asserts the RETRANSMIT EVEN signal to reset an internal read pointer within even line FIFO 9131 to the first location in preparation for successive FIFO read operations of the line of contone values stored therein. In addition, PAL 914 also asserts the READ EVEN signal to instruct even FIFO 9131 to perform FIFO read operations. Furthermore, PAL 914 sets the BANK SELECT signal to an appropriate level to instruct multiplexor 918 (see FIGS. 11A-11G) to route contone values produced by the even line FIFO through the remainder of the screener. Coincident with the occurrence of read operations undertaken by even line FIFO 9131, appropriate control signals are produced by PAL 914 to instruct the host computer to successively write each contone value for the next line into the current pong FIFO, e.g. odd line FIFO 9135. Now, as long as the screener has not completed screening all the contone values produced by even line FIFO 9131, then any or more of the signals V OVERFLOW not, CELL CTR TC not or U OVERFLOW not will be high. In this case, PAL 914, as shown in FIG. 12, remains in state 1280, as indicated by line 1275. Once the full line of contone values read from the current ping FIFO has been screened, as indicated by the occurrence of the V OVERFLOW and CELL CTR TC and U OVERFLOW signals all being high, then the FIFOs must again switch their functions, i.e. the even line FIFO must become the pong FIFO and the odd line FIFO must become the ping FIFO. Consequently, at this point, the state of PAL 914 changes, as indicated by line 1285, from state 1280 back to state 1265 and so on.

In addition, whenever a high level HOLD signal is asserted on lead 9413 by Control Sequencer PAL 940, PAL 914 merely suspends its operation and remains in a suitable wait state until this signal is de-asserted at which point normal operation resumes. The states associated with the HOLD operation are not shown in FIGS. 12A and 12B in order to simplify these figures but would be readily apparent to anyone skilled in the art.

c. State Diagram of Control Sequencer PAL 940

Figure 13B:
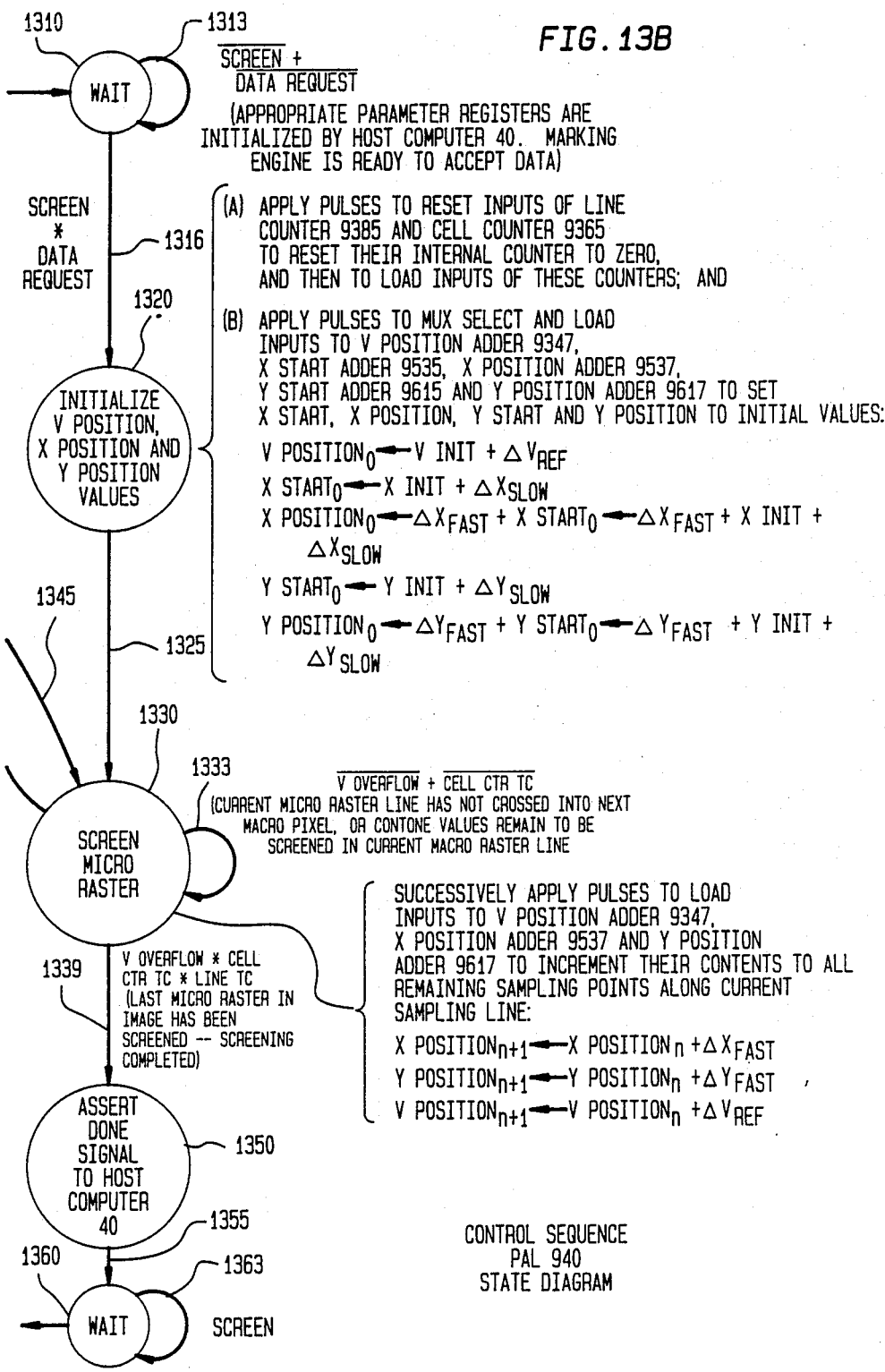

A simplified state diagram implemented by Control Sequencer PAL 940, shown in FIGS. 11A-11G, is collectively depicted in FIGS. 13A and 13B, for which the correct alignment of the drawing sheets for these figures is shown in FIG. 13. As discussed above, the Control Sequencer supervises the screening process by setting the V POSITION, X POSITION and Y POSITION registers to initial values at the initiation of a screening run and then appropriately incrementing these registers as screening progresses. Once an entire image has been screened, the Control Sequencer asserts a DONE signal on lead 9415 (see FIGS. 11A-11G) to so notify the host computer. Throughout the following discussion of the this state diagram, simultaneous reference should be made to FIGS. 11A-11G, 13A and 13B.

Specifically, as shown in FIGS. 13A and 13B, a screening run begins once the host computer asserts a high level SCREEN command signal and the marking engine indicates that it is ready to accept data from the screener. The high level SCREEN command appears on lead 1107. The marking engine indicates its readiness to print, i.e. accept data, by asserting a high level DATA REQUEST signal on a corresponding lead (not specifically shown) within protocol leads 33. Until both of these signals occur, Control Sequencer PAL 940 remains, as shown in FIGS. 13A and 13B, in wait state 1310, as indicated by line 1313. During this wait state, the host computer can load initial values into all twelve parameter registers in the manner discussed above. Once this parameter registers are fully loaded and an operator instructs the host computer to initiate a screening run, the host computer will then generate a high level SCREEN command signal and thereafter maintain this high level throughout the screening run. In the event that one or more of the most recently loaded parameter values are to be used for the next screening run, then the host computer need not re-load these specific values as they will already exist within their appropriate parameter registers. In any event, once a high level SCREEN command signal and a high level DATA REQUEST signal are both asserted, PAL 940 changes from state 1310 to state 1320, as indicated by line 1316. In this state, PAL 940 generates appropriate control signals to initialize the values of V POSITION, U POSITION, X START, X POSITION, Y START and Y POSITION. Specifically, PAL 940 first applies appropriate pulses to the reset (R) inputs of Line Counter 9385, via LINE COUNTER RESET lead 9412, and Cell Counter 9365, via CELL CTR RESET lead 9410, to reset the contents of their respective internal counters to zero. Thereafter, PAL 940 applies appropriate pulses to the load inputs of these counters, via LINE COUNTER LOAD lead 9411 and CELL CTR LOAD lead 9405, to load the initial values held in NUM LINES register 9381 and NUM CELLS register 9361 into corresponding registers within these respective counters. Simultaneously therewith, PAL 940 applies appropriate pulses to the multiplexor select and load inputs of: V POSITION adder 9347, via V POSITION ADDER MUX SELECT lead 9401 and V POSITION ADDER LOAD lead 9403, respectively; X START adder 9535, via X START ADDER MUX SELECT lead 9417 and X START ADDER LOAD lead 9419; X POSITION adder 9537, via X POSITION ADDER MUX SELECT lead 9421 and X POSITION ADDER LOAD lead 9423; Y START adder 9615, via Y START ADDER MUX SELECT lead 9425 and Y START ADDER LOAD lead 9427; and Y POSITION adder 9617, via Y POSITION ADDER MUX SELECT LOAD lead 9429 and Y POSITION ADDER LOAD lead 9431, to route initial parameter values to the inputs of these adders. As a result, at the next clock pulse (illustratively time t=0), the contents of variables V POSITION, X START, X POSITION, Y START and Y POSITION are initialized to the values set forth by the following equations:

$$V\ POSITION_0 \leftarrow V\ INIT + \Delta V_{REF} \qquad (8)$$
$$X\ START_0 \leftarrow X\ INIT + \Delta X_{SLOW} \qquad (9)$$
$$X\ POSITION_0 \leftarrow \Delta X_{FAST} + X\ START_0 \leftarrow \Delta X_{FAST} + \qquad (10)$$
$$X\ INIT + \Delta X_{SLOW}$$
$$Y\ START_0 \leftarrow Y\ INIT + \Delta Y_{SLOW} \qquad (11)$$
$$Y\ POSITION_0 \leftarrow \Delta Y_{FAST} + Y\ START_0 \leftarrow \Delta Y_{FAST} + \qquad (12)$$
$$Y\ INIT + \Delta Y_{SLOW}$$

After this has occurred, Control Sequencer PAL 940 changes from state 1320 to state 1330, as indicated by line 1325. While in state 1330, the current micro raster is screened. As long as this micro raster has not crossed into the next macro pixel or contone values remain to be screened in the current line, indicated by either the V OVERFLOW not or CELL CTR TC not signals being high, screening continues and PAL 940 remains in state 1330 as indicated by line 1333. In this state, the PAL produces appropriate control signals on V POSITION ADDER LOAD, X POSITION ADDER LOAD and Y POSITION ADDER LOAD leads 9403, 9423 and 9431, to repetitively load and increment V POSITION adder 9347, X POSITION adder 9537 and Y POSI- TION adder 9617 in order to successively increment (at time $t=n+1$) the V POSITION value by its corresponding increment, $\Delta V_{REF}$, and to successively increment the X POSITION and Y POSITION values by the fast scan increments, as shown by the following equations, until the end of the current micro raster is reached.

$$X\ POSITION_{n+1} \leftarrow X\ POSITION_n + \Delta X_{FAST} \qquad (13)$$

$$Y\ POSITION_{n+1} \leftarrow Y\ POSITION_n + \Delta Y_{FAST} \qquad (14)$$

$$V\ POSITION_{n+1} \leftarrow V\ POSITION_n + \Delta V_{REF} \qquad (15)$$

Now, as soon as the current micro raster has been completely screened but additional macro rasters still remain to be screened as indicated by the V OVERFLOW and CELL CTR TC and LINE CTR TC not signals all being high, then Control Sequencer PAL 940 changes from state 1330 to state 1340, as indicated by line 1336.

In state 1340, PAL 940 sets the X POSITION and Y POSITION values to the new starting position for the next successive sampling line and resets the value of V POSITION to its initial value, V INIT, in order the screen the next micro raster. Specifically, upon entry into state 1340, PAL 940 produces appropriate pulses to the load inputs of X START adder 9535, via X START ADDER LOAD lead 9419, and Y START adder 9615, via Y START ADDER LOAD lead 9427, in order to select the prior values of X START and Y START as a corresponding input to each of these respective adders and then to increment the X START and Y START values by the slow scan increments, as shown by the following equations. This sets the values of X START and Y START to the starting location, along the left boundary of the reference cell, of the next successive sampling line.

$$X\ START_t \leftarrow X\ START_{t-1} + \Delta X_{SLOW} \qquad (16)$$

$$Y\ START_t \leftarrow Y\ START_{t-1} + \Delta Y_{SLOW} \qquad (17)$$

Thereafter, at the occurrence of the next clock pulse (time $t=t+1$), PAL 940 produces appropriate pulses at the multiplexor select and load inputs of V POSITION adder 9347, via V POSITION ADDER MUX SELECT lead 9401 and V POSITION ADDER LOAD lead 9403; X POSITION adder 9537, via X POSITION ADDER MUX SELECT lead 9421 and X POSITION ADDER LOAD lead 9423; and Y POSITION adder 9617, via Y POSITION ADDER MUX SELECT lead 9429 and Y POSITION ADDER LOAD lead 9431, to set the current value of V POSITION equal to its initial value, V INIT, plus its corresponding increment, $\Delta V_{REF}$, and to set the values of X POSITION and Y POSITION equal to the sum of the new X START and Y START values and the fast scan increments thereby locating the first sampling point on this next successive sampling line, all as given by the following equations.

$$X\ POSITION_{t+1} \leftarrow X\ START_t + \Delta X_{FAST} \qquad (18)$$

$$Y\ POSITION_{t+1} \leftarrow Y\ START_t + \Delta Y_{FAST} \qquad (19)$$

$$V\ POSITION_{t+1} \leftarrow V\ INIT + \Delta V_{REF} \qquad (20)$$

Once these operations have occurred, PAL 940 changes from state 1340 back to state 1330, as indicated by line 1345, in order to screen the next micro raster in the image.

Now, as soon as the last micro raster in the image has been screened, as indicated by the V OVERFLOW and CELL CTR TC and LINE TC signals all being high, the image has been completely screened. As such, PAL 940 changes from state 1330 to state 1350, as indicated by line 1339. In state 1350, the Control Sequencer PAL asserts a high level DONE SIGNAL on lead 945. This signal, connected through host bus 70, informs host computer 40 that the current screening run is now complete. Once this signal is asserted, PAL 940 changes from state 1350 to wait state 1360, as indicated by line 1355. As long as the host computer maintains the SCREEN command signal appearing on lead 1107 high, PAL 940 remains in wait state 1360. The host computer will acknowledge completion of the current screening run by de-asserting the SCREEN command, i.e. taking the command low. Once this command is de-asserted, then PAL 940 changes from state 1360 back to 1310, as indicated by line 1366, to await the next assertion of the SCREEN command to initiate the next screening run, and so on.

In addition, whenever a high level is asserted on POWER ON (BUS) RESET lead 1109 by the host computer, PAL 940 is forced to assume a pre-defined initial state and, in turn, generate appropriate signal levels on leads 9339, 9349 and 9367 that similarly force DMA Controller PAL 914 to assume a pre-defined initial state. Furthermore, whenever appropriate signals appear on protocol leads 33 indicating that the marking engine is temporarily unable to accept any more data, then Control Sequencer PAL 940 will temporarily suspend screening until such time as the marking engine is ready to resume printing. Specifically, in response to these signals on leads 33, PAL 940 will cease incrementing any of the adders and will also assert a high level onto HOLD signal lead 9413 to appropriately instruct DMA Controller PAL 914 to temporarily suspend screening. PAL 940 will de-assert the high level HOLD signal to resume screening the current image as soon this PAL receives a high level DATA REQUEST signal, over leads 33, from the marking engine. The states associated with the RESET and HOLD operations are not shown in FIGS. 13A and 13B in order to simplify these figures but would be readily apparent to anyone skilled in the art.

d. Pseudo Random Noise Generator 956

Figure 14:
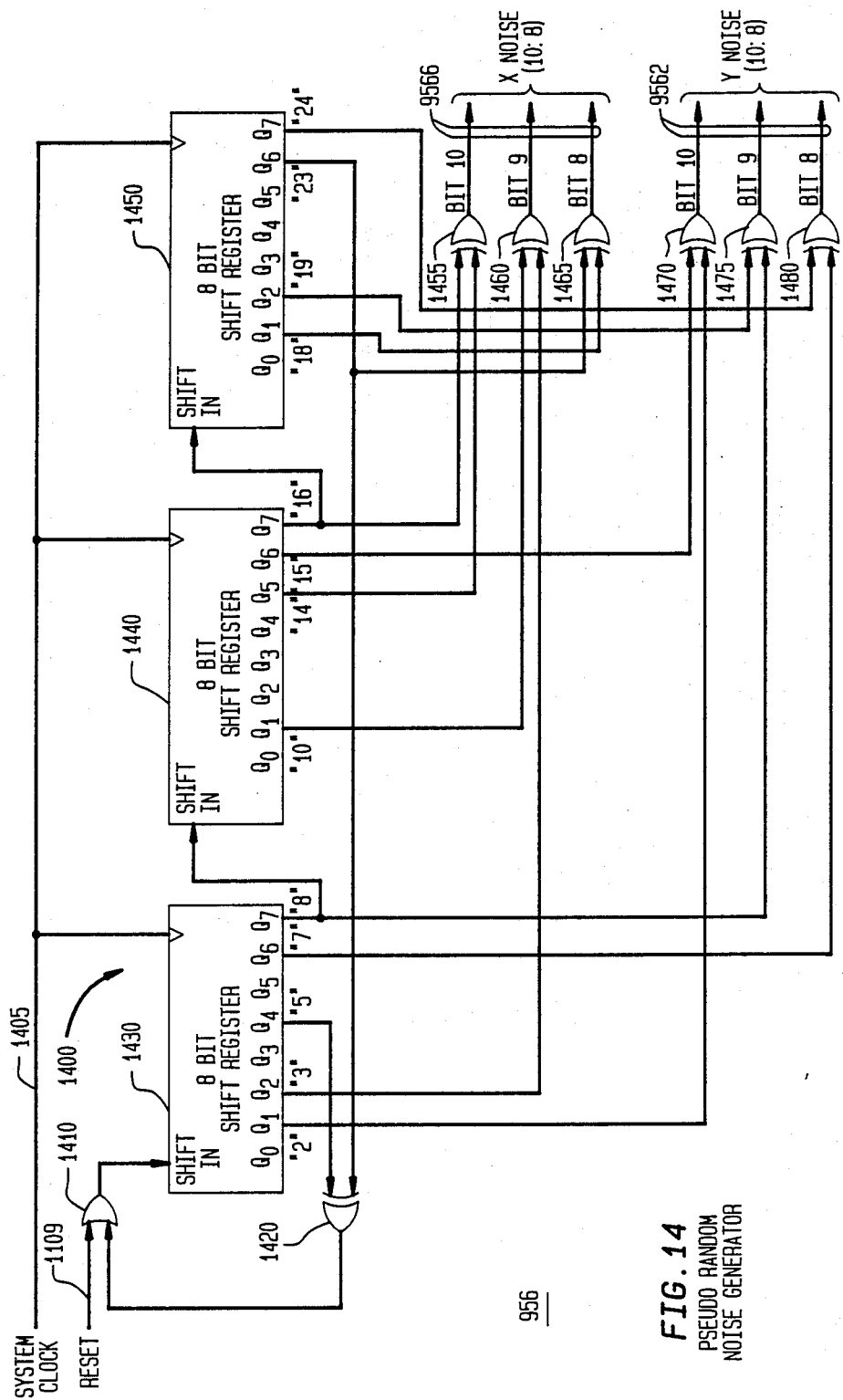
FIG. 14 depicts a block diagram of Pseudo Random Noise Generator 956 shown in FIG. 11A-11G.

FIG. 14 depicts a block diagram of Noise Generator 956 shown in FIGS. 11A–11G. As discussed above, the noise generator produces two three bit pseudo random noise values, X NOISE on leads 9566 and Y NOISE on leads 9562, that are added to the X POSITION and Y POSITION values to generate respective font memory addresses X ADDR and Y ADDR so as to suppress screener induced Moire patterns that would otherwise likely appear in an image produced by the marking engine.

As shown, noise generator 956 is formed of a 24 bit shift register with an exclusive OR combination of two bits used for feedback. Through use of these bits, the shifting structure permits the longest possible non-repeating sequence of pseudo random bits, specifically with a periodicity of $2^{23}-1$ bits, to be generated by the shift register. If the shift register were to be tapped at six places, i.e. one for each of the needed noise bits, then the resulting six bits might contain appreciable autocorrelation attributable to any directing repeating pattern appearing in these bits. Therefore, to substantially reduce the level of residual autocorrelation appearing in these noise bits, the registers are tapped in two different places, with an absolute prime number separation occurring therebetween, for each noise bit with the resulting tapped bits gated through an exclusive OR to generate that noise bit.

Specifically, 24 bit shift register 1400 is formed of three cascaded eight bit shift registers 1430, 1440 and 1450, all synchronously clocked together at the system clock rate by clock pulses appearing on lead 1405. The most significant bits (Q7) produced by register 1430 and 1440, are respectively applied to the shift in inputs of the shift registers 1440 and 1450. The bits produced at the 5th and 23rd positions in shift register 1400 (outputs Q4 of register 1430 and Q6 of register 1450) are applied as inputs to exclusive OR gate 1420, the output of which is fed back through an input of OR gate 1410 to the input of shift register 1400, i.e. to the shift in input of register 1430. A RESET signal appearing on lead 1109 is applied as the second input to OR gate 1430. With this structure, if register 1400 were to be initialized with a pattern of all zeroes, this pattern would constantly occur thereafter, thereby providing the shortest repeating pattern. To prevent this from occurring, a high level RESET signal is applied, via lead 1109, to the shift in input of register 1430 to force a one into the lowest order bit position of random sequence with a $2^{23}-1$ periodicity. The three X NOISE bits appearing on leads 9566 are generated by tapping register 1400 at positions 14 (bit Q5 in register 1440) and 16 (bit Q7 in register 1440), positions 3 (bit Q2 in register 1430) and 10 (bit Q1 in register 1440), and positions 18 (bit Q1 in register 1450) and 23 (bit Q6 in register 1450) with corresponding absolute prime number bit separations therebetween of 2, 7 and 5. The resulting tapped bits are applied through exclusive OR gates 1455, 1460 and 1465 to generate the corresponding X NOISE bits. Similarly, the three Y NOISE bits appearing on leads 9562 are generated by tapping register 1400 at positions 15 (bit Q6 in register 1440) and 2 (bit Q1 in register 1430), positions 19 (bit Q2 in register 1450) and 8 (bit Q7 in register 1430), and positions 24 (bit Q7 in register 1450) and 7 (bit Q6 in register 1430) with corresponding absolute prime number bit separations therebetween of 13, 11 and 17. The resulting tapped bits are applied through exclusive OR gates 1470, 1475 and 1480 to generate the corresponding X NOISE bits.

D. Moire and Screened Images

1. Sources of Moire in a Screened Image Produced Using a Font Generator and Printed with a Raster Scanned Writer Due to the interaction of several distinct spatially sampled entities, there are a number of distinct Moire beating patterns that are simultaneously occurring in a screened bit-mapped image produced by the digital screening process described above and printed by marking engine 30 or generally any raster scanned writer.

First, one or more of the incoming color separations may themselves contain Moire patterns. This Moire is present in the incoming image itself and results from aliasing of original image data by an image scanner. Without exact knowledge of the original image itself, this Moire can not be separated from the scanned image. Inasmuch as one goal of an electronic image processing system and particularly a digital screener used therein is to render as faithful a reproduction of an incoming image as possible, this image Moire must be duplicated as faithfully as possible. Doing so allows the operator to see the Moire and then vary the operation of the scanner and/or any parameters associated therewith in an attempt to eliminate the image Moire.

A second source of Moire results from interactions between the sampled scanned image data and the grid-like array of samples, defined by the screen frequency and screen angle, that are obtained from a halftone reference cell. In the event a color image, i.e. an artwork, is being scanned, then the screen angle can be suitably changed to eliminate this Moire. Alternatively, if a color separation is being screened then this Moire is viewed as an image Moire and must be faithfully replicated by the screening process.

A third source of Moire results from interactions occurring between marking engine and the sampled font (halftone dot pattern) stored in a reference cell. Generally, if a relatively large number of, typically in excess of ten, micro pixels occur between successive halftone dot centers produced by the marking engine, then the frequency of this Moire is relatively high. As such, this Moire will not generally be visually discernible to a viewer and thus usually presents no problems.

As noted above, I have discovered that the fourth and largest cause of Moire results from periodic sampling of a pixel placement error function. Specifically, this error arises from a periodically varying spatial misalignment occurring between the center of each writing spot (micro pixel) as printed by a raster based marking engine, e.g. marking engine 30, and the address boundaries of each sampling point located within a reference cell. The misalignment arises from the limited resolution in the sampling addresses generated for each sampling point. This misalignment, specifically occurring between the placement of a micro pixel by the marking engine and the desired center of a corresponding sample point within the reference cell, takes the form of a periodic sawtooth, shown in FIG. 15 for illustratively the x direction, with a period of 1/c which is the spacing between successive micro pixels.

The mathematical basis of this error function will now be discussed. Initially, any halftone reference cell, regardless of the actual halftone dot pattern stored therein, can be initially represented by a unit cell, u(x,y), that has a uniform spatial distribution and exists within a region $-0.5 \leq x \leq 0.5$ and $-0.5 \leq y \leq 0.5$. Such a cell can be mathematically defined by the following equation:

$$u(x,y) = \text{Comb } (c \cdot x, c \cdot y) \cdot \text{Rect } (x,y) \quad (21)$$

where:
c is a scale factor that equals the value $2^n$, here "32" and (x,y) defines the coordinate location within the unit cell. Here, the Rect function defines the boundary of a halftone reference cell and the Comb function provides two dimensional replication of the individual micro pixels that collectively form this cell. With this representation, a particular sampled halftone dot, $g_R(x,y)$, of any given size existing within that cell can be defined as:

$$g_R(x,y) = g(x,y) \cdot u(x,y) \quad (22)$$

where: g(x,y) represents the analog function for this halftone dot, i.e. a constant value over a given area.

The function $g_R(x,y)$ mathematically defines the discrete halftone reference pattern stored in any one of the memory planes situated in font memory 970.

With this representation, a screened area, $t_R(x,y)$, having a constant tint can be defined by repeating a given halftone dot on a regular basis throughout the image. Mathematically, this definition appears as:

$$t_R(x,y) = g_R(x,y) * \text{Comb}(x,y) \tag{23}$$

where: "*" represents the convolution operator.

To write this screened constant tint area, a raster based marking engine, such as marking engine 30, must sample the function $t_R(x,y)$. It is at this point that the pixel placement error occurs.

Specifically, over a very large area, any pattern produced by the marking engine can be mathematically described as:

$$w(x,y) = \text{Comb}\left( \frac{\cos(\beta) \cdot x - \sin(\beta) \cdot y}{b}, \frac{\sin(\beta) \cdot x - \cos(\beta) \cdot y}{b} \right) \tag{24}$$

where:
$w(x,y)$ is the writing function of the marking engine,
$b$ is the physical distance between adjacent micro pixel lines printed by the marking engine, and
$\beta$ is the screen angle, as defined above.

As such, all the spots (micro pixels) that could be produced by the marking engine occur on a rectangular grid in which each spot is separated from an adjacent spot by a distance "b". Generally, the value of "b" is not normally related to the unit cell as a ratio of integers.

In writing a screened constant tint area $t_R(x,y)$, any addressing circuitry used in a screener is likely, as here, to be constrained to round the misaligned coordinates of the writing function $w(x,y)$ to the nearest integer that will obtain a valve from the function $t_r(x,y)$. This rounding introduces a pixel placement error into the addressing, as shown by the following equation:

$$w(x,y) = t_R(x + x_e, y + y_e) \tag{25}$$

where: $x_e$ and $y_e$ are the amounts that need to be subtracted from the coordinates x and y to obtain the desired pixel value from function $t_R(x,y)$. The values of $x_e$ and $y_e$ are restricted to $-(2/c) \leq x_e \leq (2/c)$ and $-(2/c) \leq y_e \leq (2/c)$, respectively. With this error boundary mathematically defined, the error band occurring in writing each micro pixel can be illustratively shown as dotted region 1620 in FIG. 16 that surrounds corresponding micro pixel 1610₁. A similar region exists for every other one of micro pixels 1610, such as illustratively 1610₂, 1610₃ and so on. As such, the pixel placement error function, $p_e(x,y)$, appearing on both the x and y axes takes the form of the sawtooth having a periodicity of the inter micro pixel spacing, $1/c$. As shown, the error function is expectedly zero at the center of a micro pixel and increases to a maximum at a micro pixel boundary. Each sawtooth wave shows the single coordinate pixel placement error of a micro pixel, as produced by the marking engine, from a defined center of a sample point in a stored reference cell.

Now, given the existence of the pixel placement error in addressing each sample point, the pixel placement error function is sampled, in a manner by the marking engine, that causes the individual screened halftone dots to appear to grow and shrink, through induced dot gain, in a periodic two dimensional low frequency pattern that disadvantageously produces a visible Moire pattern in the printed halftone color image. The discussion will now proceed to mathematically show that this error does indeed produce such a Moire pattern. Since the pixel placement error function is the same in both the x and y directions, for purposes of simplicity, the following discussion will concentrate on the error function occurring in one of the orthogonal directions, namely the x direction.

In particular, the pixel placement error function is sampled by the marking engine as represented by the following equation:

$$m(x,y) = p_e(x,y) \cdot w(x,y). \tag{26}$$

The repetitive nature of the resulting Moire pattern, $m(x,y)$, can be discerned by examining its Fourier transform, $M(f_x,f_y)$. Since Fourier transform of a product of two functions is given by the convolution of the Fourier transforms of each of the functions, the function $M(f_x,f_y)$ can be expressed as:

$$m(x,y) \longleftrightarrow M(f_x,f_y) = P_e(f_x,f_y) * W(f_x,f_y) \tag{27}$$

where:
$\longleftrightarrow$ is the Fourier transform operation, and P0 $P_e(f_x,f_y)$ and $W(f_x,f_y)$ represent the Fourier transforms of the pixel placement error function $p_e(x,y)$ and the writing function $w(x,y)$, respectively.

Inasmuch as the Fourier transform of a comb function is a comb function in the Fourier domain, the writing function $w(x,y)$ has a Fourier transform given by the following equation:

$$w(x,y) \longleftrightarrow W(f_x, f_y) = \text{Comb}\ (b[\cos(\beta) \cdot f_x - \sin(\beta) \cdot f_y], \tag{28}$$
$$b[\cos(\beta) \cdot f_x - \sin(\beta) \cdot f_y])$$

The Fourier transform of pixel placement error function, in terms of one orthogonal component for purposes of simplicity $p_e(x)$, is given by:

$$P_e(f_x) = c \int_{-\frac{1}{2}c}^{\frac{1}{2}c} p_e(x) \sin(2\pi n c x)\, dx = c \int_{-\frac{1}{2}c}^{\frac{1}{2}c} x \sin(2\pi n c x)\, dx \tag{29}$$

Now, evaluating equation (29) at the fundamental spatial frequency, $f_x = cn$, yields a corresponding Fourier component, $b_n$, equalling:

$$b_n = -\frac{1}{2\pi n c} \cos \pi n \tag{30}$$

Therefore, since the Moire results from the convolution of $P_e(f_x,f_y)$ with $W(f_x,f_y)$, the lowest frequency of the Moire beat pattern, $f_{beat}$, on the x axis, $f_{xbeat}$, will be of the form:

$$f_{xbeat} = c - b \cdot [\cos(\beta) \cdot f_x - \sin(\beta) \cdot f_y] \tag{31}$$

and the lowest beat frequency on the y axis, $f_{ybeat}$, will be of the form:

$$f_{ybeat} = c - b \cdot [\sin(\beta) \cdot f_x + \cos(\beta) \cdot f_y] \quad (32)$$

The period of the Moire pattern in any orthogonal direction is the reciprocal of the corresponding beat frequency, i.e. $1/f_{beat}$. Hence this represents the period of the induced dot gain variation in that direction. Thus, an approximate representation of the Moire pattern attributable to pixel placement error takes the form of:

$$m(x,y) = \frac{k}{c} \cdot g(f_{xbeat} \cdot x, f_{ybeat} \cdot y) \quad (33)$$

where:
k is a scaling constant, and
g(x,y) is the analog function for a halftone dot.

Since the high order frequencies in this Moire pattern have all been ignored, the resulting Moire pattern would be much more complex than merely that occurring at the fundamental frequency. However, the fundamental frequency component will likely predominate to a substantial extent. Consequently, with this in mind, as evident from equation (33), the intensity of the resulting Moire is substantially inversely proportional to the number of micro pixels (c) that form a halftone dot, $g_R(x,y)$, stored in a reference plane. In addition, the frequency of the beat pattern is related to the difference between the frequency of the pixel placement error and the writing frequency of the marking engine for a given screen angle. The action of this Moire is to appear to magnify and contract the size of stored halftone dot, $g_R(x,y)$, by the period of the low frequency Moire produced by aliasing of the pixel placement error by the marking engine writing frequency.

Figure 16:
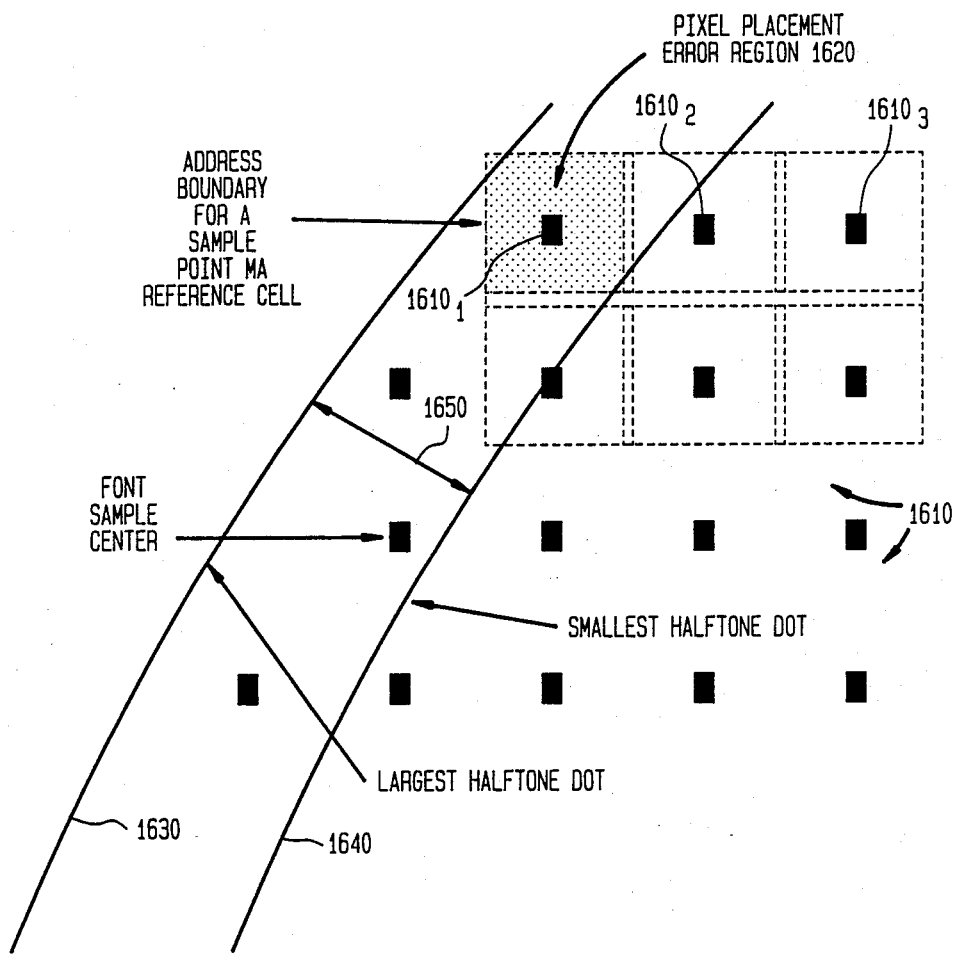
FIG. 16 pictorially shows the bounds of the induced dot gain variation occurring for halftone dots in a constant tonal area caused by the Moire pattern generated by the beating in this area of the writing function, associated with the marking engine, with the pixel placement error function.

FIG. 16 pictorially shows the bounds of the induced dot gain variation occurring for illustrative halftone dots in a constant tonal area caused by the Moire pattern generated by the beating occurring in this area between the writing function, associated with the marking engine, and the pixel placement error function. Specifically, as a result of the Moire, halftone dots (shown with a round edge for simplification) that would illustratively include micro pixel 1610₁ and exist in a constant tonal area would possess an induced dot gain that would illustratively vary the location of the edge of these dots between edges 1630 and 1640. Due to the relatively large size of the halftone dots with respect to individual micro pixels 1610, only a portion of the circumferential edges of these halftone dots are shown in FIG. 16. In particular, those halftone dots in the constant tonal area that extended to edge 1630 would be the largest halftone dots; while those dots in this area that extended to edge 1640 would be the smallest halftone dots. In the absence of Moire, all these dots would possess the same size. Hence, distance 1650 represents the variation in the radius of curvature of these halftone dots attributable to this Moire pattern. Clearly, as the tonal values and hence dot sizes change, the Moire patterns would change accordingly. It is this Moire pattern in the screened image that results from this dot gain variation and originates with the sampling of the pixel placement error function and which is advantageously suppressed.

2. Suppression of Screener Induced Moire Resulting from Beating of the Pixel Placement Error Function and the Writing Function Now, with the realization that pixel placement error is a predominant source of screener induced Moire, the following discussion describes the inventive manner through which this Moire is substantially and advantageously suppressed. Since the process used to suppress Moire is the same in both the x and y directions, for purposes of simplicity, the following discussion will concentrate on one of these directions, namely the x direction.

As discussed above and in accordance with the teachings of my invention, this Moire is suppressed by adding a specific amount of random noise into the X and Y addresses (X ADDR and Y ADDR) that are applied to the font memory. In addition, during screening, the pixel placement error function is sampled at an essentially random location within a given range. As such this function can be viewed as being random in nature.

Mathematically, the addition of two random variables is equivalent to the convolution of the individual Fourier transforms of their probability density functions. Consequently, the addition of pixel placement error function $P_e(X)$ and random noise function $n(X)$ is defined as:

$$p_e(x) + n(x) \longleftrightarrow P_e(f_x) * N(f_x) \quad (34)$$

where:
n(x) is a noise function that produces a random value of x, and
$N(f_x)$ is the Fourier transform of this noise function.

Figure 15:
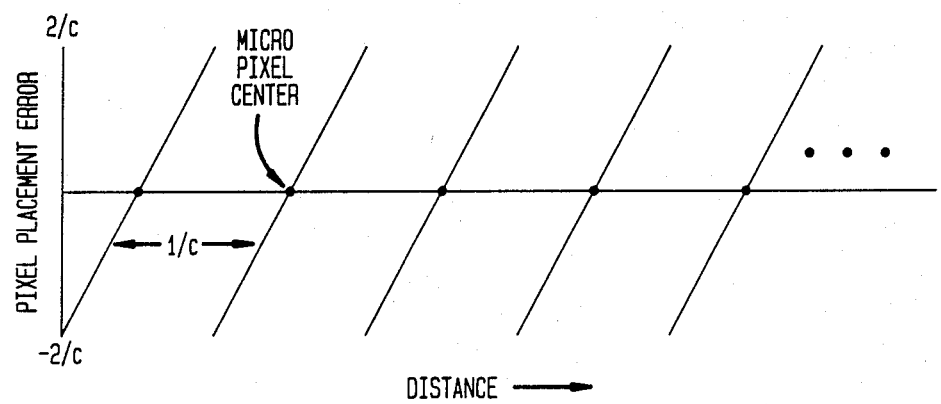
FIG. 15 graphically depicts a pixel placement error function, i.e. the positional error occurring between a font sample and the corresponding location of a writing spot printed by the marking engine, that occurs in illustratively the x direction, for successive micro pixels situated along a micro raster.
Figure 17A:
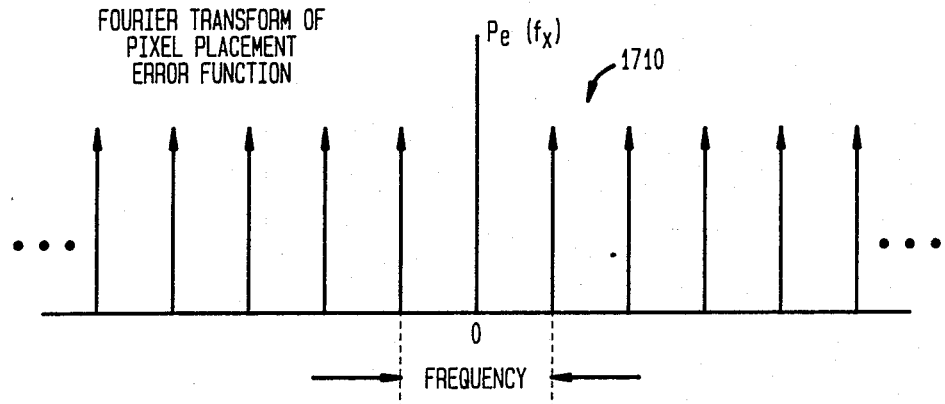
FIGS. 17A-17C graphically show the Fourier transform of the pixel placement error function, a noise function and the Fourier transform of the noise function, respectively.
Figure 17B:
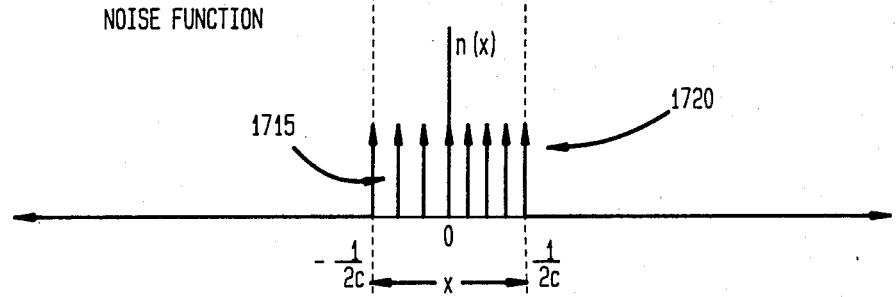
Figure 17C:
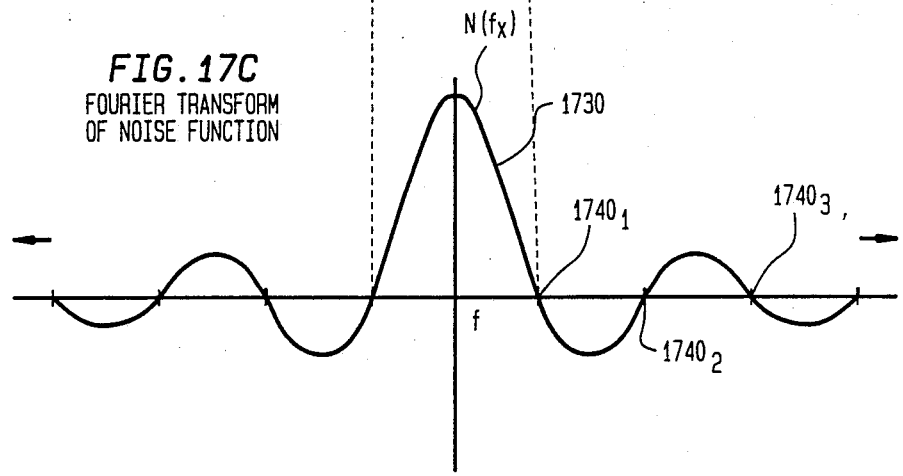

The sawtooth shaped pixel placement error function $p_e(x)$ shown in FIG. 15, when transformed, yields, as shown in FIG. 17A, an infinite periodic group of impulse functions 1710. A noise function n(x) having a uniform probability distribution over a limited position region takes the form of Rect function 1720 shown in FIG. 17B. The Fourier transform of such a Rect function is a sinc function, as shown by function 1730 in FIG. 17C.

$$n(x) = d \, \text{Rect}(x) \longleftrightarrow N(f_x) = g \, \text{Sync}(f_x) \quad (35)$$

where: d and g are constants.

Such a sinc function has zeroes periodically occurring along its positive and negative frequency spectra, such as illustratively zeroes 1740₁, 1740₂, 1740₃ and so on in the positive direction. The width of the noise function in the position domain must be chosen equal to the 1/c spacing occurring between adjacent micro pixels. With this selection, then the location of the lowest order zero of this noise function in the frequency domain will occur at exactly the fundamental frequency of the Moire produced by sampling of the pixel placement error function $p_e(x)$ by the writing function w(x). When this match occurs, then the result of the convolution is zero at this frequency thereby advantageously cancelling the fundamental frequency from this Moire. Since zeroes will also occur at all harmonics of the fundamental, these harmonics present in this Moire will also be advantageously cancelled. As such, this Moire would be entirely suppressed.

Figure 18:
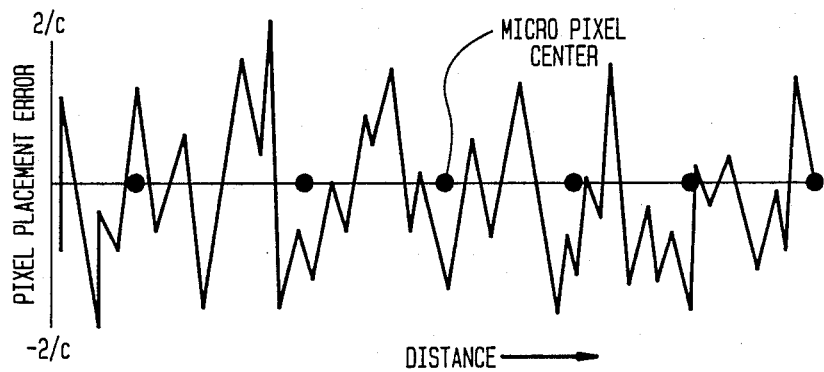
FIG. 18 graphically depicts the pixel placement error function with the addition of random noise for successive micro pixels situated along a micro raster.

With the addition of random noise, the resulting pixel placement error function $p_e(x)$ would illustratively resemble that shown in FIG. 18 for several micro pixels situated along a micro raster. As is evident, energy that would otherwise be present in a periodic Moire pattern would instead be randomly smeared across the address error band surrounding each micro pixel thereby randomly varying the location of the edge of halftone dots occurring in a constant tonal area in a probabilistic manner and hence breaking the Moire.

In practice, Rect function 1720 is approximated by the output of a three bit noise generator. This generator, as discussed above, produces eight distinct pseudo random noise values. Inasmuch as these values are used to randomly vary the value of the least significant bit in address X ADDR, i.e. the bit that corresponds to the 1/c spacing between adjacent micro pixels, then the width of the noise produced by the three bit noise generator is advantageously 1/c as needed to suppress the fundamental and harmonics of the Moire. The Moire many not be totally cancelled since the three bit noise values are not truly random and only eight uniformly spaced noise values are used to represent the Rect function. However, since the pseudo random noise values provide a very close approximation to truly random values and eight values contained within a set width provides a close approximation to a Rect function of that width, the amount of residual Moire attributable to the beating of the pixel placement error function with the writing function is likely to be quite small and hence visually indiscernible. Nonetheless, the amount of residual Moire could be reduced if each noise value used in varying the least significant bit of address X ADDR contained more than three bits, e.g. four bits, five bits and so on, thereby increasing the fineness of the noise. As a result, sixteen or more discrete values would uniformly span the 1/c width and provide a closer approximation to Rect function 1720 than if only eight discrete noise values were used.

The art teaches that random noise can be added to contone values to break Moire patterns. I have observed that adding noise in this fashion will impart added granularity to a screened image that will reduce false contours (i.e. faint edges in flat reproduced fields) that might otherwise appear in this image and arise from contone thresholding operations. However, I have found that adding noise in this fashion will have essentially no affect on pixel placement induced Moire.

Specifically, as should now be evident, the Moire patterns that occur in a screened image produced by a digital screener, such as screener 30, can be bifurcated. On the one hand, the Moire attributable to sampling of the pixel placement error function only affects the addressing of the sample points in the font memory but does not affect the contone values of the incoming separations. Image Moires, on the other hand, reside in the contone values of the incoming separations but not in the addressing of the sample points in the font memory. Hence, due to the bifurcated nature of the Moires that occur in such screeners, imparting a small random variation to the contone values as is taught in the art will not affect the predominant source of screener induced Moire, i.e. Moire $m(x,y)$ that results from beating between the pixel placement error function and the writing function. However, by adding a requisite amount of random noise only into the X ADDR and Y ADDR addresses to the font memory, the pixel placement induced Moire is advantageously suppressed and the image Moires are not appreciably affected, if at all. Therefore, screener 30 will advantageously produce a color halftone image that will contain a highly faithful reproduction of the flaws that appear in the original incoming separations, including image Moires and artifacts, but will impart no appreciable additional visible flaws, if any at all, to the reproduced image. This, in turn, will allow an electronic image processing system that uses this screener to meet an overall goal of providing a high throughput of faithful color image reproductions.

By now it should be evident to one skilled in the art that screener 30 achieves a high throughput by the use of highly efficient pipelined operation. The throughput can be increased by increasing the degree of parallel processing. Specifically, screener 30 can be duplicated with one screener writing the micro pixels situated at odd locations along a micro raster and the other screener writing the micro pixels situated at even locations on the micro raster. Both screeners could feed a common writing head in the marking engine. In this case, the screeners would operate in an interleaved fashion to approximately double the overall throughput with certain values stored in the parameter registers set during initialization to provide increments that have twice their respective values for a single screener implementation. Alternatively, each of the two interleaved screeners could drive a separate marking head in the same writing engine. In this case, staggered writing heads, that are contained in a common assembly that moves across the image but are offset to the writing direction by the relative amount of skew occurring between the screeners, could be used. Nearly any geometry of multiple writing heads can be accommodated by appropriately varying certain of the values that will be stored in the parameter registers during initialization. Alternatively, one screener could process the contone values situated at even locations on an incoming line while the other screener processes the contone values situated at odd locations along that line, with the resulting bit streams being sent to different staggered writing heads in a common assembly. With these examples in mind, other forms of parallel processing can be easily devised by those skilled in the art. In any case, the degree of parallel processing needed in any particular implementation will be primarily dictated by the type of memory circuitry used to implement the font memories, the number of marking heads that is available on the marking engine and the desired overall throughput of screened images.

Clearly, one skilled in the art will also recognize that the method of adding a proper amount of uniformly distributed random noise to eliminate Moire caused by the beating of the pixel placement error function against the writing function, which is the predominant cause of screener induced Moire, is applicable to any application, not just screening, where a discrete font pattern is sampled in a grid like pattern, whether angled or otherwise, to generate a sampled grid like pattern for use as for example a bit-mapped font writing pattern.

Although various embodiments of the present invention on have been shown and described in detail herein, many other varied embodiments that incorporate the teachings of the present invention may be easily constructed by those skilled in the art.

INDUSTRIAL APPLICABILITY AND ADVANTAGES

The present invention is useful in electronic screeners and particularly those destined for use in electronic image processing systems. In particular, use of the invention in such a screener advantageously suppresses a substantial amount of screener induced Moire in a halftoned image thereby providing such an image that more closely replicates an original artwork than that heretofore possible with electronic screeners known in the art.

We claim:

1. In a system for successively addressing a stored font pattern to generate a raster based writing pattern for use in producing a visual depiction of said font pattern within an image, wherein said visual depiction will be formed of separate pixels having a pre-defined spacing occurring therebetween, apparatus for suppressing a Moire pattern occurring in said image, said apparatus comprising:

means for generating a coordinate position of a desired bit residing within said font pattern;

means for generating a substantially random noise value, wherein said noise value is contained within a noise function that has a substantially uniform probability distribution occurring throughout a region having a width equivalent to said spacing and is substantially zero valued elsewhere; and means for summing said noise value with said coordinate position to yield an address to said stored bit pattern whereby said noise value randomly varies a value of a least significant bit occurring in said address so as to substantially suppress said Moire pattern.

2. The apparatus in claim 1 wherein said coordinate position generating means comprises means for generating separate multi-bit orthogonal values as said coordinate position and wherein said summing means comprises means for summing a first portion of said noise value with a first one of said orthogonal values and for summing a second portion of said noise value with a second one of said orthogonal values to respectively yield first and second corresponding portions of said address.

3. The apparatus in claim 2 wherein said noise value generating means comprises means for generating a separate multi-bit noise value for each of said first and second noise value portions.

4. The apparatus in claim 3 wherein said summing means further comprises:

means for summing each of said noise portions with a corresponding one of said orthogonal values such that a most significant bit of said each noise portion is combined with a least significant bit in said one corresponding orthogonal value to yield a corresponding multi-bit sum; and means for applying a pre-defined number of most significant bits in said corresponding multi-bit sum as a corresponding one of said address portions to said stored bit pattern.

5. The apparatus in claim 4 wherein the length of each of said orthogonal values, each of said noise portions and each of said address portions is eight, three and five bits, respectively.

6. The apparatus in claim 4 wherein the stored bit-mapped font pattern is a bit-mapped halftone dot pattern.

7. The apparatus in claim 4 wherein said noise value generating means further comprises:

a shift register having a plurality of individual storage locations;

means for generating a exclusive OR logical combination of values stored within at least two pre-defined ones of said locations to generate a feedback signal;

means for applying said feedback signal to an input of said shift register; and means for generating a bit in said noise value as an exclusive OR logical combination of values stored within at least two pre-defined different locations within said shift register, wherein the relative spacing between each of said different locations is a prime number of locations.

8. The apparatus in claim 7 wherein the shift register has at least 24 separate locations and the noise value is a pseudo random value having a periodicity of at least $2^{23} - 1$.

9. In a system for successively addressing a stored bit-mapped font pattern to generate a raster based writing pattern for use in producing a visual depiction of said font pattern within an image, wherein said visual depiction will be formed of separate pixels having a pre-defined spacing occurring therebetween, apparatus for suppressing a Moire pattern occurring in said image and resulting from interaction of the bit mapped font pattern with the raster based writing pattern, said apparatus comprising:

means for generating a coordinate position of a desired bit residing within said bit-mapped font pattern, wherein said coordinate position is formed of separate multi-bit orthogonal values;

means for generating a substantially random noise value, wherein said noise value is contained within a noise function that has a substantially uniform probability distribution occurring throughout a region having a width equivalent to said spacing and is substantially zero valued elsewhere, said noise value is formed of a separate multi-bit noise value for each of said first and second noise value portions; and means for summing a first portion of said noise value with a first one of said orthogonal values and for summing a second portion of said noise value with a second one of said orthogonal values to respectively yield first and second corresponding portions of an address to said stored bit pattern, whereby said noise value randomly varies a value of a least significant bit occurring in said address so as to substantially suppress said Moire pattern.

10. The apparatus in claim 9 wherein said summing means further comprises:

means for summing each of said noise portions with a corresponding one of said orthogonal values such that a most significant bit of said each noise portion is combined with a least significant bit in said one corresponding orthogonal value to yield a corresponding multi-bit sum; and means for applying a pre-defined number of most significant bits in said corresponding multi-bit sum as a corresponding one of said address portions to said stored bit pattern.

11. The apparatus in claim 10 wherein the length of each of said orthogonal values, each of said noise portions and each of said address portions is eight, three and five bits, respectively.

12. The apparatus in claim 11 wherein said noise value generating means further comprises:

a shift register having a plurality of individual storage locations;

means for generating a exclusive OR logical combination of values stored within at least two pre-defined ones of said locations to generate a feedback signal;

means for applying said feedback signal to an input of said shift register; and means for generating a bit in said noise value as an exclusive OR logical combination of values stored within at least two pre-defined different locations within said shift register, wherein the relative spacing between each of said different locations is a prime number of locations.

13. In a system for successively addressing a stored font pattern to generate a raster based writing pattern for use in producing a visual depiction of said font pattern within an image, wherein said visual depiction will be formed of separate pixels having a pre-defined spacing occurring therebetween, a method for suppressing a Moire pattern occurring in said image comprising the steps of:

generating a coordinate position of a desired bit residing within said font pattern;

generating a substantially random noise value, wherein said noise value is contained within a noise function that has a substantially uniform probability distribution occurring throughout a region having a width equivalent to said spacing and is substantially zero valued elsewhere; and summing said noise value with said coordinate position to yield an address to said stored bit pattern whereby said noise value randomly varies a value of a least significant bit occurring in said address so as to substantially suppress said Moire pattern.

14. The method in claim 13 wherein said coordinate position generating step comprises the step of generating separate multi-bit orthogonal values as said coordinate position and wherein said summing step comprises the steps of summing a first portion of said noise value with a first one of said orthogonal values and summing a second portion of said noise value with a second one of said orthogonal values to respectively yield first and second corresponding portions of said address.

15. The method in claim 14 wherein said noise value generating step comprises the step of generating a separate multi-bit noise value for each of said first and second noise value portions.

16. The method in claim 15 wherein said summing step further comprises the steps of:

summing each of said noise portions with a corresponding one of said orthogonal values such that a most significant bit of said each noise portion is combined with to a least significant bit in said one corresponding orthogonal value to yield a corresponding multi-bit sum; and applying a pre-defined number of most significant bits in said corresponding multi-bit sum as a corresponding one of said address portions to said stored bit pattern.

* * * * *

UNITED STATES PATENT AND TRADEMARK OFFICE
CERTIFICATE OF CORRECTION

PATENT NO. : 4,977,458
DATED : December 11, 1990
INVENTOR(S) : E. M. Granger et al It is certified that error appears in the above-identified patent and that said Letters Patent is hereby corrected as shown below:

Title page, Col. 2, line [57] please insert --Attorney, Agent, or Firm -- Dennis R. Arndt--

Signed and Sealed this

Fourth Day of August, 1992

Attest:

DOUGLAS B. COMER

*Attesting Officer*         *Acting Commissioner of Patents and Trademarks*